(12) United States Patent
Hsu et al.

(10) Patent No.: US 8,687,709 B2
(45) Date of Patent: Apr. 1, 2014

(54) IN-LOOP DEBLOCKING FOR INTERLACED VIDEO

(75) Inventors: Pohsiang Hsu, Redmond, WA (US);
Chih-Lung Lin, Redmond, WA (US);
Sridhar Srinivasan, Redmond, WA (US); Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1185 days.

(21) Appl. No.: 10/934,116

(22) Filed: Sep. 4, 2004

(65) Prior Publication Data
US 2005/0084012 A1    Apr. 21, 2005

Related U.S. Application Data

(60) Provisional application No. 60/501,081, filed on Sep. 7, 2003.

(51) Int. Cl.
*H04N 7/12* (2006.01)
*H04N 11/02* (2006.01)
*H04N 11/04* (2006.01)

(52) U.S. Cl.
USPC ............. 375/240.29; 375/240.12; 375/240.13

(58) Field of Classification Search
USPC ............................ 375/240.12, 240.13, 240.29
See application file for complete search history.

(56) References Cited

U.S. PATENT DOCUMENTS

| 4,691,329 A | 9/1987 | Juri et al. |
| 4,796,087 A | 1/1989 | Guichard et al. |
| 5,089,889 A | 2/1992 | Sugiyama |
| 5,117,287 A | 5/1992 | Koike et al. |
| 5,220,616 A | 6/1993 | Downing et al. |
| 5,367,385 A | 11/1994 | Yuan |
| 5,422,676 A | 6/1995 | Herpel et al. |

(Continued)

FOREIGN PATENT DOCUMENTS

| EP | 966841 | 12/1999 |
| EP | 1085763 | 3/2001 |

(Continued)

OTHER PUBLICATIONS

Sullivan et al., "The H.264/AVC Advanced Video Coding Standard: Overview and Introduction to the Fidelity Range Extensions," 21 pp. (Aug. 2004).

(Continued)

*Primary Examiner* — Chikaodili E Anyikire
(74) *Attorney, Agent, or Firm* — Aaron Chatterjee; Andrew Sanders; Micky Minhas

(57) ABSTRACT

An encoder/decoder obtains pixel data from one or more field lines associated with a first block in an interlaced frame coded picture comprising plural macroblocks each having an equal number of top and bottom field lines. The encoder/decoder obtains pixel data from one or more field lines associated with a second block and performs in-loop deblocking filtering across a boundary. The in-loop deblocking filtering comprises filter operations performed on pixel data from field lines of same polarity only. In another aspect, an encoder/decoder obtains transform size information for plural blocks of macroblock, obtains field/frame type information for the macroblock and selects one or more boundaries for in-loop deblocking based at least in part on the transform size information and the field/frame type information. In-loop deblocking can be performed on horizontal block boundaries prior to vertical block boundaries.

35 Claims, 38 Drawing Sheets

(56) References Cited

U.S. PATENT DOCUMENTS

| | | |
|---|---|---|
| 5,467,134 A | 11/1995 | Laney et al. |
| 5,473,384 A | 12/1995 | Jayant et al. |
| 5,477,272 A | 12/1995 | Zhang et al. |
| 5,544,286 A | 8/1996 | Laney |
| 5,590,064 A | 12/1996 | Astle |
| 5,598,483 A | 1/1997 | Purcell et al. |
| 5,719,958 A | 2/1998 | Wober et al. |
| 5,737,019 A | 4/1998 | Kim |
| 5,737,455 A | 4/1998 | Harrington et al. |
| 5,748,789 A | 5/1998 | Lee et al. |
| 5,757,982 A | 5/1998 | Tepmongkol |
| 5,771,318 A | 6/1998 | Fang et al. |
| 5,787,203 A | 7/1998 | Lee et al. |
| 5,793,897 A | 8/1998 | Jo et al. |
| 5,796,875 A | 8/1998 | Read |
| 5,799,113 A | 8/1998 | Lee |
| 5,825,929 A | 10/1998 | Chen et al. |
| 5,835,618 A | 11/1998 | Fang et al. |
| 5,844,613 A | 12/1998 | Chaddha |
| 5,874,995 A | 2/1999 | Naimpally et al. |
| 5,905,815 A | 5/1999 | Mack et al. |
| 5,937,095 A | 8/1999 | Machida |
| 5,946,043 A | 8/1999 | Lee et al. |
| 5,970,173 A | 10/1999 | Lee et al. |
| 5,982,459 A | 11/1999 | Fandrianto et al. |
| 6,016,365 A | 1/2000 | Shin et al. |
| 6,028,967 A | 2/2000 | Kim et al. |
| 6,038,256 A | 3/2000 | Linzer et al. |
| 6,067,322 A | 5/2000 | Wang |
| 6,160,503 A | 12/2000 | Andrews et al. |
| 6,167,164 A | 12/2000 | Lee |
| 6,178,205 B1 | 1/2001 | Cheung et al. |
| 6,188,799 B1 | 2/2001 | Tan et al. |
| 6,215,910 B1 | 4/2001 | Chaddha |
| 6,233,017 B1 | 5/2001 | Chaddha |
| 6,236,764 B1 | 5/2001 | Zhou et al. |
| 6,240,135 B1 | 5/2001 | Kim |
| 6,249,610 B1 | 6/2001 | Matsumoto et al. |
| 6,281,942 B1 | 8/2001 | Wang |
| 6,285,801 B1 | 9/2001 | Mancuso et al. |
| 6,320,905 B1 | 11/2001 | Konstantinides |
| 6,337,881 B1 | 1/2002 | Chaddha |
| 6,380,985 B1 | 4/2002 | Callahan |
| 6,466,624 B1 | 10/2002 | Fogg |
| 6,473,409 B1 | 10/2002 | Malvar |
| 6,501,798 B1 | 12/2002 | Sivan |
| 6,504,873 B1 | 1/2003 | Vehvilainen |
| 6,529,638 B1 | 3/2003 | Westerman |
| 6,571,016 B1 | 5/2003 | Mehrotra et al. |
| 6,597,860 B2 | 7/2003 | Song et al. |
| 6,600,839 B2 | 7/2003 | Mancuso et al. |
| 6,646,578 B1 | 11/2003 | Au |
| 6,665,346 B1 | 12/2003 | Lee et al. |
| 6,690,838 B2 | 2/2004 | Zhou |
| 6,704,718 B2 | 3/2004 | Burges et al. |
| 6,724,944 B1 | 4/2004 | Kalevo et al. |
| 6,741,752 B1 | 5/2004 | Yang |
| 6,748,113 B1 | 6/2004 | Kondo et al. |
| 6,766,063 B2 | 7/2004 | Gonsalves |
| 6,768,774 B1 | 7/2004 | MacInnis et al. |
| 6,795,584 B2 | 9/2004 | Karczewicz et al. |
| 6,931,063 B2 | 8/2005 | Sun et al. |
| 6,983,018 B1 | 1/2006 | Lin et al. |
| 6,983,079 B2 | 1/2006 | Kim |
| 7,003,035 B2 | 2/2006 | Tourapis et al. |
| 7,266,149 B2 | 9/2007 | Holcomb et al. |
| 7,426,315 B2 | 9/2008 | Frishman et al. |
| 7,430,336 B2 | 9/2008 | Raveendran |
| 7,616,829 B1 | 11/2009 | Bilbrey et al. |
| 2001/0017944 A1 | 8/2001 | Kalevo et al. |
| 2002/0009146 A1 | 1/2002 | Westermann et al. |
| 2002/0027954 A1 | 3/2002 | Singh et al. |
| 2002/0067369 A1 | 6/2002 | Sullivan |
| 2002/0097802 A1 | 7/2002 | Lin et al. |
| 2002/0110284 A1 | 8/2002 | Chu et al. |
| 2002/0136303 A1 | 9/2002 | Sun et al. |
| 2002/0146072 A1 | 10/2002 | Sun et al. |
| 2002/0150166 A1 | 10/2002 | Johnson |
| 2002/0154227 A1 | 10/2002 | Lan et al. |
| 2002/0186890 A1 | 12/2002 | Lee et al. |
| 2003/0021489 A1 | 1/2003 | Miura et al. |
| 2003/0044080 A1 | 3/2003 | Frishman et al. |
| 2003/0053541 A1 | 3/2003 | Sun et al. |
| 2003/0053708 A1 | 3/2003 | Kryukov et al. |
| 2003/0053711 A1 | 3/2003 | Kim |
| 2003/0058944 A1* | 3/2003 | MacInnis et al. ........ 375/240.13 |
| 2003/0099292 A1 | 5/2003 | Wang et al. |
| 2003/0103680 A1 | 6/2003 | Westermann |
| 2003/0138154 A1 | 7/2003 | Suino |
| 2003/0152146 A1 | 8/2003 | Lin et al. |
| 2003/0156648 A1 | 8/2003 | Holcomb et al. |
| 2003/0185306 A1 | 10/2003 | MacInnis et al. |
| 2003/0202608 A1* | 10/2003 | MacInnis et al. ........ 375/240.29 |
| 2003/0219074 A1 | 11/2003 | Park et al. |
| 2003/0235248 A1 | 12/2003 | Kim et al. |
| 2003/0235250 A1* | 12/2003 | Varma et al. ............. 375/240.29 |
| 2004/0005096 A1 | 1/2004 | Kim et al. |
| 2004/0057517 A1 | 3/2004 | Wells |
| 2004/0062309 A1 | 4/2004 | Romanowski et al. |
| 2004/0062310 A1* | 4/2004 | Xue et al. ................. 375/240.16 |
| 2004/0076338 A1 | 4/2004 | Kriss |
| 2004/0101059 A1* | 5/2004 | Joch et al. ................ 375/240.29 |
| 2004/0120597 A1 | 6/2004 | Le Dinh |
| 2004/0141557 A1 | 7/2004 | Lin et al. |
| 2004/0146210 A1 | 7/2004 | Kalevo et al. |
| 2004/0190626 A1 | 9/2004 | Sun et al. |
| 2004/0208392 A1 | 10/2004 | Raveendran et al. |
| 2004/0252768 A1 | 12/2004 | Suzuki et al. |
| 2005/0008251 A1 | 1/2005 | Chiang |
| 2005/0013494 A1* | 1/2005 | Srinivasan et al. ............ 382/233 |
| 2005/0025246 A1 | 2/2005 | Holcomb |
| 2005/0036759 A1 | 2/2005 | Lin et al. |
| 2005/0105889 A1* | 5/2005 | Conklin .......................... 386/95 |
| 2005/0117651 A1* | 6/2005 | Wang et al. .............. 375/240.16 |
| 2005/0135484 A1 | 6/2005 | Lee et al. |
| 2005/0175103 A1 | 8/2005 | Sun et al. |
| 2005/0196063 A1 | 9/2005 | Guangxi et al. |
| 2005/0207492 A1 | 9/2005 | Pao |
| 2005/0237433 A1 | 10/2005 | Van Dijk et al. |
| 2005/0243911 A1 | 11/2005 | Kwon et al. |
| 2005/0243912 A1 | 11/2005 | Kwon et al. |
| 2005/0243913 A1 | 11/2005 | Kwon et al. |
| 2005/0243914 A1 | 11/2005 | Kwon et al. |
| 2005/0243915 A1 | 11/2005 | Kwon et al. |
| 2005/0243916 A1 | 11/2005 | Kwon et al. |
| 2005/0244063 A1 | 11/2005 | Kwon et al. |
| 2005/0254583 A1 | 11/2005 | Kim et al. |
| 2005/0276505 A1 | 12/2005 | Raveendran |
| 2006/0050783 A1 | 3/2006 | Le Dinh et al. |
| 2006/0072668 A1 | 4/2006 | Srinivasan et al. |
| 2006/0072669 A1 | 4/2006 | Lin et al. |
| 2006/0078052 A1 | 4/2006 | Dang |
| 2006/0110062 A1 | 5/2006 | Chiang et al. |
| 2006/0126962 A1 | 6/2006 | Sun et al. |
| 2006/0171472 A1 | 8/2006 | Sun et al. |
| 2006/0181740 A1 | 8/2006 | Kim et al. |
| 2006/0209962 A1 | 9/2006 | Park et al. |
| 2006/0215754 A1 | 9/2006 | Buxton et al. |
| 2006/0268988 A1 | 11/2006 | Sun et al. |
| 2006/0274959 A1 | 12/2006 | Piastowski |
| 2007/0237241 A1 | 10/2007 | Ha et al. |
| 2007/0280552 A1 | 12/2007 | Lee et al. |
| 2007/0291141 A1 | 12/2007 | Thorell |
| 2007/0291858 A1 | 12/2007 | Hussain et al. |
| 2008/0049834 A1 | 2/2008 | Holcomb et al. |
| 2008/0084932 A1 | 4/2008 | Wang et al. |
| 2008/0159407 A1 | 7/2008 | Yang et al. |
| 2008/0187053 A1 | 8/2008 | Zhao et al. |
| 2008/0266398 A1 | 10/2008 | Ferguson |
| 2009/0003446 A1 | 1/2009 | Wu et al. |
| 2009/0148062 A1 | 6/2009 | Gabso et al. |
| 2009/0327386 A1 | 12/2009 | Schoenblum |
| 2010/0033633 A1 | 2/2010 | Dane et al. |
| 2010/0128803 A1 | 5/2010 | Divorra Escoda et al. |

(56) References Cited

U.S. PATENT DOCUMENTS

| | | |
|---|---|---|
| 2010/0183068 A1 | 7/2010 | Pandit et al. |
| 2011/0200100 A1 | 8/2011 | Kim et al. |
| 2011/0200103 A1 | 8/2011 | Kim et al. |
| 2011/0222597 A1 | 9/2011 | Xu et al. |
| 2012/0082219 A1 | 4/2012 | Sun et al. |

FOREIGN PATENT DOCUMENTS

| | | |
|---|---|---|
| EP | 1246131 | 10/2002 |
| EP | 1562384 | 8/2005 |
| EP | 1727373 | 11/2006 |
| GB | 2365647 | 2/2002 |
| TW | 379509 | 1/2000 |
| WO | WO 03/036979 | 5/2003 |
| WO | 03/101117 | 12/2003 |

OTHER PUBLICATIONS

Wiegand, "Joint Model No. 1, Revision 1 (JM1-rl)," JVT-A003r1, 80 pp. (document marked "Generated: Jan. 18, 2002").

Wien, "Variable Block-Size Transforms for Hybrid Video Coding," Dissertion, 182 pp. (Feb. 2004).

Kotropoulos et al., "Adaptive LMS L-filters for Noise Suppression in Images," *IEEE Transactions on Image Processing*, vol. 5, No. 12, pp. 1596-1609 (1996). [48 pp. as downloaded from the World Wide Web on Apr. 30, 2001.].

U.S. Appl. No. 60/341,674, filed Dec. 17, 2001, Lee et al.

U.S. Appl. No. 60/488,710, filed Jul. 18, 2003, Srinivasan et al.

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

Linares et al., "JPEG Estimated Spectrum Adaptive Postfiltering Using Image-Adaptive Q-Tables and Canny Edge Detectors," *Proc. ISCAS'96*, Atlanta GA, May 1996.

Lee et al., "Blocking Effect Reduction of JPEG Images by Signal Adaptive Filtering," *IEEE Trans. on Image Processing*, vol. 7, pp. 229-234, Feb. 1998.

Meier et al., "Reduction of Blocking Artifacts in Image and Video Coding," *IEEE Trans. on Circuits and Systems for Video Technology*, vol. 9, No. 3, pp. 490-500, Apr. 1999.

Joch et al., "A Performance Analysis of the ITU-T Draft H.26L Video Coding Standard." http://pv2002.ece.cmu.edu/papers (Current Aug. 2002).

Chen et al., "Adaptive post-filtering of transform coefficients for the reduction of blocking artifacts," *IEEE Transactions on Circuits and Systems for Video Technology* vol. 11, No. 5, pp. 594-602, 2001.

Choy et al., "Reduction of coding artifacts in transform image coding by using local statistics of transform coefficients," *IEEE International Symposium on Circuits and Systems*, pp. 1089-1092, 1997.

Minami et al., "An optimization approach for removing blocking effects in transform coding," *IEEE Transactions on Circuits and Systems for Video Technology*, vol. 5, No. 2, pp. 74-82, 1995.

Zhang et al., "A new approach to reduce the "blocking effect" of transform coding," *IEEE Transactions on Communications*, vol. 41, No. 2, pp. 299-302, 1993.

Malvar, "Biorthogonal and Nonuniform Lapped Transforms for Transform Coding with Reduced Blocking and Ringing Artifacts," *IEEE Transactions on Signal Processing*, vol. 46, No. 4, pp. 1043-1053, Apr. 1998.

Malvar, "A pre- and post-filtering technique for the reduction of blocking effects," in *Proc. Picture Coding Symp.*, Stockholm, Sweden, Jun. 1987.

Panis et al., "A method for reducing block artifacts by interpolating block borders," available at http://www.cs.mcgill.ca/~gstamm/Siemens1/paper1.html.

Panis et al., "Reduction of block artifacts by selective removal and reconstruction of the block borders," Picture Coding Symposium 97, Berlin, Sep. 10-12, 1997.

Wu et al., "Joint estimation of forward and backward motion vectors for interpolative prediction of video," *IEEE Transactions on Image Processing*, vol. 3, No. 5, pp. 684-687, Sep. 1994.

Lee et al., "Loop filtering and post-filtering for low-bit-rates moving picture coding," *Signal Processing: Image Communication* 16, pp. 871-890 (2001).

Sun et al., "Loop Filter with Skip Mode," Study Group 16, Video Coding Experts Group, 8 pp. (2001).

O'Rourke et al., "Improved Image Decompression for Reduced Transform Coding Artifacts," *IEEE Trans. on Circuits and Systems for Video Technology*, vol. 5, No. 6, (Dec. 1995).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

ITU-T, "ITU-T Recommendation H.261: Video Codec for Audiovisual Services at $p$ ×64 kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

Ati Avivo, "ATI AVIVO. Part 0: Introduction and Description of Video Technologies," 8 pp. (downloaded from the World Wide Web on Jun. 28, 2006).

Elecard Ltd., "AVC/H.264 Decoder with DXVA Support," 2 pp., (downloaded from the World Wide Web on Aug. 27, 2006).

Sullivan et al., "Microsoft DirectX VA: Video Acceleration API/DDI," *DirectX® VA Version 1.01*, 88 pp. (Jan. 23, 2001).

Wang, "H.264 Baseline Video Implementation on the CT3400 Multi-core DSP," Cradle Technologies, 15 pp.

Chen et al., "Variable Block-size Image Coding by Resource Planning," *Proc. Int'l Conf. on Image Science, Systems, and Technology*, Las Vegas, 10 pp. (1997).

Hallapuro et al., "Performance Analysis of Low Bit Rate H.26L Video Encoder," *Proc. IEEE International Conference on Acoustics, Speech and Signal Processing*, vol. 2, pp. 1129-1132 (May 2001).

Horn et al, "Bit allocation methods for closed-loop coding of oversampled pyramid decompositions," *Proc. of IEEE International Conference on Image Processing*, 4 pp. (1997).

Joint Video Team (JVT) of ISO/IEC MPEG and ITU-T VCEG, "Joint Committee Draft (CD), JVT-C167," 3rd Meeting: Fairfax, Virginia, USA, 142 pp. (May 2002).

Lee et al., "Variable Block Size Techniques for Motion Sequence Coding," *Proc. First Korea-Japan Joint Workshop on Multi-media Communications*, 12 pp. (1994).

Mehrotra et al., "Adaptive Coding Using Finite State Hierarchical Table Lookup Vector Quantization with Variable Block Sizes," 5 pp. (1996).

Ribas-Corbera et al., "On the Optimal Block Size for Block-based Motion-Compensated Video Coders," *SPIE Proc. of Visual Communications and Image Processing*, vol. 3024, 12 pp. (1997).

Ribas-Corbera et al., "On the Optimal Motion Vector Accuracy for Block-based Motion-Compensated Video Coders," *Proc. SPIE Digital Video Compression*, San Jose, CA, 13 pp. (1996).

Wien et al., "16 Bit Adaptive Block size Transforms," JVT-C107r1, 54 pp.

Wien, "H.26L Core Experiment on Adaptive Block Transforms," International Telecommunications Union, 2 pp. [Downloaded from the World Wide Web on Nov. 11, 2002].

(56) References Cited

OTHER PUBLICATIONS

Cheung et al., "Video Coding on Multi-Core Graphics Processors," *IEEE Signal Processing Magazine—Special Issue on Signal Processing on Platforms with Multiple Cores: Design and Applications*, vol. 27, No. 2, pp. 79-89 (Mar. 2010).

Chien et al., "A High Throughput Deblocking Filter Design Supporting Multiple Video Coding Standards," *ISCAS*, pp. 2377-2380 (2009).

Citro et al., "A Multi-Standard Micro-Programmable Deblocking Filter Architecture and its Application to VC-1 Video Decoder," *IEEE Int'l SOC Conf.*, pp. 225-228 (2008).

Citro et al., "Programmable Deblocking Filter Architecture for a VC-1 Video Decoder," *IEEE Trans. on Circuits and Systems for Video Technology*, vol. 19, pp. 1227-1233 (2009).

Fong et al., "Integer Lapped Transforms and Their Applications to Image Coding," *IEEE Trans. Image Processing*, vol. 11, No. 10, pp. 1152-1159 (Oct. 2002).

Huang et al., "A Post Deblocking Filter for H.264 Video," *IEEE Proc. Int'l Conf. on Computer Communications and Networks*, pp. 1137-1142 (Aug. 2007).

Jacobs et al., "Thread-Parallel MPEG-2, MPEG-4 and H.264 Video Encoders for SoC Multi-Processor Architectures," *IEEE Trans. on Consumer Electronics*, vol. 52, No. 1, pp. 269-275 (2006).

Jeong et al., "A directional deblocking filter based on intra prediction for H.264 AVC," *IEICE Electronics Express*, vol. 6, No. 12, pp. 864-869 (Jun. 2009).

Joint Collaborative Team on Video Coding (JCT-VC), "Description of video coding technology proposal by Microsoft," JCTVC-A118, 15 pp. (Apr. 2010).

Kaup, "Reduction of Ringing Noise in Transform Image Coding Using a Simple Adaptive Filter," *Electronics Letters*, vol. 34, No. 22, 8 pp. (Oct. 1998).

Kong et al., "Edge Map Guided Adaptive Post-Filter for Blocking and Ringing Artifacts Removal," Mitsubishi Electric Research Technical Report TR-2004-003, 6 pp. (Feb. 2004).

Lee et al. "Analysis and Efficient Architecture Design for VC-1 Overlap Smoothing and In-Loop Deblocking Filter," *IEEE Trans. on Circuits and Systems for Video Technology*, vol. 18, pp. 1786-1796 (2008).

Lee et al., "Analysis and Integrated Architecture Design for Overlap Smooth and In-Loop Deblocking Filter in VC-1," *ICIP*, vol. 5, pp. 169-172 (2007).

Liu et al., "An In/Post-Loop Deblocking Filter with Hybrid Filtering Schedule," *IEEE Trans. on Circuits and Systems for Video Technology*, vol. 17, pp. 937-943 (2007).

List et al., "Adaptive Deblocking Filter," *IEEE Trans. Circuits Syst. Video Technol.*, vol. 13, No. 7, pp. 614-619 (Jul. 2003).

Ostermann et al., "Video Coding with H.264/AVC: Tools, Performance, and Complexity," *IEEE Circuits and Systems Magazine*, pp. 7-28 (2004).

Ren et al., "Computationally Efficient Mode Selection in H.264/AVC Video Coding," *IEEE Trans. on Consumer Electronics*, vol. 54, No. 2, pp. 877-886 (May 2008).

Richardson, *H.264 and MPEG-4 Video Compression: Video Coding for Next-generation Multimedia*, pp. 184-187 (2003).

SMPTE, "VC-1 Compressed Video Bitstream Format and Decoding Process," SMPTE 421M-2006, 493 pp. (2006).

Wang et al., "A Multi-Core Architecture Based Parallel Framework for H.264/AVC Deblocking Filters," *J. Sign. Process. Syst.*, vol. 57, No. 2, 17 pp. (document marked "published online: Dec. 4, 2008").

Wang et al., "Interlace Coding Tools for H.26L Video Coding," ITU, VCEG-O37, 20 pp. (Nov. 2001).

Wang et al., "Objective Video Quality Assessment," Ch. 41 in *The Handbook of Video Databases: Design and Applications*, pp. 1041-1078 (Sep. 2003).

\* cited by examiner

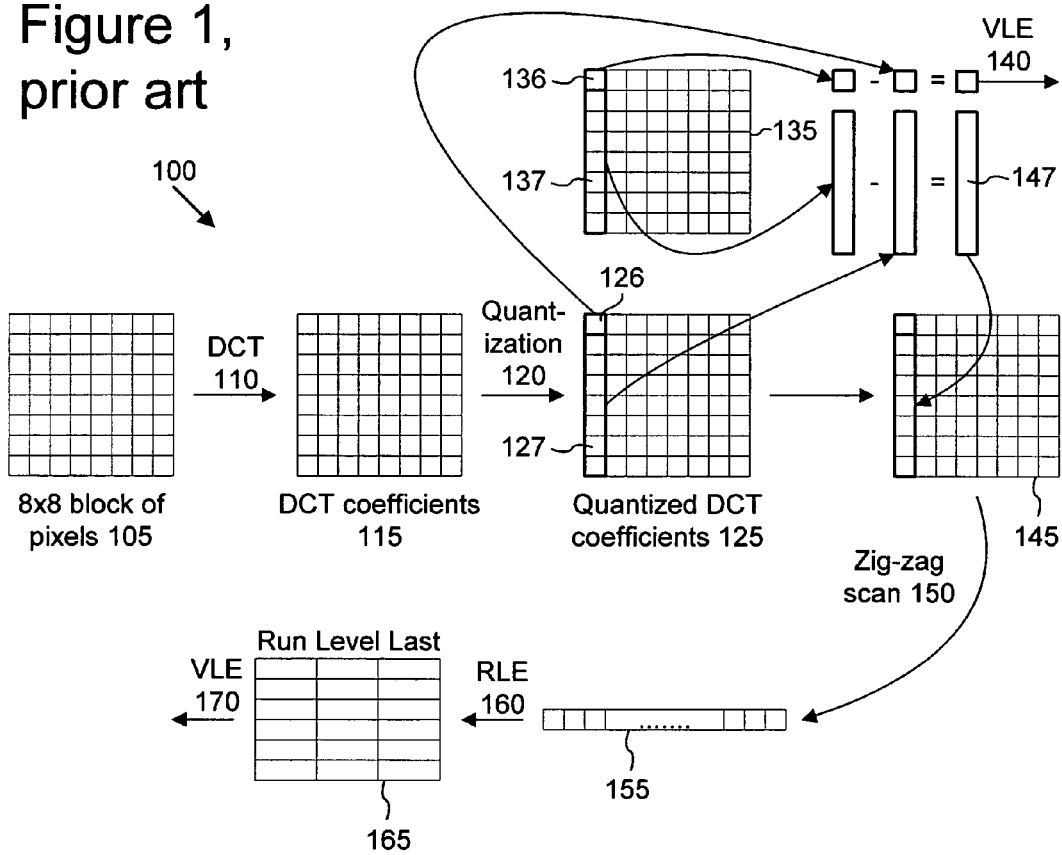

Figure 2, prior art
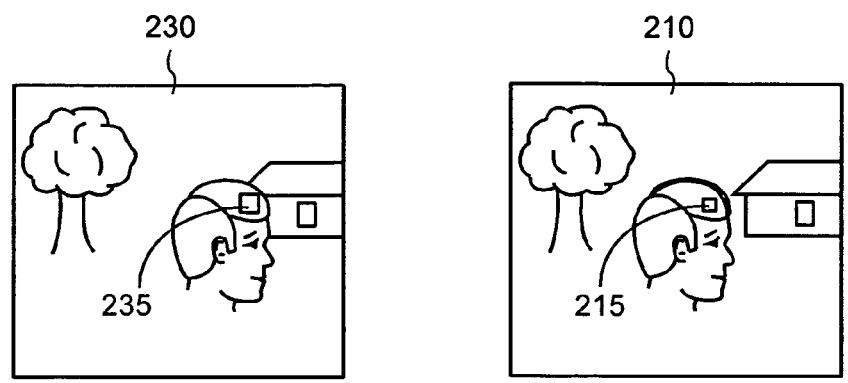
Figure 5, prior art
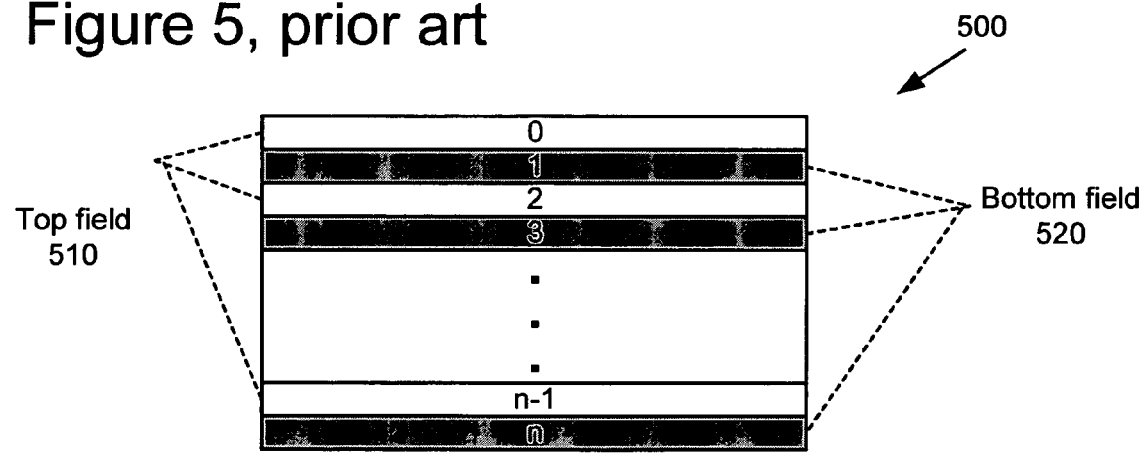

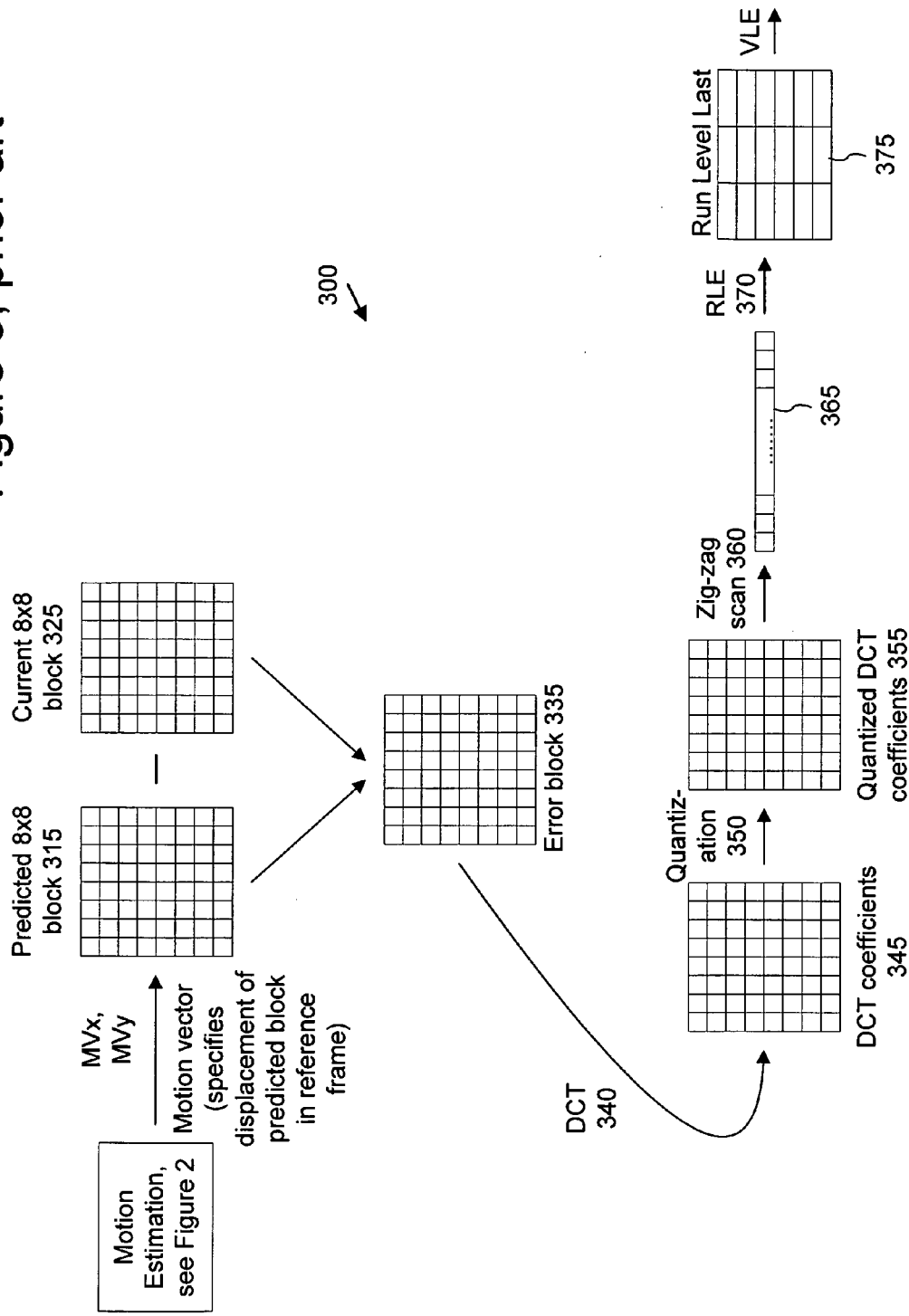
Figure 3, prior art

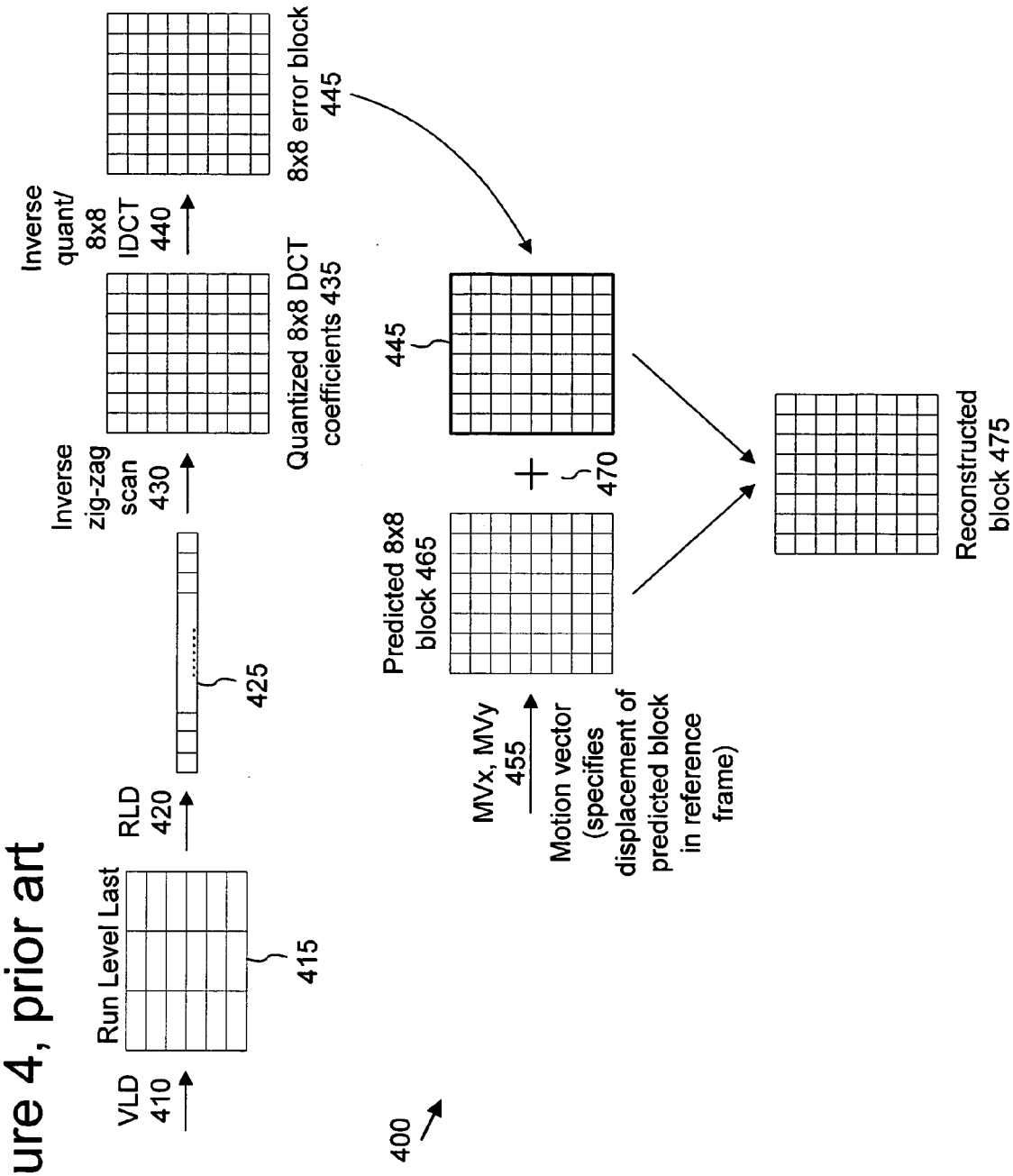
Figure 4, prior art

Figure 6, prior art
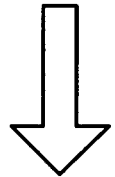
Interlaced macroblock 610
Field-coded macroblock 620

Figure 7, prior art
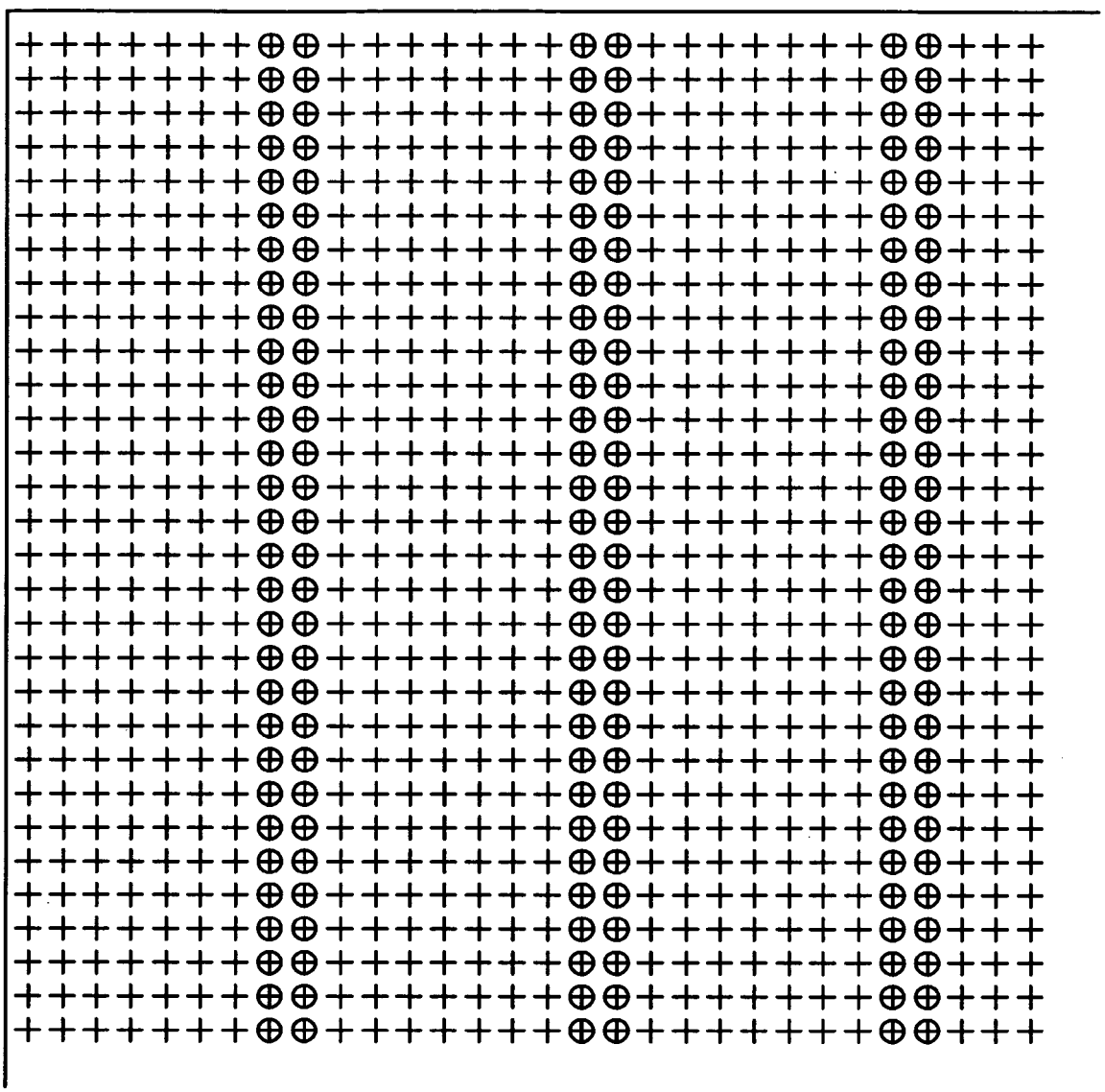

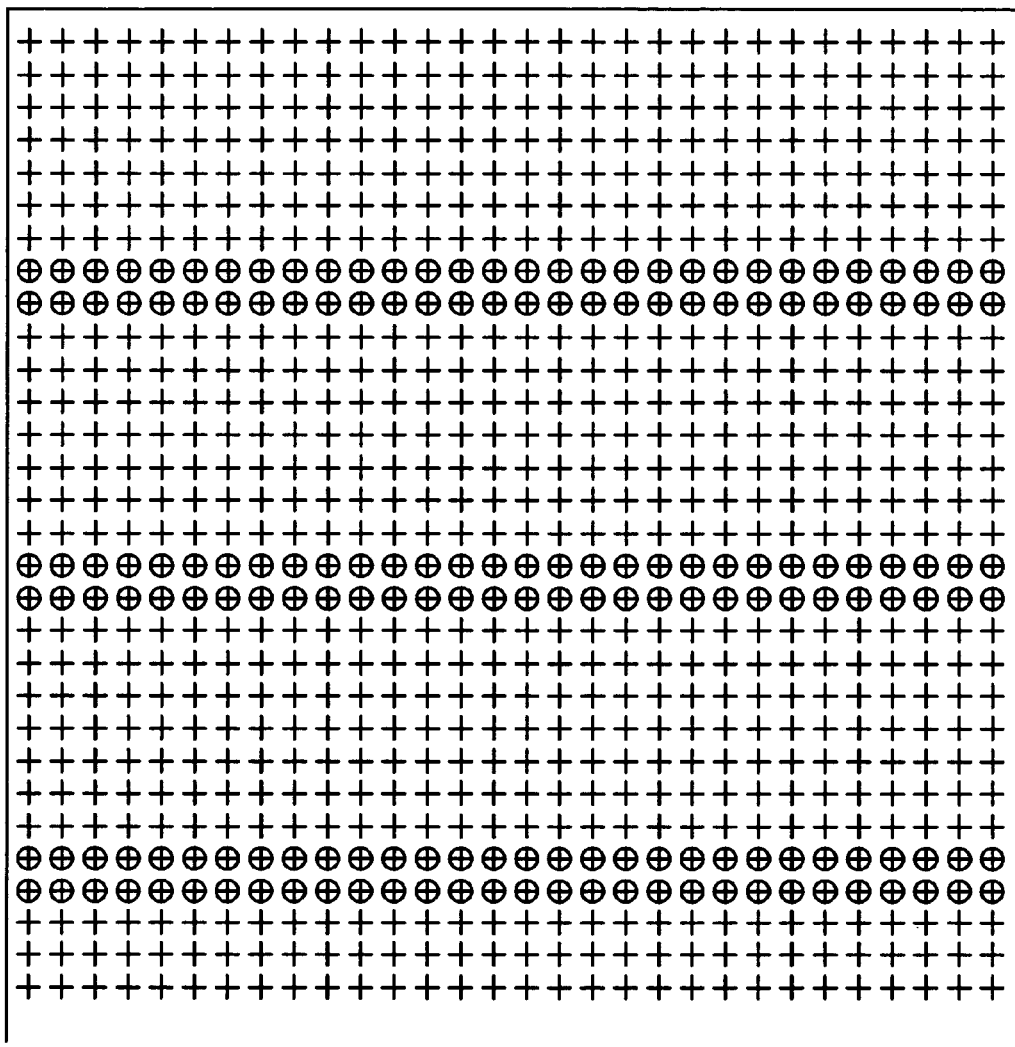
Figure 8, prior art

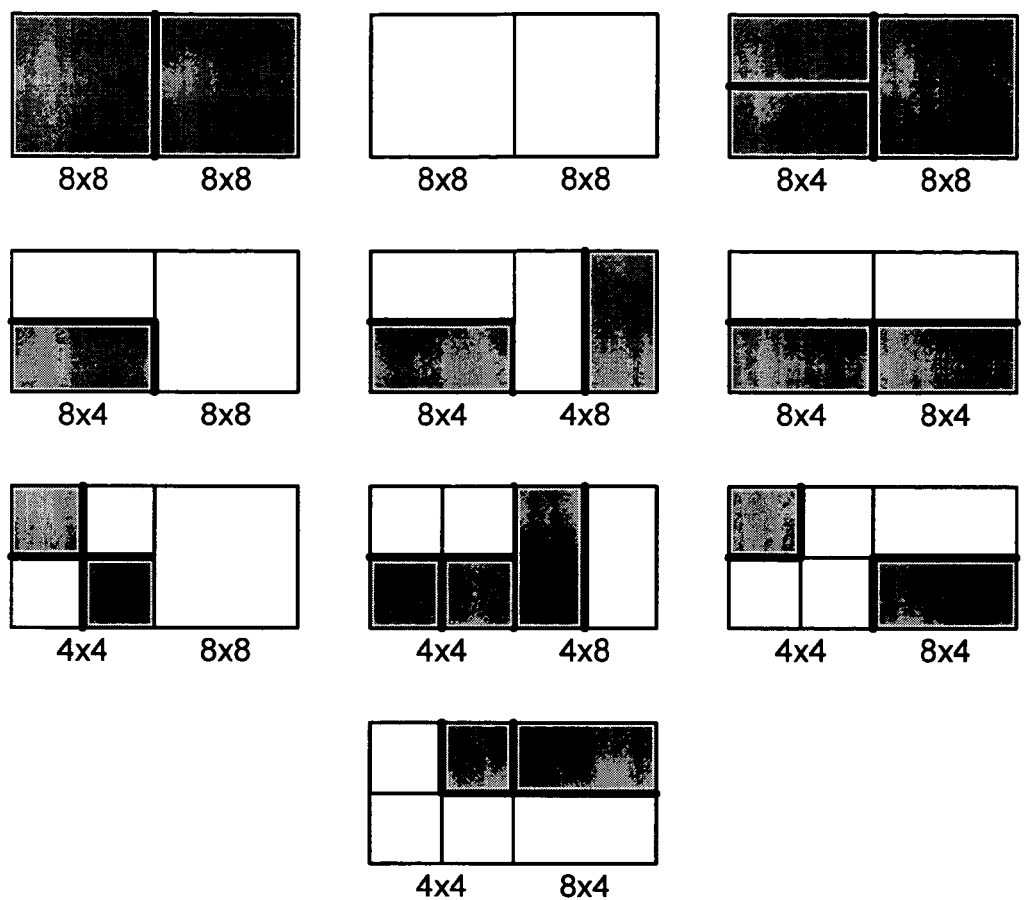

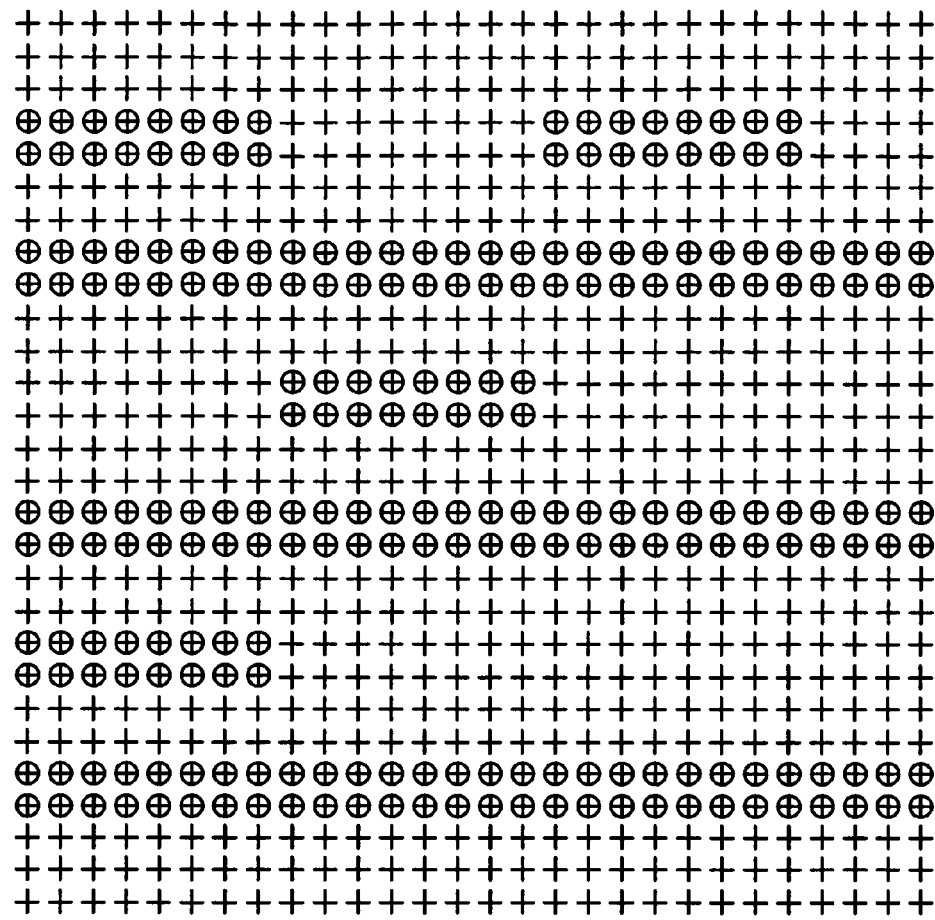
Figure 10, prior art

Figure 11, prior art
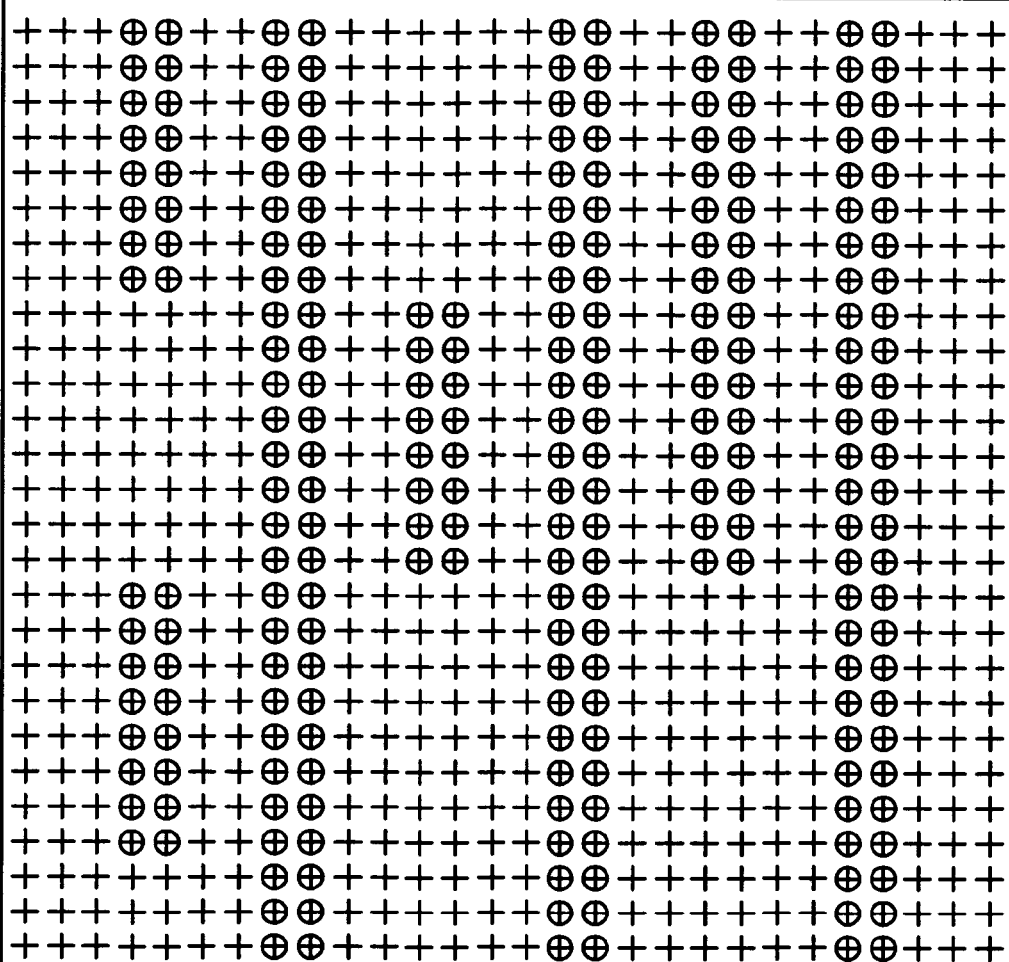

Figure 12, prior art
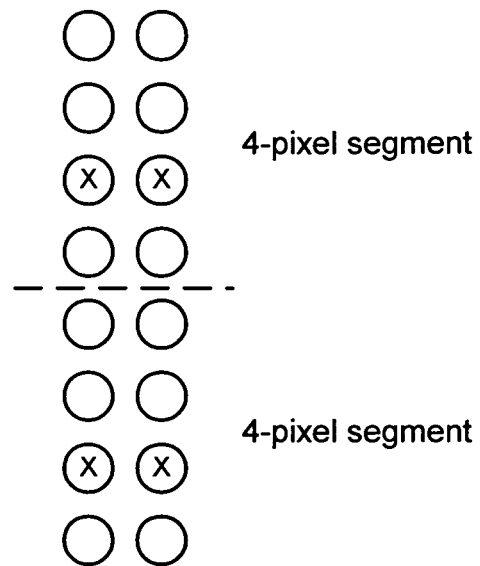
Figure 13, prior art
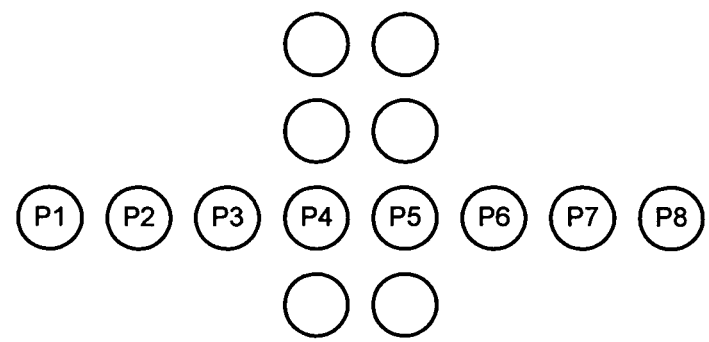

```
filter_other_3_pixels = TRUE
a0 = (2*(P3 - P6) - 5*(P4 – P5) + 4) >> 3
if (|a0| < PQUANT) {
    a1 = (2*(P1 - P4) - 5*(P2 - P3) + 4) >> 3
    a2 = (2*(P5 - P8) - 5*(P6 - P7) + 4) >> 3
    a3 = min(|a1|, |a2|)
    if (a3 < |a0|)
    {
        d = 5*((sign(a0) * a3) - a0)/8
        clip = (P4 – P5)/2
        if (clip == 0)
                filter_other_3_pixels = FALSE
        else
        {
            if (clip > 0)
            {
                if (d < 0)
                        d = 0
                if (d > clip)
                        d = clip
            }
            else
            {
                if (d > 0)
                        d = 0
                if (d < clip)
                        d = clip
            }
                P4 = P4 - d
                P5 = P5 + d
        }
    }
    else
        filter_other_3_pixels = FALSE
}
else
        filter_other_3_pixels = FALSE
```

```
a0 = (2*(P3 - P6) - 5*(P4 – P5) + 4) >> 3
if (|a0| < PQUANT)
{
    a1 = (2*(P1 - P4) - 5*(P2 - P3) + 4) >> 3
    a2 = (2*(P5 - P8) - 5*(P6 - P7) + 4) >> 3
    a3 = min(|a1|, |a2|)
    if (a3 < |a0|)
    {
        d = 5*((sign(a0) * a3) - a0)/8
        clip = (P4 – P5)/2 if (clip > 0)
        {
            if (d < 0)
                    d = 0
            if (d > clip)
                        d = clip
                    P4 = P4 - d
                    P5 = P5 + d
        }
        else if (clip < 0)
        {
            if (d > 0)
                    d = 0
            if (d < clip)
                    d = clip
                    P4 = P4 - d
        P5 = P5 + d
        }
    }
}
```

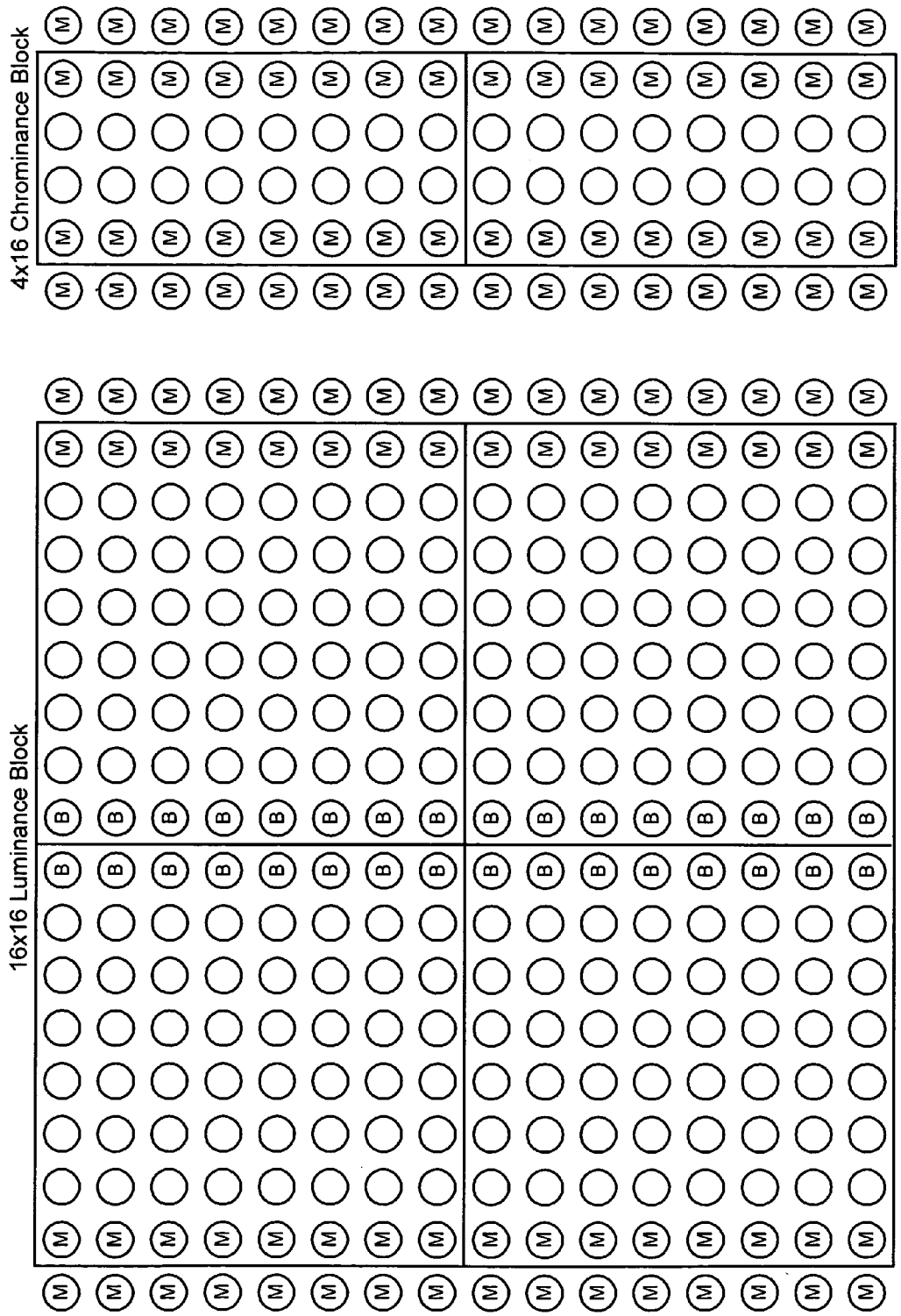
Figure 16, prior art

Software 1780 implementing video encoder or decoder with described techniques and tools

```
// Processing horizontal edges
for (Y = 0; Y < number of MBs in a MB row; Y++) {
    for (X = 0; X < number of MBs in a MB col; X++) {
        Filter horizontal edges of MB located at Yth row, Xth col
    }
}

// Processing vertical edges
for (Y = 0; Y < number of MBs in a MB row; Y++) {
    for (X = 0; X < number of MBs in a MB col; X++) {
        Filter vertical edges of MB located at Yth row, Xth col
    }
}
```

Figure 27A

Interlaced luminance blocks 2710

Field transform coded luminance blocks 2720

```
// Horizontal filtering of MB
// Luma
if (FIELDTX of current MB is FALSE) {
    - Filter all 16 pixels in row 6 and 8 of Y.
    - Filter all 16 pixels in row 7 and 9 of Y.
}

- Filter all 16 pixels in row 14 and 16 of Y.
- Filter all 16 pixels in row 15 and 17 of Y.

// Chroma
- Filter all 8 pixels in row 6 and 8 of $C_b$ and $C_r$.
- Filter all 8 pixels in row 7 and 9 of $C_b$ and $C_r$.
```

```
// Vertical filtering of MB
// Luma
- Filter the 8 even numbered pixels in column 7 and 8 of Y.
- Filter the 8 odd numbered pixels in column 7 and 8 of Y.

- Filter the 8 even numbered pixels in column 15 and 16 of Y.
- Filter the 8 odd numbered pixels in column 15 and 16 of Y.

// Chroma
- Filter the 4 even numbered pixels in column 7 and 8 of $C_b$.
- Filter the 4 odd numbered pixels in column 7 and 8 of $C_b$.
- Filter the 4 even numbered pixels in column 7 and 8 of $C_r$.
- Filter the 4 odd numbered pixels in column 7 and 8 of $C_r$.
```

```
// Horizontal filtering of MB
// Luma
if (FIELDTX of current MB is FALSE) {
    // Block Y0
    if (current MB is not in the first MB row and the
        transform of Block Y0 is 8x4 or 4x4) {
        - Filter first 8 pixels in row 2 and 4 of Y.
        - Filter first 8 pixels in row 3 and 5 of Y.
    }
        - Filter first 8 pixels in row 6 and 8 of Y.
        - Filter first 8 pixels in row 7 and 9 of Y.
    // Block Y1
        if (current MB is not in the first MB row and the
            transform of Block Y1 is 8x4 or 4x4) {
            - Filter last 8 pixels in row 2 and 4 of Y.
            - Filter last 8 pixels in row 3 and 5 of Y.
    }
        - Filter last 8 pixels in row 6 and 8 of Y.
        - Filter last 8 pixels in row 7 and 9 of Y.
        // Block Y2
    if (current MB is not in the last MB row and the
            transform of Block Y2 is 8x4 or 4x4) {
            - Filter first 8 pixels in row 10 and 12 of Y.
            - Filter first 8 pixels in row 11 and 13 of Y.
    }
    if (current MB is not in the last MB row) {
            - Filter first 8 pixels in row 14 and 16 of Y.
            - Filter first 8 pixels in row 15 and 17 of Y.
    }
        // Block Y3
    if (current MB is not in the last MB row and the
            transform of Block Y3 is 8x4 or 4x4) {
            - Filter last 8 pixels in row 10 and 12 of Y.
            - Filter last 8 pixels in row 11 and 13 of Y.
    }
    if (current MB is not in the last MB row) {
            - Filter last 8 pixels in row 14 and 16 of Y.
            - Filter last 8 pixels in row 15 and 17 of Y.
    }
```

Figure 31B

3100

```
} else {
    // Block Y0
    if (the transform of Block Y0 is 8x4 or 4x4) {
        - Filter first 8 pixels in row 6 and 8 of Y.
    }
    if (current MB is not in the last MB row) {
        - Filter first 8 pixels in row 14 and 16 of Y.
    }

// Block Y1
    if (the transform of Block Y1 is 8x4 or 4x4) {
        - Filter last 8 pixels in row 6 and 8 of Y.
    }
    if (current MB is not in the last MB row) {
        - Filter last 8 pixels in row 14 and 16 of Y.
    }
        // Block Y2
    if (the transform of Block Y2 is 8x4 or 4x4) {
        - Filter first 8 pixels in row 7 and 9 of Y.
    }
    if (current MB is not in the last MB row) {
        - Filter first 8 pixels in row 15 and 17 of Y.
    }
        // Block Y3
    if (the transform of Block Y3 is 8x4 or 4x4) {
        - Filter last 8 pixels in row 7 and 9 of Y.
    }
    if (current MB is not in the last MB row) {
        - Filter last 8 pixels in row 15 and 17 of Y.
    }
}
```

```
// Chroma
if (current MB is not in the first or last MB row and the
    transform used for the C_b block is 8x4 or 4x4) {
    - Filter all 8 pixels in row 2 and 4 of C_b.
    - Filter all 8 pixels in row 3 and 5 of C_b.
}
If (current MB is not in the last MB row) {
    - Filter all 8 pixels in row 6 and 8 of C_b.
    - Filter all 8 pixels in row 7 and 9 of C_b.
} if (current MB is not in the first or last MB row and the
    transform used for the C_r block is 8x4 or 4x4) {
    - Filter all 8 pixels in row 2 and 4 of C_r.
    - Filter all 8 pixels in row 3 and 5 of C_r.
}
If (current MB is not in the last MB row) {
    - Filter all 8 pixels in row 6 and 8 of C_r.
    - Filter all 8 pixels in row 7 and 9 of C_r.
}
```

```
// Vertical filtering of MB
// Luma
if (FIELDTX of current MB is FALSE) {
    // Block Y0
        if (the transform of Block Y0 is 4x8 or 4x4) {
            - Filter the 4 even numbered pixels of the
              first 8 pixels in column 3 and 4 of Y.
            - Filter the 4 odd numbered pixels of the
              first 8 pixels in column 3 and 4 of Y.
        }
    - Filter the 4 even numbered pixels of the
      first 8 pixels in column 7 and 8 of Y.
    - Filter the 4 odd numbered pixels of the
      first 8 pixels in column 7 and 8 of Y.
    // Block Y1
        if (the transform of Block Y1 is 4x8 or 4x4) {
            - Filter the 4 even numbered pixels of the
              first 8 pixels in column 11 and 12 of Y.
            - Filter the 4 odd numbered pixels of the
              first 8 pixels in column 11 and 12 of Y.
        }
    if (current MB is not in the last MB column) {
            - Filter the 4 even numbered pixels of the
              first 8 pixels in column 15 and 16 of Y.
            - Filter the 4 odd numbered pixels of the
              first 8 pixels in column 15 and 16 of Y.
    }
        // Block Y2
        if (the transform of Block Y2 is 4x8 or 4x4) {
            - Filter the 4 even numbered pixels of the
              last 8 pixels in column 3 and 4 of Y.
            - Filter the 4 odd numbered pixels of the
              last 8 pixels in column 3 and 4 of Y.
        }
    - Filter the 4 even numbered pixels of the
      last 8 pixels in column 7 and 8 of Y.
    - Filter the 4 odd numbered pixels of the
      last 8 pixels in column 7 and 8 of Y.
        // Block Y3
        if (the transform of Block Y3 is 4x8 or 4x4) {
            - Filter the 4 even numbered pixels of the
              last 8 pixels in column 11 and 12 of Y.
            - Filter the 4 odd numbered pixels of the
              last 8 pixels in column 11 and 12 of Y.
        }
    if (current MB is not in the last MB column) {
            - Filter the 4 even numbered pixels of the
              last 8 pixels in column 15 and 16 of Y.
            - Filter the 4 odd numbered pixels of the
              last 8 pixels in column 15 and 16 of Y.
    }
}
```

```
} else {
    // Block Y0
    if (the transform of Block Y0 is 4x8 or 4x4) {
        - Filter the 8 even numbered pixels
          in column 3 and 4 of Y.
    }
    - Filter the 8 even numbered pixels in column 7 and 8 of Y.
    // Block Y1
    if (the transform of Block Y1 is 4x8 or 4x4) {
        - Filter the 8 even numbered pixels
          in column 11 and 12 of Y.
    }
    if (current MB is not in the last MB column) {
        - Filter the 8 even numbered pixels
          in column 15 and 16 of Y.
    }
    // Block Y2
    if (the transform of Block Y2 is 4x8 or 4x4) {
        - Filter the 8 odd numbered pixels
          in column 3 and 4 of Y.
    }
    - Filter the 8 odd numbered pixels in column 7 and 8 of Y.
    // Block Y3
    if (the transform of Block Y3 is 4x8 or 4x4) {
        - Filter the 8 odd numbered pixels
          in column 11 and 12 of Y.
    }
    if (current MB is not in the last MB column) {
        - Filter the 8 odd numbered pixels
          in column 15 and 16 of Y.
    }
}
```

```
// Chroma
if (the transform of C_b Block is 4x8 or 4x4) {
    - Filter the 4 even numbered pixels
      in column 3 and 4 of C_b.
    - Filter the 4 odd numbered pixels
      in column 3 and 4 of C_b.
}
if (current MB is not in the last MB column) {
    - Filter the 4 even numbered pixels
      in column 7 and 8 of C_b.
    - Filter the 4 odd numbered pixels
      in column 7 and 8 of C_b.
} if (the transform of C_r Block is 4x8 or 4x4) {
    - Filter the 4 even numbered pixels
      in column 3 and 4 of C_r.
    - Filter the 4 odd numbered pixels
      in column 3 and 4 of C_r.
}
if (current MB is not in the last MB column) {
    - Filter the 4 even numbered pixels
      in column 7 and 8 of C_r.
    - Filter the 4 odd numbered pixels
      in column 7 and 8 of C_r.
}
```

Entry Point Layer Bitstream Syntax 3300

Frame Layer Interlace P-frame Bitstream Syntax 3500

Macroblock Layer Interlace P-frame Bitstream Syntax 3700

IN-LOOP DEBLOCKING FOR INTERLACED VIDEO

RELATED APPLICATION INFORMATION

This application claims the benefit of U.S. Provisional Patent Application No. 60/501,081, entitled "Video Encoding and Decoding Tools and Techniques," filed Sep. 7, 2003, which is hereby incorporated by reference.

TECHNICAL FIELD

Techniques and tools for interlaced video coding and decoding are described. For example, an encoder/decoder performs in-loop deblocking filtering for interlaced frame coded pictures.

BACKGROUND

Digital video consumes large amounts of storage and transmission capacity. A typical raw digital video sequence includes 15 or 30 pictures per second. Each picture can include tens or hundreds of thousands of pixels (also called pels). Each pixel represents a tiny element of the picture. In raw form, a computer commonly represents a pixel with 24 bits or more. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include "intra" compression and "inter" or predictive compression. For progressively scanned video frames, intra compression techniques compress individual pictures, typically called I-frames or key frames. Inter compression techniques compress frames with reference to preceding and/or following frames, and inter-compressed frames are typically called predicted frames, P-frames, or B-frames.

I. Inter and Intra Compression in Windows Media Video, Versions 8 and 9

Microsoft Corporation's Windows Media Video, Version 8 ["WMV8"] includes a video encoder and a video decoder. The WMV8 encoder uses intra and inter compression, and the WMV8 decoder uses intra and inter decompression. Windows Media Video, Version 9 ["WMV9"] uses a similar architecture for many operations.

A. Intra Compression

FIG. 1 illustrates block-based intra compression 100 of a block 105 of pixels in a key frame in the WMV8 encoder. A block is a set of pixels, for example, an 8×8 arrangement of pixels. The WMV8 encoder splits a key video frame into 8×8 blocks of pixels and applies an 8×8 Discrete Cosine Transform ["DCT"] 110 to individual blocks such as the block 105. A DCT is a type of frequency transform that converts the 8×8 block of pixels (spatial information) into an 8×8 block of DCT coefficients 115, which are frequency information. The DCT operation itself is lossless or nearly lossless. Compared to the original pixel values, however, the DCT coefficients are more efficient for the encoder to compress since most of the significant information is concentrated in low frequency coefficients (conventionally, the upper left of the block 115) and many of the high frequency coefficients (conventionally, the lower right of the block 115) have values of zero or close to zero.

The encoder then quantizes 120 the DCT coefficients, resulting in an 8×8 block of quantized DCT coefficients 125. For example, the encoder applies a uniform, scalar quantization step size to each coefficient. Quantization is lossy. Since low frequency DCT coefficients tend to have higher values, quantization results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients 125 for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient 126 as a differential from the DC coefficient 136 of a neighboring 8×8 block, which is a previously encoded neighbor (e.g., top or left) of the block being encoded. (FIG. 1 shows a neighbor block 135 that is situated to the left of the block being encoded in the frame.) The encoder entropy encodes 140 the differential.

The entropy encoder can encode the left column or top row of AC coefficients as a differential from a corresponding column or row of the neighboring 8×8 block. FIG. 1 shows the left column 127 of AC coefficients encoded as a differential 147 from the left column 137 of the neighboring (to the left) block 135. The differential coding increases the chance that the differential coefficients have zero values. The remaining AC coefficients are from the block 125 of quantized DCT coefficients.

The encoder scans 150 the 8×8 block 145 of predicted, quantized AC DCT coefficients into a one-dimensional array 155 and then entropy encodes the scanned AC coefficients using a variation of run length coding 160. The encoder selects an entropy code from one or more run/level/last tables 165 and outputs the entropy code.

B. Inter Compression

Inter compression in the WMV8 encoder uses block-based motion compensated prediction coding followed by transform coding of the residual error. FIGS. 2 and 3 illustrate the block-based inter compression for a predicted frame in the WMV8 encoder. In particular, FIG. 2 illustrates motion estimation for a predicted frame 210 and FIG. 3 illustrates compression of a prediction residual for a motion-compensated block of a predicted frame.

For example, in FIG. 2, the WMV8 encoder computes a motion vector for a macroblock 215 in the predicted frame 210. To compute the motion vector, the encoder searches in a search area 235 of a reference frame 230. Within the search area 235, the encoder compares the macroblock 215 from the predicted frame 210 to various candidate macroblocks in order to find a candidate macroblock that is a good match. The encoder outputs information specifying the motion vector (entropy coded) for the matching macroblock.

The encoder can encode the differential between the motion vector and the motion vector predictor. After reconstructing the motion vector by adding the differential to the predictor, a decoder uses the motion vector to compute a prediction macroblock for the macroblock 215 using information from the reference frame 230, which is a previously reconstructed frame available at the encoder and the decoder. The prediction is rarely perfect, so the encoder usually encodes blocks of pixel differences (also called the error or residual blocks) between the prediction macroblock and the macroblock 215 itself.

FIG. 3 illustrates an example of computation and encoding of an error block 335 in the WMV8 encoder. The error block 335 is the difference between the predicted block 315 and the original current block 325. The encoder applies a DCT 340 to the error block 335, resulting in an 8×8 block 345 of coefficients. The encoder then quantizes 350 the DCT coefficients, resulting in an 8×8 block of quantized DCT coefficients 355. The encoder scans 360 the 8×8 block 355 into a one-dimensional array 365 such that coefficients are generally ordered from lowest frequency to highest frequency. The encoder entropy encodes the scanned coefficients using a variation of run length coding 370. The encoder selects an entropy code from one or more run/level/last tables 375 and outputs the entropy code.

FIG. 4 shows an example of a corresponding decoding process 400 for an inter-coded block. In summary of FIG. 4, a decoder decodes (410, 420) entropy-coded information representing a prediction residual using variable length decoding 410 with one or more run/level/last tables 415 and run length decoding 420. The decoder inverse scans 430 a one-dimensional array 425 storing the entropy-decoded information into a two-dimensional block 435. The decoder inverse quantizes and inverse discrete cosine transforms (together, 440) the data, resulting in a reconstructed error block 445. In a separate motion compensation path, the decoder computes a predicted block 465 using motion vector information 455 for displacement from a reference frame. The decoder combines 470 the predicted block 465 with the reconstructed error block 445 to form the reconstructed block 475.

The amount of change between the original and reconstructed frames is the distortion and the number of bits required to code the frame indicates the rate for the frame. The amount of distortion is roughly inversely proportional to the rate.

II. Interlaced Video and Progressive Video

A video frame contains lines of spatial information of a video signal. For progressive video, these lines contain samples starting from one time instant and continuing through successive lines to the bottom of the frame. A progressive I-frame is an intra-coded progressive video frame. A progressive P-frame is a progressive video frame coded using forward prediction, and a progressive B-frame is a progressive video frame coded using bi-directional prediction.

A typical interlaced video frame consists of two fields scanned starting at different times. For example, referring to FIG. 5, an interlaced video frame 500 includes top field 510 and bottom field 520. Typically, the even-numbered lines (top field) are scanned starting at one time (e.g., time t) and the odd-numbered lines (bottom field) are scanned starting at a different (typically later) time (e.g., time t+1). This timing can create jagged tooth-like features in regions of an interlaced video frame where motion is present when the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

A previous WMV encoder and decoder use macroblocks that are arranged according to a field structure (field-coded macroblocks) or a frame structure (frame-coded macroblocks) in interlaced video frames. FIG. 6 shows how field permuting is used to produce field-coded macroblocks in the encoder and decoder. An interlaced macroblock 610 is permuted such that all the top field lines (e.g., even-numbered lines 0, 2, . . . 14) are placed in the top half of the field-coded macroblock 620, and all the bottom field lines (e.g., odd-numbered lines 1, 3, . . . 15) are placed in the bottom half of the field-coded macroblock. For a frame-coded macroblock, the top field lines and bottom field lines alternate throughout the macroblock, as in interlaced macroblock 610.

The encoder and decoder use a 4:1:1 macroblock format in interlaced frames. A 4:1:1 macroblock is composed of four 8×8 luminance blocks and two 4×8 blocks of each chrominance channel. In a field-coded 4:1:1 macroblock, the permuted macroblock is subdivided such that the top two 8×8 luminance blocks and the top 4×8 chrominance block in each chrominance channel contain only top field lines, while the bottom two 8×8 luminance blocks and the bottom 4×8 chrominance block in each chrominance channel contain only bottom field lines.

A typical progressive video frame consists of one frame of content with non-alternating lines. In contrast to interlaced video, progressive video does not divide video frames into separate fields, and an entire frame is scanned left to right, top to bottom starting at a single time.

II. Loop Filtering in a Previous WMV Encoder and Decoder

Quantization and other lossy processing of prediction residuals can cause blocking artifacts at block boundaries. Blocking artifacts can be especially troublesome in reference frames that are used for motion estimation and compensation of subsequent predicted frames. To reduce blocking artifacts, a previous WMV video encoder and decoder use a deblocking filter to smooth boundary discontinuities between 8×8 blocks in motion estimation/compensation loops. For example, a video encoder processes a reconstructed reference frame to reduce blocking artifacts prior to motion estimation/compensation using the reference frame, and a video decoder processes a reconstructed reference frame to reduce blocking artifacts prior to motion compensation using the reference frame. The deblocking filter improves the quality of motion estimation/compensation, resulting in better prediction and lower bitrate for prediction residuals.

A. In-loop Deblocking Filtering for Progressive Frames

The encoder and decoder perform in-loop deblocking filtering for progressive frames prior to using a reconstructed frame as a reference for motion estimation/compensation. The filtering process operates on pixels (or more precisely, on samples at pixel locations) that border neighboring blocks. The locations of block boundaries depend on the size of the inverse transform used. For progressive P-frames the block boundaries may occur at every 4th or 8th pixel row or column depending on whether an 8×8, 8×4 or 4×8 inverse transform is used. For progressive I-frames, where an 8×8 transform is used, block boundaries occur at every 8th pixel row and column.

1. Progressive I-Frame In-Loop Deblocking Filtering

For progressive I-frames, deblocking filtering is performed adaptively at all 8×8 block boundaries. FIGS. 7 and 8 show the pixels that are filtered along the horizontal and vertical border regions in the upper left corner of a component (luma, $C_b$ or $C_r$) plane. FIG. 7 shows filtered vertical block boundary pixels in an I-frame. FIG. 8 shows filtered horizontal block boundary pixels in an I-frame.

In FIGS. 7 and 8, crosses represent pixels (actually samples for pixels) and circled crosses represent filtered pixels. As these figures show, the top horizontal line and first vertical line in the frame are not filtered, even though they lie on a block boundary, because these lines lie on the border of the frame. Although not depicted, the bottom horizontal line and last vertical line in the frame also are not filtered for the same reason. In more formal terms, the following lines are filtered:

Horizontal lines: (7, 8), (15, 16) ... ((N−1)*8−1, (N−1)*8)
Vertical lines: (7, 8), (15, 16) ... ((M−1)*8−1, (M−1)*8)
(N=number of horizontal 8×8 blocks in the plane (N*8=horizontal frame size))
(M=number of vertical 8×8 blocks in the frame (M*8=vertical frame size))

For progressive I-frames, all horizontal boundary lines in the frame are filtered first, followed by the vertical boundary lines.

2. Progressive P-frame In-loop Deblocking Filtering

For progressive P-frames, blocks can be intra or inter-coded. The encoder and decoder use an 8×8 transform to transform the samples in intra-coded blocks, and the 8×8 block boundaries are always adaptively filtered. The encoder and decoder use an 8×8, 8×4, 4×8 or 4×4 transform for inter-coded blocks and a corresponding inverse transform to construct the samples that represent the residual error. Depending on the status of the neighboring blocks, the boundary between the current and neighboring blocks may or may not be adaptively filtered. The boundaries between coded (at least one non-zero coefficient) subblocks (8×4, 4×8 or 4×4) within an 8×8 block are always adaptively filtered. The boundary between a block or subblock and a neighboring block or subblock is not filtered only if both blocks are inter-coded, have the same motion vector, and have no residual error (no transform coefficients), otherwise the boundary is filtered.

FIG. 9 shows examples of when filtering between neighboring blocks does and does not occur in progressive P-frames. In FIG. 9, it is assumed that the motion vectors for both blocks are the same (if the motion vectors are different, the boundary is always filtered). The shaded blocks or subblocks represent the cases where at least one nonzero coefficient is present. Clear blocks or subblocks represent cases where no transform coefficients are present. Thick lines represent the boundaries that are adaptively filtered. Thin lines represent the boundaries that are not filtered. FIG. 9 illustrates only horizontal macroblock neighbors, but a previous WMV encoder and decoder applies similar rules to vertical neighbors.

FIGS. 10 and 11 show an example of pixels that may be filtered in a progressive P-frame. The crosses represent pixel locations and the circled crosses represent the boundary pixels that are adaptively filtered if the conditions specified above are met. FIG. 10 shows pixels filtered along horizontal boundaries. As FIG. 10 shows, the pixels on either side of the block or subblock boundary are candidates to be filtered. For the horizontal boundaries, this could be every $4^{th}$ and $5^{th}$, $8^{th}$ and $9^{th}$, $12^{th}$ and $13^{th}$, etc., pixel row in the frame. FIG. 11 shows candidate pixels to be filtered along vertical boundaries. For the vertical boundaries, every $4^{th}$ and $5^{th}$, $8^{th}$ and $9^{th}$, $12^{th}$ and $13^{th}$, etc., pixel column in the frame may be adaptively filtered as these are the 8×8 and 4×8 vertical boundaries. The first and last row and the first and last column in the frame are not filtered.

All the 8×8 block horizontal boundary lines in the frame are adaptively filtered first, starting from the top line. Next, all 8×4 block horizontal boundary lines in the frame are adaptively filtered starting from the top line. Next, all 8×8 block vertical boundary lines are adaptively filtered starting from the leftmost line. Lastly, all 4×8 block vertical boundary lines are adaptively filtered starting with the leftmost line. The rules specified above are used to determine whether the boundary pixels are actually filtered for each block or subblock.

3. Filtering Operations

For progressive P-frames the decision criteria described above determine which vertical and horizontal boundaries are adaptively filtered. Since the minimum number of consecutive pixels that are filtered in a row or column is four and the total number of pixels in a row or column is always a multiple of four, the filtering operation is performed on segments of four pixels.

For example, if the eight pixel pairs that make up the vertical boundary between two blocks are adaptively filtered, then the eight pixels are divided into two 4-pixel segments as shown in FIG. 12. In each 4-pixel segment, the third pixel pair is adaptively filtered first as indicated by the Xs in FIG. 12. The result of this adaptive filter operation determines whether the other three pixels in the segment are also filtered.

FIG. 13 shows the pixels that are used in the adaptive filtering operation performed on the $3^{rd}$ pixel pair. In FIG. 13, pixels P4 and P5 are the pixel pair that may be changed in the filter operation.

The pseudo-code 1400 of FIG. 14 shows the adaptive filtering operation performed on the $3^{rd}$ pixel pair in each segment. The value filter_other_3_pixels indicates whether the remaining three pixel pairs in the segment are also filtered. If filter_other_3_pixels=TRUE, then the other three pixel pairs are adaptively filtered. If filter_other_3_pixels=FALSE, then they are not filtered, and the adaptive filtering operation proceeds to the next 4-pixel segment. The pseudo-code 1500 of FIG. 15 shows the adaptive filtering operation that is performed on the $1^{st}$, $2^{nd}$ and $4^{th}$ pixel pair if filter_other_3_pixels=TRUE. In pseudo-code 1400 and pseudo-code 1500, the variable PQUANT represents a quantization step size.

The filtering operations described above are similarly used for filtering horizontal boundary pixels.

D. In-loop Deblocking Filtering for Interlaced Frames

The encoder and decoder perform in-loop deblocking filtering across vertical boundaries in interlaced frames having a 4:1:1 macroblock format. For interlaced I- and P-frames, adaptive filtering can occur for pixels located immediately on the left and right of a vertical block boundary except for those located on the picture boundaries (i.e., the first and last column of the luminance and chrominance components). In FIG. 16, pixels (more precisely, samples) that are candidates for filtering in a typical 4:1:1 macroblock in the encoder and decoder are marked M or B, where M denotes boundary pixels located across macroblock boundaries and B denotes boundary pixels located within the macroblock.

The decision on whether to filter across a vertical boundary is made on a block-by-block basis. In a 4:1:1 frame-coded macroblock, each block contains eight consecutive alternating lines of the top and bottom fields in the macroblock. In a 4:1:1 field-coded macroblock, a block contains either eight top field lines or eight bottom field lines. The filtering decision is made eight lines at a time.

The decision to filter across a vertical block boundary depends on whether the current block and the left neighboring block are frame-coded or field-coded (field/frame type), whether they are intra-coded or inter-coded, and whether they have nonzero transform coefficients. In general, the vertical block boundary pixels are adaptively filtered unless the current block's field/frame type is the same as the left neighboring block's field/frame type, both blocks are not intra-coded, and both have no nonzero transform coefficients, in which case the block boundary is not filtered. Chroma block boundaries are adaptively filtered if the corresponding luminance block boundaries are adaptively filtered. Horizontal boundaries are not filtered.

Although the encoder and decoder adaptively filter block boundaries depending in part on the field/frame type of the neighboring blocks, they do not take transform size into account when making filtering decisions in interlaced frames.

VI. Standards for Video Compression and Decompression

Several international standards relate to video compression and decompression. These standards include the Motion Picture Experts Group ["MPEG"] 1, 2, and 4 standards and the H.261, H.262 (another title for MPEG 2), H.263 and H.264 (also called JVT/AVC) standards from the International Telecommunication Union ["ITU"]. These standards specify aspects of video decoders and formats for compressed video information. Directly or by implication, they also specify certain encoder details, but other encoder details are not specified. These standards use (or support the use of) different combinations of intraframe and interframe decompression and compression.

A. Loop Filtering in the Standards

As in the previous WMV encoders and decoders, some international standards use deblocking filters to reduce the effect of blocking artifacts in reconstructed frames. The H.263 standard includes an optional deblocking filter mode in which a filter is applied across 8×8 block edge boundaries of decoded I- and P-frames (but not B-frames) to reduce blocking artifacts. Annex J of the H.263 standard describes an optional block edge filter within the coding loop in which filtering is performed on 8×8 block edges (referred to in H.263 as a deblocking edge filter). This filter affects the reconstructed pictures used for prediction of other pictures. The deblocking edge filter operates using a set of four clipped pixel values on a horizontal and/or vertical line, where two of the four values are in one block (e.g., the top block among neighboring top and bottom blocks) and the other two values are in another block (e.g., the bottom block among neighboring top and bottom blocks). Filtering across horizontal edges is performed before filtering across vertical edges to reduce rounding effects. This optional filtering mode can be signaled in the bitstream with a single bit in a field of a picture header.

According to draft JVT-d157 of the JVT/AVC video standard, deblocking filtering is performed on a macroblock basis. In interlaced frames, macroblocks are grouped into macroblock pairs (top and bottom). Macroblock pairs can be field-coded or frame-coded. In a frame-coded macroblock pair, the macroblock pair is decoded as two frame-coded macroblocks. In a field-coded macroblock pair, the top macroblock consists of the top-field lines in the macroblock pair, and the bottom macroblock consists of the bottom-field lines in the macroblock pair.

Sections 8.7 and 12.4.4 of draft JVT-d157 describe deblocking filtering. For frame-coded macroblock pairs, deblocking is performed on the frame samples, and if neighboring macroblock pair is a field macroblock pair, the neighboring field macroblock pair is converted into a frame macroblock pair before deblocking. For field-coded macroblock pairs, deblocking is performed on the field samples of the same field parity, and if a neighboring macroblock pair is a frame macroblock pairs, it is converted into a field macroblock pair before deblocking. For field-coded pictures, all decoding operations for the deblocking filter are based solely on samples within the current field. For luma filtering in a 16×16 macroblock with 16 4×4 blocks, the 16 samples of the four vertical edges of the 4×4 raster scan pattern are filtered beginning with the left edge, and the four horizontal edges are filtered beginning with the top edge. For chroma filtering, two edges of eight samples each are filtered in each direction. For additional detail, see JVT-d157.

B. Limitations of the Standards

These international standards are limited in several important ways. For example, H.263 does not describe loop filtering for interlaced video. Draft JVT-d157 of the JVT/AVC video standard describes loop filtering only for macroblock pairs in interlaced video, and does not describe, for example, loop filtering for an individual field-coded macroblock having a top field and a bottom field within the same macroblock, or loop filtering decisions for blocks or sub-blocks larger than 4×4.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for encoding and decoding interlaced video frames. Described embodiments implement one or more of the described techniques and tools including, but not limited to, the following:

In one aspect, an encoder/decoder obtains pixel data (e.g., chrominance or luminance samples) from one or more field lines (e.g., top field lines or bottom field lines) associated with a first block of a macroblock in an interlaced frame coded picture (e.g., interlaced I-frame, interlaced P-frame, interlaced B-frame, etc.) comprising plural macroblocks (e.g., 4:2:0 macroblocks). Each of the plural macroblocks has an equal number of top field lines and bottom field lines. The encoder/decoder obtains pixel data from one or more field lines associated with a second block in the picture and performs in-loop deblocking filtering across a boundary (e.g., a horizontal or vertical block boundary comprising at least one four-pixel segment) using the obtained pixel data. The in-loop deblocking filtering comprises filter operations performed on pixel data from field lines of same polarity only and can be described as field-based deblocking. Each of the plural macroblocks can be coded according to a field structure or a frame structure, which can be indicated by a transform type. The first block and the second block can each have a transform size selected from a group consisting of: 8×8, 8×4, 4×8, and 4×4.

In another aspect, an encoder/decoder obtains field/frame type information for a current macroblock in an interlaced frame coded picture. The encoder/decoder also obtains transform size information for plural blocks in the current macroblock. The encoder/decoder selects one or more boundaries for in-loop deblocking based at least in part on the transform size information and the field/frame type information. The encoder/decoder performs in-loop deblocking (e.g., field-based deblocking) on the selected boundaries. The field/frame transform type information indicates, for example, whether the current macroblock is coded according to a field structure or a frame structure. The selecting of one or more boundaries for in-loop deblocking can be further based on the picture type information (e.g., whether the interlaced frame coded picture is an interlaced I-frame, P-frame or B-frame).

In another aspect, an encoder/decoder obtains field/frame type information for a current macroblock, obtains transform size information for plural blocks in the macroblock, selects a boundary between a first block in the macroblock and a second block for in-loop deblocking based at least in part on the transform size information and the field/frame type information, obtains pixel data from one or more field lines associated with the first block and from one or more field lines associated with the second block, and performs in-loop deblocking across the boundary using the obtained pixel data. The in-loop deblocking comprises filtering operations performed on pixel data from field lines of same polarity only.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIG. 1 is a diagram showing block-based intraframe compression of an 8×8 block of pixels according to the prior art.

FIG. 2 is a diagram showing motion estimation in a video encoder according to the prior art.

FIG. 3 is a diagram showing block-based compression for an 8×8 block of prediction residuals in a video encoder according to the prior art.

FIG. 4 is a diagram showing block-based decompression for an 8×8 block of prediction residuals in a video decoder according to the prior art.

FIG. 5 is a diagram showing an interlaced frame according to the prior art.

FIG. 6 is a diagram showing field permuting of interlaced macroblocks according to the prior art.

FIG. 7 is a diagram showing filtered vertical block boundary pixels according to the prior art.

FIG. 8 is a diagram showing filtered horizontal block boundary pixels according to the prior art.

FIG. 9 is a diagram showing filtering between horizontally neighboring blocks in progressive P-frames according to the prior art.

FIG. 10 is a diagram showing filtered horizontal block boundary pixels in progressive P-frames according to the prior art.

FIG. 11 is a diagram showing filtered vertical block boundary pixels in progressive P-frames according to the prior art.

FIG. 12 is a diagram showing eight pixel pairs divided into two 4-pixel segments on the sides of the vertical boundary between two blocks for filtering in progressive frames according to the prior art.

FIG. 13 is a diagram showing pixels used in a filtering operation performed on the $3^{rd}$ pixel pair of a 4-pixel segment in progressive frames according to the prior art.

FIG. 14 is a code diagram showing pseudo-code for a filtering operation performed on the $3^{rd}$ pixel pair in a 4-pixel segment in progressive frames according to the prior art.

FIG. 15 is a code diagram showing pseudo-code for a filtering operation performed on the $1^{st}$, $2^{nd}$ and $4^{th}$ pixel pair in a 4-pixel segment in progressive frames according to the prior art.

FIG. 16 is a diagram showing pixels that are candidates for filtering in a 4:1:1 macroblock according to the prior art.

FIG. 24 is a code diagram showing pseudo-code for performing in-loop deblocking filtering by processing horizontal boundaries followed by vertical boundaries.

FIGS. 27A-27B are diagrams showing loop filtering of luminance blocks in an interlaced field transform coded macroblock.

FIGS. 30A-30B are code diagrams showing pseudo-code for horizontal filtering and vertical filtering, respectively, in a macroblock in an interlaced I-frame.

FIGS. 31A-31C are code diagrams showing pseudo-code for horizontal filtering for luma and chroma blocks in a macroblock in an interlaced P-frame or B-frame.

FIGS. 32A-32C are code diagrams showing pseudo-code for vertical filtering for luma and chroma blocks, respectively, in a macroblock in an interlaced P-frame or B-frame.

DETAILED DESCRIPTION

The present application relates to techniques and tools for efficient compression and decompression of interlaced video. In various described embodiments, a video encoder and decoder incorporate techniques for encoding and decoding interlaced video, and corresponding signaling techniques for use with a bit stream format or syntax comprising different layers or levels (e.g., sequence level, frame level, field level, macroblock level, and/or block level).

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used. Further, techniques and tools described with reference to forward prediction may also be applicable to other types of prediction.

The various techniques and tools can be used in combination or independently. Different embodiments implement one or more of the described techniques and tools. Some techniques and tools described herein can be used in a video encoder or decoder, or in some other system not specifically limited to video encoding or decoding.

I. Computing Environment

Figure 17:
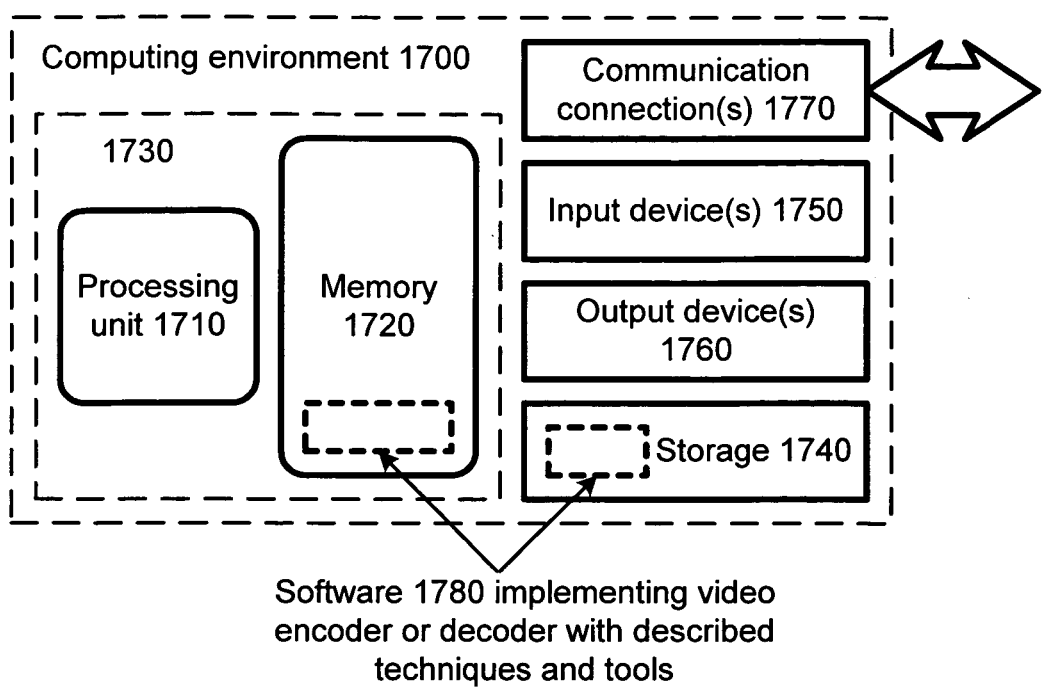
FIG. 17 is a block diagram of a suitable computing environment in conjunction with which several described embodiments may be implemented.

FIG. 17 illustrates a generalized example of a suitable computing environment 1700 in which several of the described embodiments may be implemented. The computing environment 1700 is not intended to suggest any limitation as to scope of use or functionality, as the techniques and tools may be implemented in diverse general-purpose or special-purpose computing environments.

With reference to FIG. 17, the computing environment 1700 includes at least one processing unit 1710 and memory 1720. In FIG. 17, this most basic configuration 1730 is included within a dashed line. The processing unit 1710 executes computer-executable instructions and may be a real or a virtual processor. In a multi-processing system, multiple processing units execute computer-executable instructions to increase processing power. The memory 1720 may be volatile memory (e.g., registers, cache, RAM), non-volatile memory (e.g., ROM, EEPROM, flash memory, etc.), or some combination of the two. The memory 1720 stores software 1780 implementing a video encoder or decoder with one or more of the described techniques and tools.

A computing environment may have additional features. For example, the computing environment 1700 includes storage 1740, one or more input devices 1750, one or more output devices 1760, and one or more communication connections 1770. An interconnection mechanism (not shown) such as a bus, controller, or network interconnects the components of the computing environment 1700. Typically, operating system software (not shown) provides an operating environment for other software executing in the computing environment 1700, and coordinates activities of the components of the computing environment 1700.

The storage 1740 may be removable or non-removable, and includes magnetic disks, magnetic tapes or cassettes, CD-ROMs, DVDs, or any other medium which can be used to store information and which can be accessed within the computing environment 1700. The storage 1740 stores instructions for the software 1780 implementing the video encoder or decoder.

The input device(s) 1750 may be a touch input device such as a keyboard, mouse, pen, or trackball, a voice input device, a scanning device, or another device that provides input to the computing environment 1700. For audio or video encoding, the input device(s) 1750 may be a sound card, video card, TV tuner card, or similar device that accepts audio or video input in analog or digital form, or a CD-ROM or CD-RW that reads audio or video samples into the computing environment 1700. The output device(s) 1760 may be a display, printer, speaker, CD-writer, or another device that provides output from the computing environment 1700.

The communication connection(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 1700, computer-readable media include memory 1720, storage 1740, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "decide," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 18:
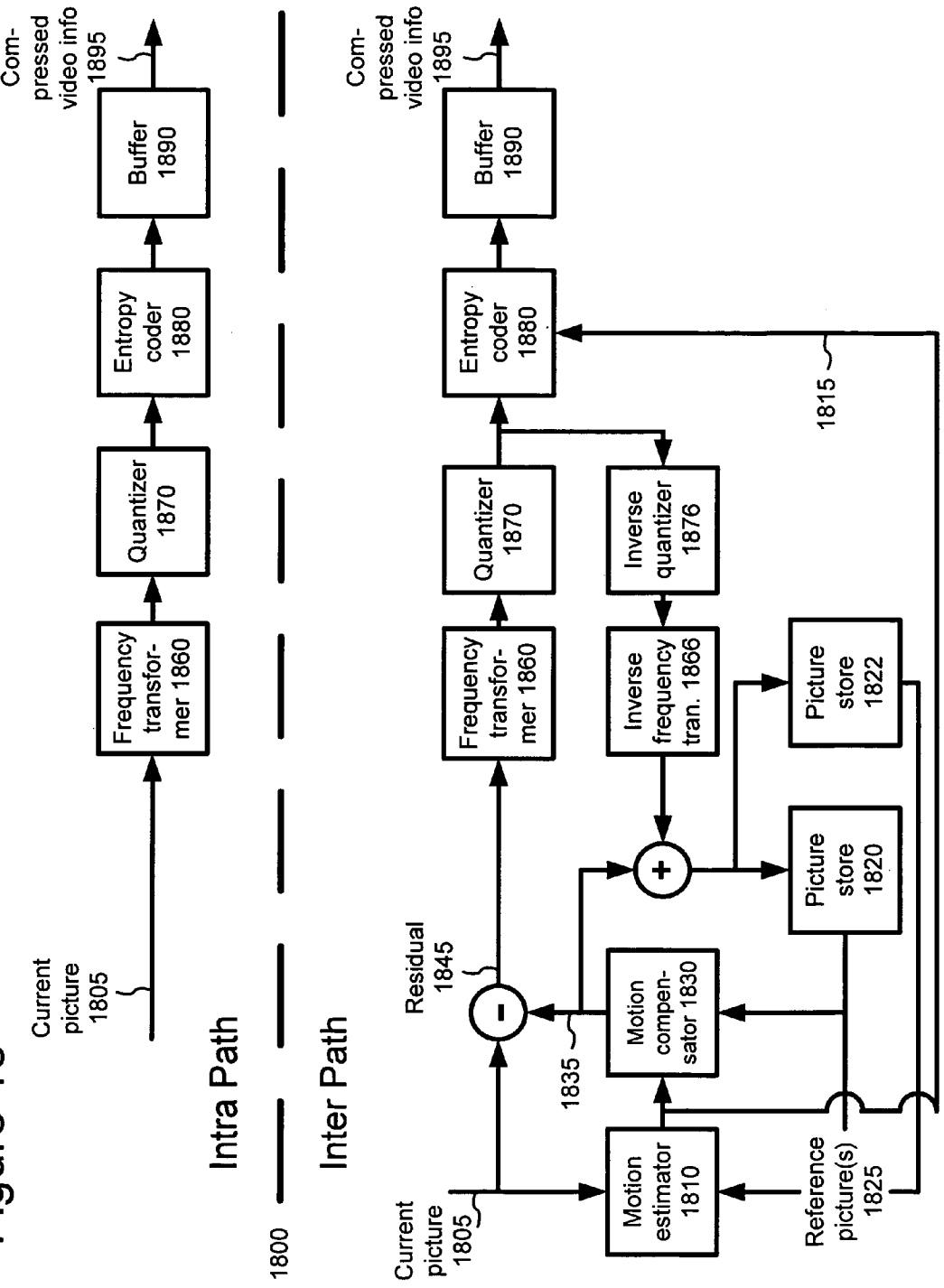
FIG. 18 is a block diagram of a generalized video encoder system in conjunction with which several described embodiments may be implemented.
Figure 19:
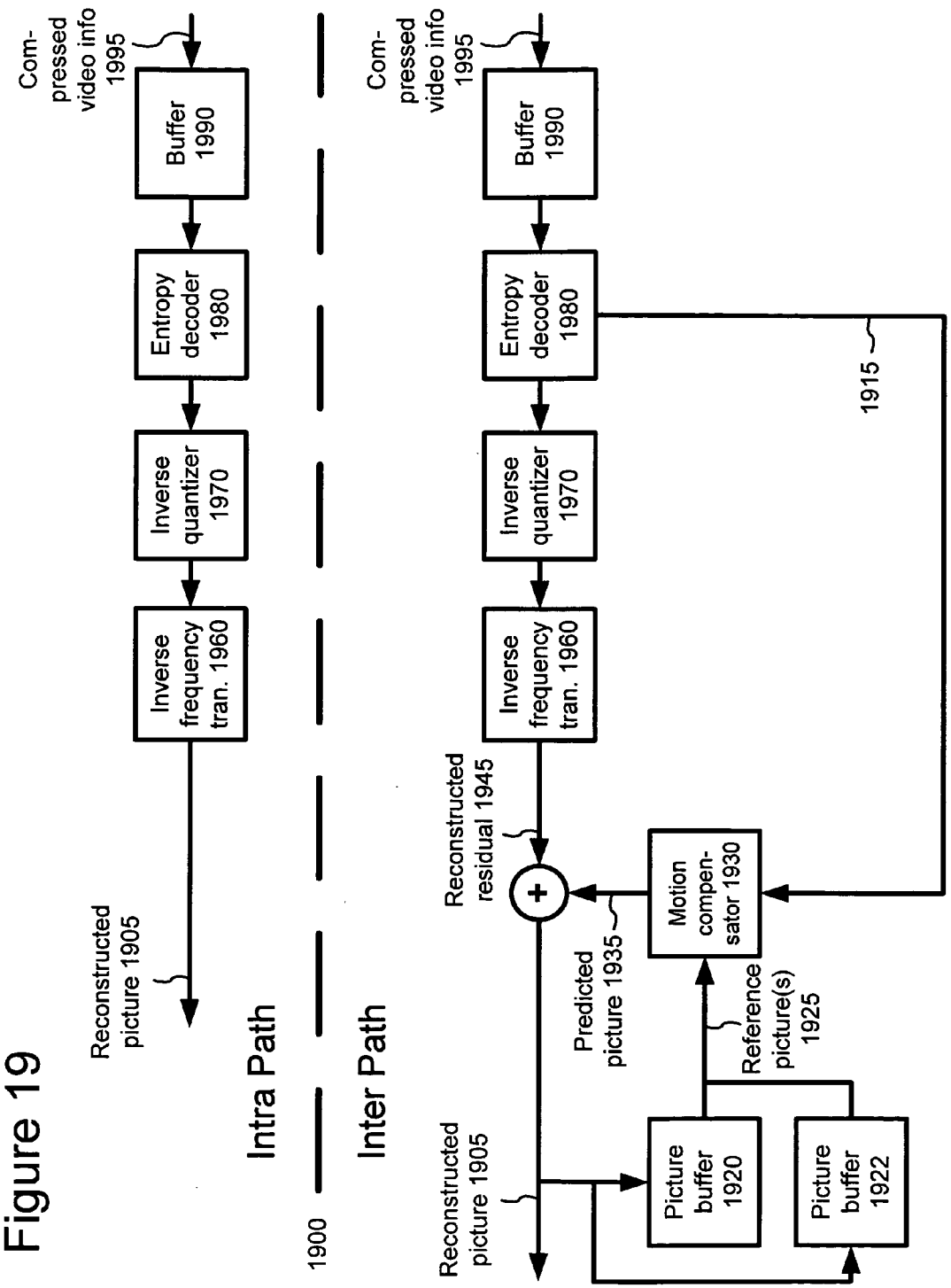
FIG. 19 is a block diagram of a generalized video decoder system in conjunction with which several described embodiments may be implemented.

FIG. 18 is a block diagram of a generalized video encoder 1800 in conjunction with which some described embodiments may be implemented. FIG. 19 is a block diagram of a generalized video decoder 1900 in conjunction with which some described embodiments may be implemented.

The relationships shown between modules within the encoder 1800 and decoder 1900 indicate general flows of information in the encoder and decoder; other relationships are not shown for the sake of simplicity. In particular, FIGS. 18 and 19 usually do not show side information indicating the encoder settings, modes, tables, etc. used for a video sequence, picture, macroblock, block, etc. Such side information is sent in the output bitstream, typically after entropy encoding of the side information. The format of the output bitstream can be a Windows Media Video version 9 format or other format.

The encoder 1800 and decoder 1900 process video pictures, which may be video frames, video fields or combinations of frames and fields. The bitstream syntax and semantics at the picture and macroblock levels may depend on whether frames or fields are used. There may be changes to macroblock organization and overall timing as well. The encoder 1800 and decoder 1900 are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in more detail below. Alternatively, the encoder 1800 and decoder 1900 are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder 1800 and decoder 1900 process video frames organized as follows. A frame contains lines of spatial information of a video signal. For progressive video, these lines contain samples starting from one time instant and continuing through successive lines to the bottom of the frame. A progressive video frame is divided into macroblocks such as the macroblock 2000 shown in FIG. 20. The macroblock 2000 includes four 8×8 luminance blocks (Y0 through Y3) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Figure 21A:
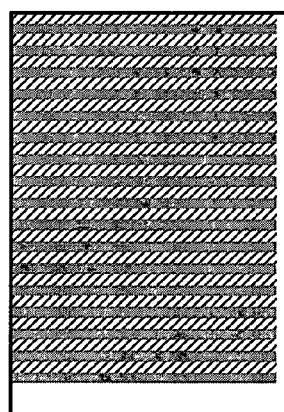
FIG. 21A is a diagram of part of an interlaced video frame, showing alternating lines of a top field and a bottom field.

An interlaced video frame consists of two scans of a frame—one comprising the even lines of the frame (the top field) and the other comprising the odd lines of the frame (the bottom field). The two fields may represent two different time periods or they may be from the same time period. FIG. 21A shows part of an interlaced video frame 2100, including the alternating lines of the top field and bottom field at the top left part of the interlaced video frame 2100.

Figure 20:
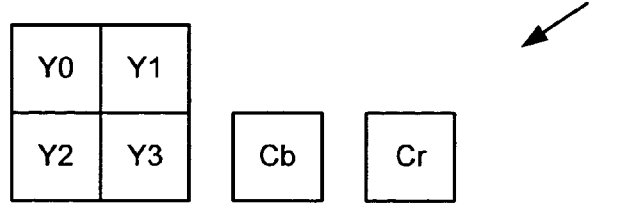
FIG. 20 is a diagram of a macroblock format used in several described embodiments.
Figure 21B:
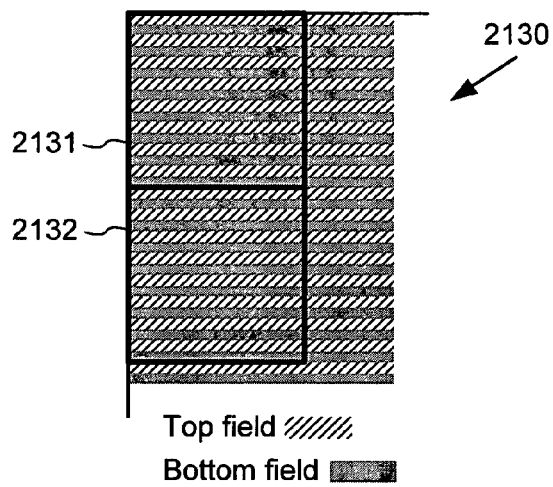
FIG. 21B is a diagram of the interlaced video frame organized for encoding/decoding as a frame.

FIG. 21B shows the interlaced video frame 2100 of FIG. 21A organized for encoding/decoding as a frame 2130. The interlaced video frame 2100 has been partitioned into macroblocks such as the macroblocks 2131 and 2132, which use a 4:2:0 format as shown in FIG. 20. In the luminance plane, each macroblock 2131, 2132 includes 8 lines from the top field alternating with 8 lines from the bottom field for 16 lines total, and each line is 16 pixels long. (The actual organization and placement of luminance blocks and chrominance blocks within the macroblocks 2131, 2132 are not shown, and in fact may vary for different encoding decisions.) Within a given macroblock, the top-field information and bottom-field information may be coded jointly or separately at any of various phases. The macroblock itself may be field transform coded or frame transform coded. Field and frame transform coding for macroblocks is described in further detail below.

An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P- and B-frames may include intra-coded macroblocks as well as different types of predicted macroblocks. Interlaced BI-frames are a hybrid of interlaced I-frames and interlaced B-frames; they are intra-coded, but are not used as anchors for other frames.

Figure 21C:
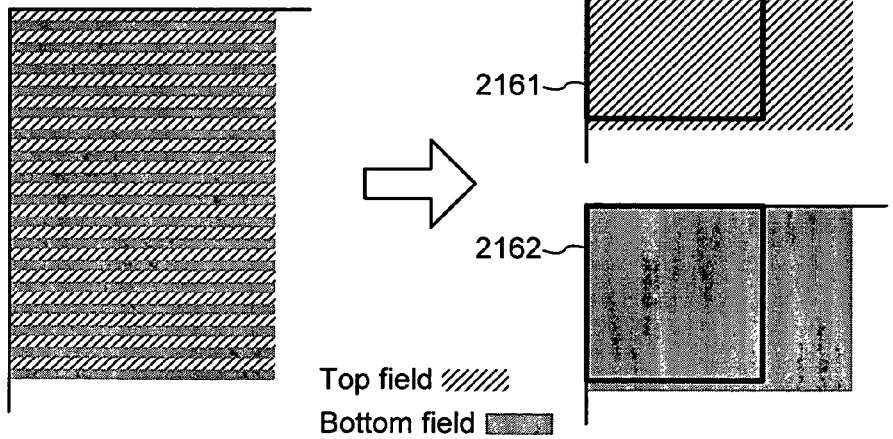
FIG. 21C is a diagram of the interlaced video frame organized for encoding/decoding as fields.

FIG. 21C shows the interlaced video frame 2100 of FIG. 21A organized for encoding/decoding as fields 2160. Each of the two fields of the interlaced video frame 2100 is partitioned into macroblocks. The top field is partitioned into macroblocks such as the macroblock 2161, and the bottom field is partitioned into macroblocks such as the macroblock 2162. (Again, the macroblocks use a 4:2:0 format as shown in FIG. 20, and the organization and placement of luminance blocks and chrominance blocks within the macroblocks are not shown.) In the luminance plane, the macroblock 2161 includes 16 lines from the top field and the macroblock 2162 includes 16 lines from the bottom field, and each line is 16 pixels long. An interlaced I-field is a single, separately represented field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks. Interlaced BI-fields are a hybrid of interlaced I-fields and interlaced B-fields; they are intra-coded, but are not used as anchors for other fields.

Interlaced video frames organized for encoding/decoding as fields can include various combinations of different field types. For example, such a frame can have the same field type in both the top and bottom fields or different field types in each field. In one implementation, the possible combinations of field types include I/I, I/P, P/I, P/P, B/B, B/BI, BI/B, and BI/BI.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

Alternatively, the encoder 1800 and decoder 1900 are object-based, use a different macroblock or block format, or perform operations on sets of pixels of different size or configuration than 8×8 blocks and 16×16 macroblocks.

B. Video Encoder

FIG. 18 is a block diagram of a generalized video encoder system 1800. The encoder system 1800 receives a sequence of video pictures including a current picture 1805 (e.g., progressive video frame, interlaced video frame, or field of an interlaced video frame), and produces compressed video information 1895 as output. Particular embodiments of video encoders typically use a variation or supplemented version of the generalized encoder 1800.

The encoder system 1800 compresses predicted pictures and key pictures. For the sake of presentation, FIG. 18 shows a path for key pictures through the encoder system 1800 and a path for predicted pictures. Many of the components of the encoder system 1800 are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture 1805 is a forward-predicted picture, a motion estimator 1810 estimates motion of macroblocks or other sets of pixels of the current picture 1805 with respect to one or more reference pictures, for example, the reconstructed previous picture 1825 buffered in the picture store 1820. If the current picture 1805 is a bi-directionally-predicted picture, a motion estimator 1810 estimates motion in the current picture 1805 with respect to up to four reconstructed reference pictures (for an interlaced B-field, for example). Typically, a motion estimator estimates motion in a B-picture with respect to one or more temporally previous reference pictures and one or more temporally future reference pictures. Accordingly, the encoder system 1800 can use the separate stores 1820 and 1822 for multiple reference pictures. For more information on progressive B-frames and interlaced B-frames and B-fields, see U.S. patent application Ser. No. 10/622,378, entitled, "Advanced Bi-Directional Predictive Coding of Video Frames," filed Jul. 18, 2003, and U.S. patent application Ser. No. 10/882,135, entitled, "Advanced Bi-Directional Predictive Coding of Interlaced Video," filed Jun. 29, 2004, which is hereby incorporated herein by reference.

The motion estimator 1810 can estimate motion by pixel, ½ pixel, ¼ pixel, or other increments, and can switch the precision of the motion estimation on a picture-by-picture basis or other basis. The motion estimator 1810 (and compensator 1830) also can switch between types of reference picture pixel interpolation (e.g., between bicubic and bilinear) on a per-frame or other basis. The precision of the motion estimation can be the same or different horizontally and vertically. The motion estimator 1810 outputs as side information motion information 1815 such as differential motion vector information. The encoder 1800 encodes the motion information 1815 by, for example, computing one or more predictors for motion vectors, computing differentials between the motion vectors and predictors, and entropy coding the differentials. To reconstruct a motion vector, a motion compensator 1830 combines a predictor with differential motion vector information.

The motion compensator 1830 applies the reconstructed motion vector to the reconstructed picture(s) 1825 to form a motion-compensated current picture 1835. The prediction is rarely perfect, however, and the difference between the motion-compensated current picture 1835 and the original current picture 1805 is the prediction residual 1845. During later reconstruction of the picture, the prediction residual 1845 is added to the motion compensated current picture 1835 to obtain a reconstructed picture that is closer to the original current picture 1805. In lossy compression, however, some information is still lost from the original current picture 1805. Alternatively, a motion estimator and motion compensator apply another type of motion estimation/compensation.

A frequency transformer 1860 converts the spatial domain video information into frequency domain (i.e., spectral) data. For block-based video pictures, the frequency transformer 1860 applies a DCT, variant of DCT, or other block transform to blocks of the pixel data or prediction residual data, producing blocks of frequency transform coefficients. Alternatively, the frequency transformer 1860 applies another conventional frequency transform such as a Fourier transform or uses wavelet or sub-band analysis. The frequency transformer 1860 may apply an 8×8, 8×4, 4×8, 4×4 or other size frequency transform.

A quantizer 1870 then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 1800 can use frame dropping, adaptive filtering, or other techniques for rate control.

The encoder 1800 may use special signaling for a skipped macroblock, which is a macroblock that has no information of certain types (e.g., no motion information for the macroblock and no residual information).

When a reconstructed current picture is needed for subsequent motion estimation/compensation, an inverse quantizer 1876 performs inverse quantization on the quantized spectral data coefficients. An inverse frequency transformer 1866 then performs the inverse of the operations of the frequency transformer 1860, producing a reconstructed prediction residual (for a predicted picture) or a reconstructed key picture. If the current picture 1805 was a key picture, the reconstructed key picture is taken as the reconstructed current picture (not shown). If the current picture 1805 was a predicted picture, the reconstructed prediction residual is added to the motion-compensated current picture 1835 to form the reconstructed current picture. One or both of the picture stores 1820, 1822 buffers the reconstructed current picture for use in motion compensated prediction. In some embodiments, the encoder applies a de-blocking filter to the reconstructed frame to adaptively smooth discontinuities and other artifacts in the picture.

The entropy coder 1880 compresses the output of the quantizer 1870 as well as certain side information (e.g., motion information 1815, quantization step size). Typical entropy coding techniques include arithmetic coding, differential coding, Huffman coding, run length coding, LZ coding, dictionary coding, and combinations of the above. The entropy coder 1880 typically uses different coding techniques for different kinds of information (e.g., DC coefficients, AC coefficients, different kinds of side information), and can choose from among multiple code tables within a particular coding technique.

The entropy coder 1880 provides compressed video information 1895 to the multiplexer ["MUX"] 1890. The MUX 1890 may include a buffer, and a buffer level indicator may be fed back to bit rate adaptive modules for rate control. Before or after the MUX 1890, the compressed video information 1895 can be channel coded for transmission over the network. The channel coding can apply error detection and correction data to the compressed video information 1895.

C. Video Decoder

FIG. 19 is a block diagram of a general video decoder system 1900. The decoder system 1900 receives information 1995 for a compressed sequence of video pictures and produces output including a reconstructed picture 1905 (e.g., progressive video frame, interlaced video frame, or field of an interlaced video frame). Particular embodiments of video decoders typically use a variation or supplemented version of the generalized decoder 1900.

The decoder system 1900 decompresses predicted pictures and key pictures. For the sake of presentation, FIG. 19 shows a path for key pictures through the decoder system 1900 and a path for forward-predicted pictures. Many of the components of the decoder system 1900 are used for decompressing both key pictures and predicted pictures. The exact operations performed by those components can vary depending on the type of information being decompressed.

A DEMUX 1990 receives the information 1995 for the compressed video sequence and makes the received information available to the entropy decoder 1980. The DEMUX 1990 may include a jitter buffer and other buffers as well. Before or after the DEMUX 1990, the compressed video information can be channel decoded and processed for error detection and correction.

The entropy decoder 1980 entropy decodes entropy-coded quantized data as well as entropy-coded side information (e.g., motion information 1915, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 1980 typically uses different decoding techniques for different kinds of information (e.g., DC coefficients, AC coefficients, different kinds of side information), and can choose from among multiple code tables within a particular decoding technique.

The decoder 1900 decodes the motion information 1915 by, for example, computing one or more predictors for motion vectors, entropy decoding differential motion vectors, and combining decoded differential motion vectors with predictors to reconstruct motion vectors.

A motion compensator 1930 applies motion information 1915 to one or more reference pictures 1925 to form a prediction 1935 of the picture 1905 being reconstructed. For example, the motion compensator 1930 uses one or more macroblock motion vector to find macroblock(s) in the reference picture(s) 1925. One or more picture stores (e.g., picture store 1920, 1922) store previous reconstructed pictures for use as reference pictures. Typically, B-pictures have more than one reference picture (e.g., at least one temporally previous reference picture and at least one temporally future reference picture). Accordingly, the decoder system 1900 can use separate picture stores 1920 and 1922 for multiple reference pictures. The motion compensator 1930 can compensate for motion at pixel, ½ pixel, ¼ pixel, or other increments, and can switch the precision of the motion compensation on a picture-by-picture basis or other basis. The motion compensator 1930 also can switch between types of reference picture pixel interpolation (e.g., between bicubic and bilinear) on a per-frame or other basis. The precision of the motion compensation can be the same or different horizontally and vertically. Alternatively, a motion compensator applies another type of motion compensation. The prediction by the motion compensator is rarely perfect, so the decoder 1900 also reconstructs prediction residuals.

An inverse quantizer 1970 inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, to reconstruct after a non-uniform, vector, or non-adaptive quantization, or directly inverse quantizes spatial domain data in a decoder system that does not use inverse frequency transformations.

An inverse frequency transformer 1960 converts the quantized, frequency domain data into spatial domain video information. For block-based video pictures, the inverse frequency transformer 1960 applies an inverse DCT ["IDCT"], variant of IDCT, or other inverse block transform to blocks of the frequency transform coefficients, producing pixel data or prediction residual data for key pictures or predicted pictures, respectively. Alternatively, the inverse frequency transformer 1960 applies another conventional inverse frequency transform such as an inverse Fourier transform or uses wavelet or sub-band synthesis. The inverse frequency transformer 1960 may apply an 8×8, 8×4, 4×8, 4×4, or other size inverse frequency transform.

For a predicted picture, the decoder 1900 combines the reconstructed prediction residual 1945 with the motion compensated prediction 1935 to form the reconstructed picture 1905. When the decoder needs a reconstructed picture 1905 for subsequent motion compensation, one or both of the picture stores (e.g., picture store 1920) buffers the reconstructed picture 1905 for use in predicting the next picture. In some embodiments, the decoder 1900 applies a de-blocking filter to the reconstructed picture to adaptively smooth discontinuities and other artifacts in the picture. Various techniques for in-loop deblocking filtering are described below.

III. Loop Filtering

Quantization and other lossy processing of prediction residuals can cause blocking artifacts at block boundaries. Blocking artifacts can be especially troublesome in reference frames that are used for motion estimation and compensation of subsequent predicted frames. To reduce blocking artifacts, a video encoder/decoder can use a deblocking filter to perform in-loop filtering across boundary rows and/or columns in the frame. For example, a video encoder/decoder processes a reconstructed reference frame to reduce blocking artifacts prior to motion estimation/compensation using the reference frame. With in-loop deblocking, a reference frame becomes a better reference candidate to encode the following frame. The deblocking filter improves the quality of motion estimation/compensation, resulting in better prediction and lower bitrate for prediction residuals.

Figure 22:
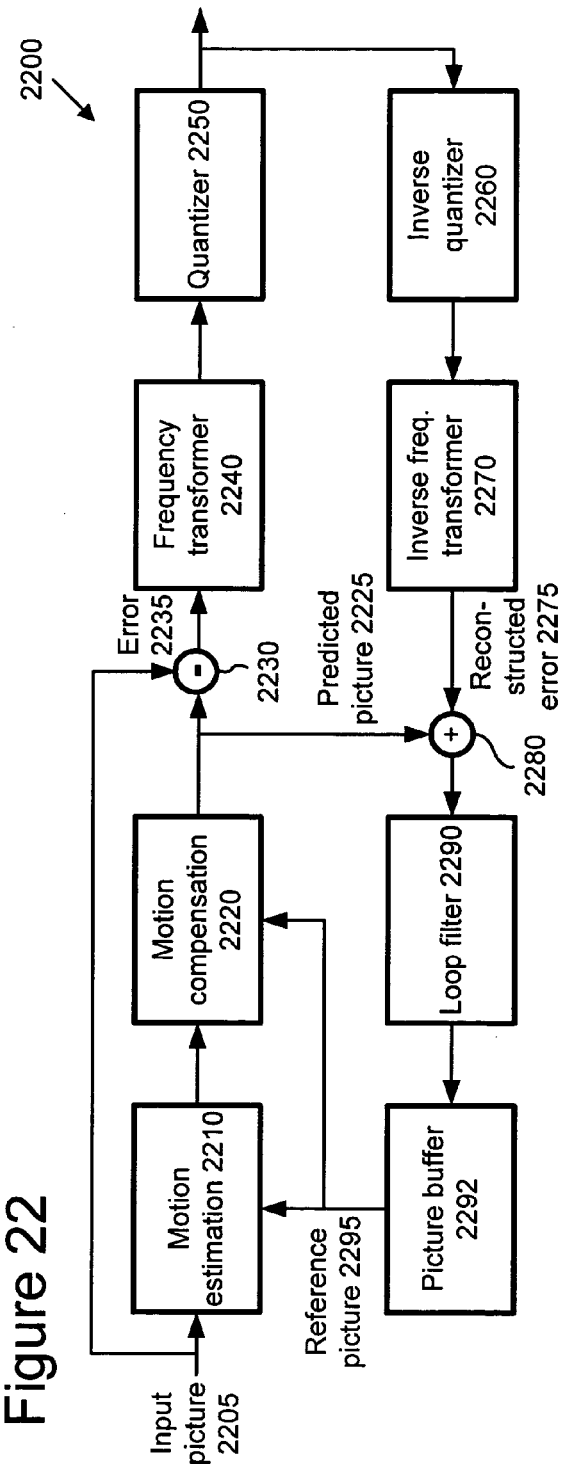
FIG. 22 is a diagram showing a motion estimation/compensation loop with an in-loop deblocking filter in a video encoder.

FIG. 22 shows a motion estimation/compensation loop 2200 in a video encoder that includes a deblocking filter. Motion estimation/compensation loop 2200 includes motion estimation 2210 and motion compensation 2220 of an input picture 2205. Motion estimation 2210 finds motion information for the input picture 2205 with respect to a reference picture 2295 (or pictures), which is typically a previously reconstructed intra- or inter-coded picture. Alternatively, the loop filter is applied to backward-predicted or bi-directionally-predicted pictures. Motion estimation 2210 produces motion information such as a set of one or more motion vectors for the input picture 2205. Motion compensation 2220 applies the motion information to the reference picture(s) 2295 to produce a predicted picture 2225. The prediction is rarely perfect, so the encoder computes 2230 the error or residual 2235 as the difference between the original input picture 2205 and the predicted picture 2225.

Frequency transformer 2240 frequency transforms the prediction residual 2235, and quantizer 2250 quantizes the frequency coefficients for the prediction residual 2235 before passing them to downstream components of the encoder. Inverse quantizer 2260 inverse quantizes the frequency coefficients of the prediction residual 2235, and inverse frequency transformer 2270 changes the prediction residual 2235 back to the spatial domain, producing a reconstructed error 2275 for the input picture 2205. The encoder combines 2280 the reconstructed error 2275 with the predicted picture 2225 to produce a reconstructed picture. The encoder applies the deblocking loop filter 2290 to the reconstructed picture and stores it in a picture buffer 2292 for use as a possible reference picture 2295 for the next input picture.

Figure 23:
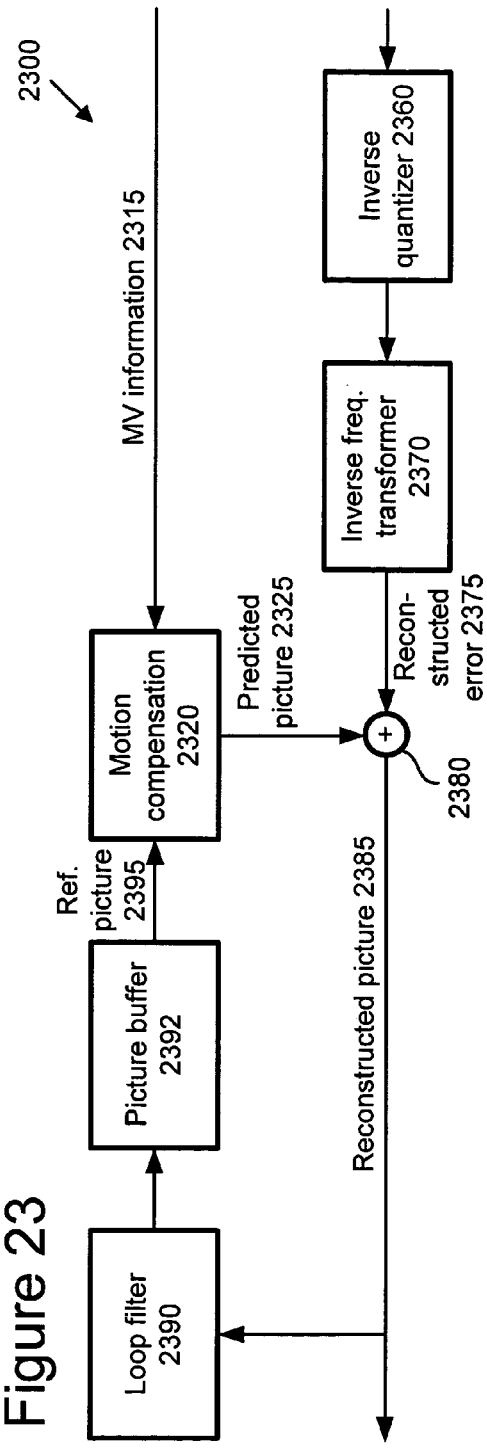
FIG. 23 is a diagram showing a motion compensation loop with an in-loop deblocking filter in a video decoder.

FIG. 23 shows a motion compensation loop 2300 in a video decoder that includes a deblocking filter. Motion compensation loop 2300 includes motion compensation 2320, which applies motion information 2315 received from the encoder to a reference picture 2395 (or pictures) to produce a predicted picture 2325. In a separate path, inverse quantizer 2360 inverse quantizes the frequency coefficients of a prediction residual, and inverse frequency transformer 2370 changes the prediction residual back to the spatial domain, producing a reconstructed error 2375.

The decoder combines 2380 the reconstructed error 2375 with the predicted picture 2325 to produce reconstructed picture 2385, which is output from the decoder. The decoder applies a deblocking loop filter 2390 to the reconstructed picture 2385 and stores the reconstructed picture in a picture buffer 2392 for use as a possible reference picture 2395 for the next input picture.

Alternatively, the arrangement or constituents of motion estimation/compensation loop 2200 or motion compensation loop in 2300 can be changed, but the encoder/decoder still applies the deblocking loop filter.

IV. Innovations in In-Loop Deblocking Filtering for Interlaced Video

Described embodiments include techniques and tools for performing in-loop deblocking filtering in interlace frame coded pictures (e.g., interlaced P-frames, interlaced B-frames, interlaced I-frames, etc.) to reduce blocking artifacts. Overall use/non-use of in-loop deblocking can be signaled, for example, at entry point level or sequence level in a bitstream, so as to indicate whether or not in-loop deblocking is enabled from the entry point or in the sequence.

In some implementations, 16×16 macroblocks are subdivided into 8×8 blocks, and each inter-coded block can be transform coded using an 8×8 transform, two 4×8 transforms, two 8×4 transforms, or four 4×4 transforms. Prior to block transform coding, an encoder/decoder can permute the macroblock in such a way that all the even lines (top field lines) of the macroblock are grouped at the top of the macroblock and all the odd lines (bottom field lines) are grouped at the bottom of the macroblock. The effect of the permutation on the macroblock is to make each 8×8 block inside the macroblock contain only information from one particular field. If the macroblock is permuted in this way, the macroblock is deemed to be field coded. If the macroblock is not permuted in this way, the macroblock is deemed to be frame coded.

Field coding shifts the location of the horizontal block boundaries on the final re-interlaced macroblock/frame. For example, when a macroblock is field coded with all 8×8 blocks, the internal 8×8 block boundary of the macroblock will be shifted to the top and bottom macroblock boundaries.

Furthermore, filtering lines of different fields together can lead to blurring and distortion due to the fact that different fields are scanned at different times.

Accordingly, described embodiments implement one or more techniques and tools for performing in-loop deblocking filtering in interlaced video including, but not limited to, the following:
1. Field based-in-loop deblocking filtering without filtering across field boundaries.
2. Identification of correct horizontal block boundaries according to field/frame coding type and transform size to ensure filtering of correct block transform boundaries.

The described techniques and tools can be used in combination with one another or with other techniques and tools, or can be used independently.

Ordering of Filtering Operations

For both inter and intra interlaced frames, an encoder/decoder performs in-loop deblocking filtering by processing horizontal boundaries first, followed by vertical boundaries. In some implementations, the horizontal boundaries are processed one macroblock at a time in raster scan order. Similarly, the vertical edges are processed one macroblock at a time in raster scan order. Pseudo-code 2400 in FIG. 24 describes this ordered filtering process. Other valid implementations of the filtering process are not shown for the sake of simplicity, but other valid implementations are possible.

Filter Operations

Since the minimum number of consecutive pixels that are filtered in a row or column is four and the total number of pixels in a row or column is always a multiple of four, an encoder/decoder performs adaptive filtering operations performed on segments of four pixels in some implementations.

For example, if the eight pixel pairs that make up the vertical boundary between two blocks are adaptively filtered, the eight pixel pairs are divided into two 4-pixel segments as shown in FIG. 12. In each 4-pixel segment, the third pixel pair is adaptively filtered first as indicated by the Xs in FIG. 12. The result of this filter operation determines whether the other three pixels in the segment are also adaptively filtered.

FIG. 13 shows the pixels that are used in the filtering operation performed on the $3^{rd}$ pixel pair. In FIG. 13, pixels P4 and P5 are the pixels that may be changed in the filter operation.

The pseudo-code 1400 of FIG. 14 shows the adaptive filtering operation performed on the $3^{rd}$ pixel pair in each segment. The encoder/decoder determines whether to filter the other three pixels based on the pixel values in the line of pixels containing the $3^{rd}$ pixel pair. The value filter_other_3_pixels indicates whether the remaining three pixel pairs in the segment are also filtered. If filter_other_3_pixels=TRUE, then the other three pixel pairs are adaptively filtered. If filter_other_3_pixels=FALSE, then they are not filtered, and the adaptive filtering operation proceeds to the next 4-pixel segment. The pseudo-code 1500 of FIG. 15 shows the adaptive filtering operation that is performed on the $1^{st}$, $2^{nd}$ and $4^{th}$ pixel pair if filter_other_3_pixels=TRUE. In pseudo-code 1400 and pseudo-code 1500, the variable PQUANT represents a quantization step size.

A. Field-based In-Loop Deblocking Filtering

In some implementations, an encoder/decoder performs field-based in-loop deblocking filtering. For example, an encoder/decoder filters top field lines and bottom field lines separately during in-loop deblocking filtering.

FIGS. 12, 13, 14 and 15 depict the loop filtering decision process for progressive frames, which involves deciding whether to perform loop filtering for four adjacent rows (for filtering across a vertical boundary, as shown in FIG. 12) or columns (for filtering across a horizontal boundary) of samples at a time, on the four samples on each side of the vertical or horizontal boundary.

In one implementation, the filter operations described above with reference to FIGS. 12, 13, 14 and 15 are modified such that the filtering is always done using the same field lines (i.e., without mixing samples of different field polarities).

Figure 25:
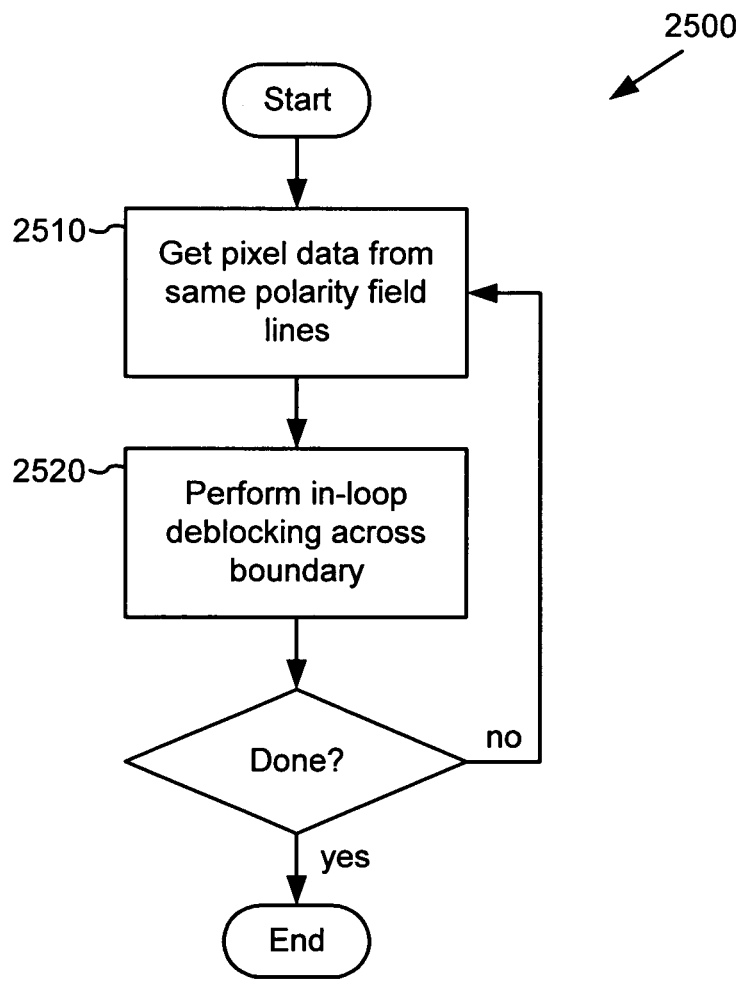
FIG. 25 is a flow chart showing a technique for performing field-based deblocking filtering.

FIG. 25 shows a technique 2500 for performing field-based deblocking filtering. At 2510, an encoder/decoder gets pixel data from field lines having the same polarity (e.g., top or bottom) in a current block and/or neighboring block(s). At 2520, the encoder/decoder performs in-loop deblocking across a boundary within the current block or between the current block and a neighboring block.

For example, for interlaced frame coded pictures, an encoder/decoder makes a loop filtering decision for a vertical block boundary using four alternating rows of same-polarity samples instead of adjacent rows of mixed-polarity samples. The encoder/decoder makes a loop filtering decision for the two even field lines closest to the horizontal block boundary using the four even field lines on each side of the boundary.

The encoder/decoder makes the decision for the two odd field lines closest to the boundary using the four odd field lines on each side of the boundary.

Figure 26A:
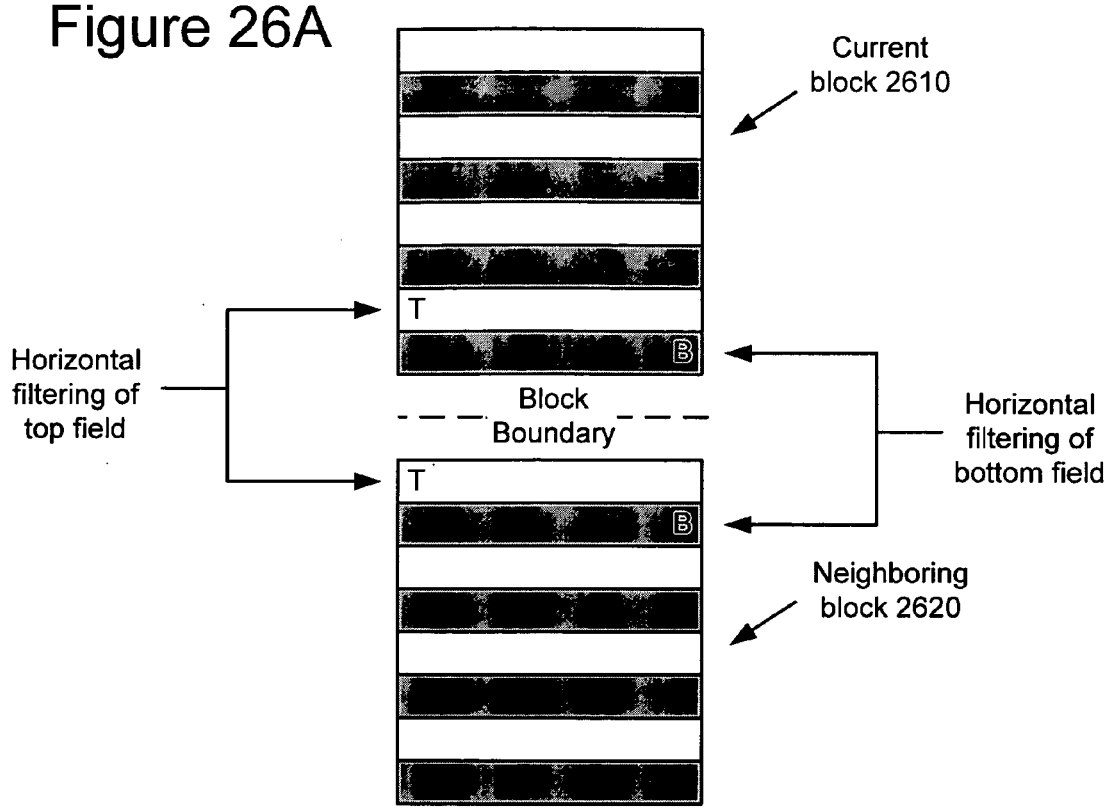
FIG. 26A is a diagram showing field-based filtering for horizontal block boundaries in interlaced I-frames, P-frames and B-frames.
Figure 26B:
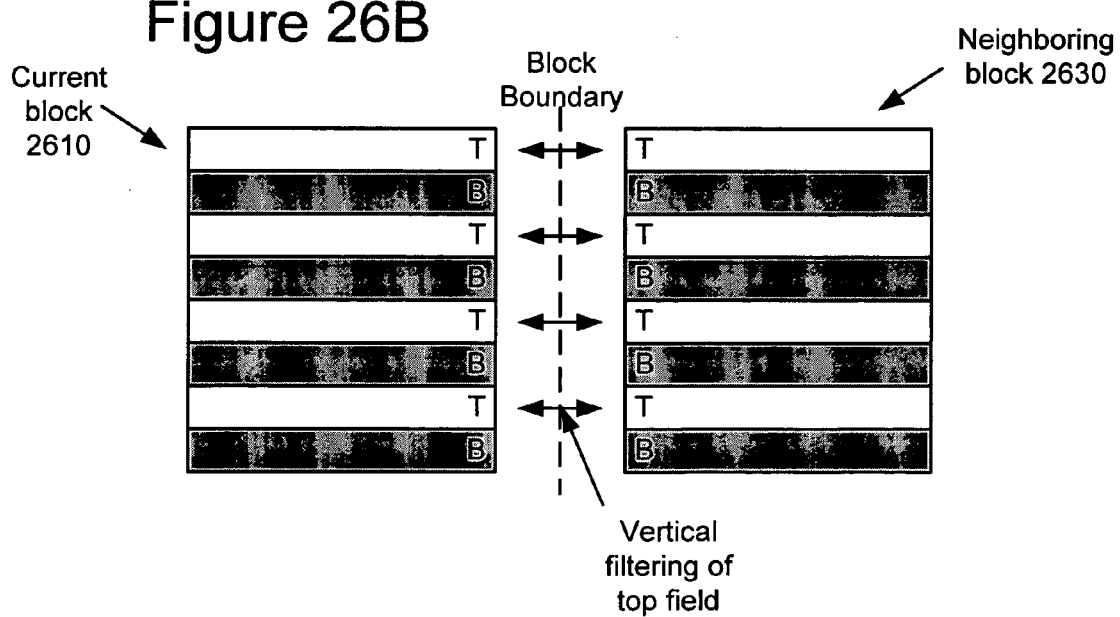
FIG. 26B is a diagram showing field-based filtering for vertical block boundaries in interlaced I-frames, P-frames and B-frames.

FIGS. 26A-26B show examples of field-based filtering for horizontal and vertical block boundaries, respectively. In FIG. 26A, for a horizontal block boundary between a current block 2610 and a neighboring block 2620 below the current block, the two top field lines are filtered across the block boundary using top field lines only and the two bottom field lines across the block boundary are filtered using bottom field lines only. In FIG. 26B, for a vertical block boundary between the current block 2610 and a neighboring block 2630 to the right of the current block, the top field and the bottom field are filtered separately across the block boundary. For example, FIG. 26B shows filtering of the top field lines across the vertical block boundary.

Alternatively, an encoder/decoder performs filtering of pixels in a different way (for example, using different combinations of pixels for filtering, or by performing different filtering operations), but still filters only lines of the same fields together.

B. Determining Block Boundaries for Filtering in Interlaced Frames

Figure 27B:
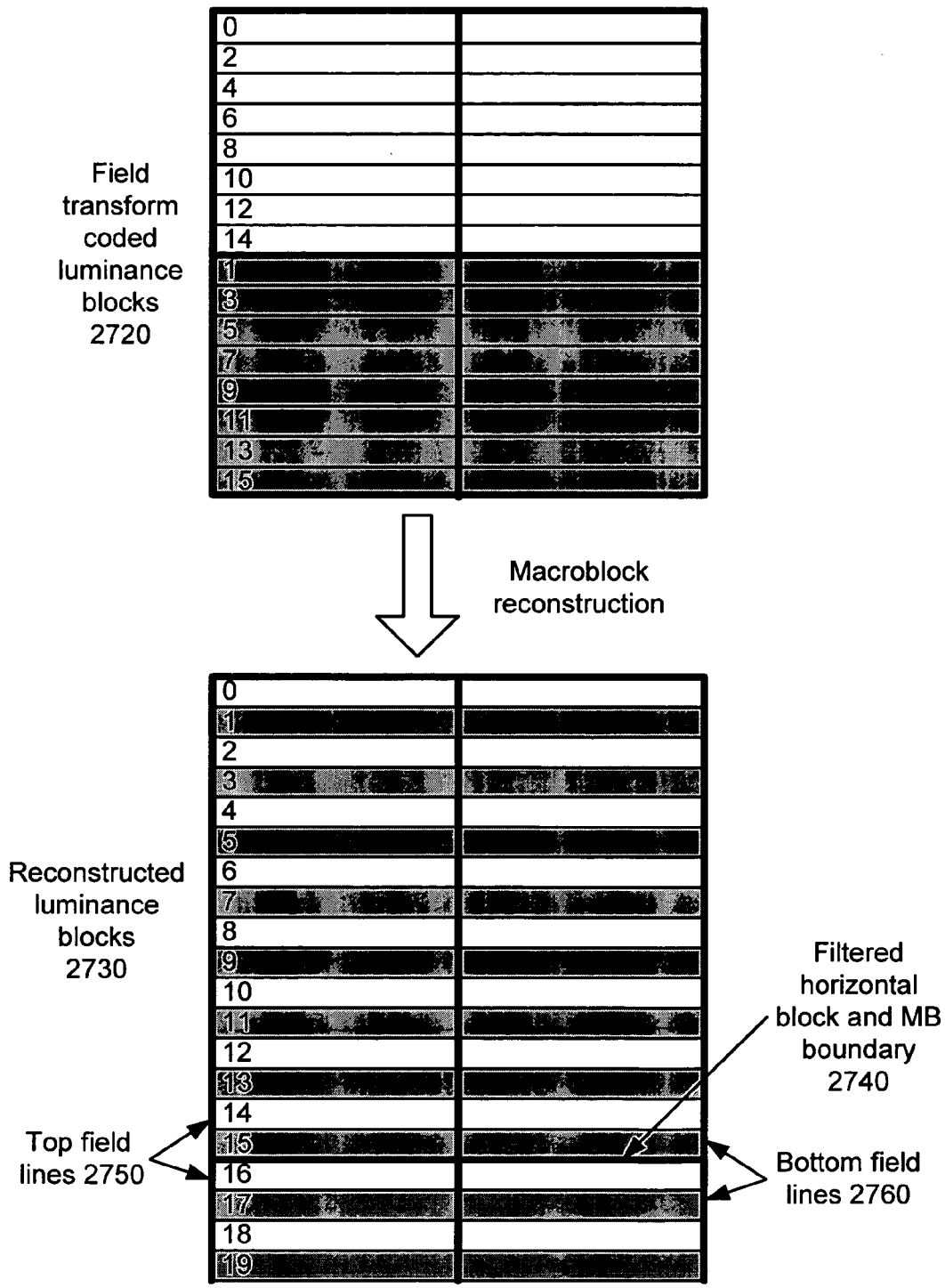

FIGS. 27A-27B show loop filtering of luminance blocks in an interlaced field-coded macroblock in some implementations. FIG. 27A shows field coding of luminance blocks of an interlaced macroblock. Field coding is applied to the four 8×8 luminance blocks 2710 of a 16×16 interlaced macroblock yielding field-coded luminance blocks 2720, shown with horizontal and vertical block boundaries (in bold). Each of the four field transform coded luminance blocks 2720 contains only information from the top field (even numbered lines) or the bottom field (odd numbered lines).

FIG. 27B shows reconstruction and loop filtering of the field-coded luminance blocks 2720.

Field coding shifts the location of the horizontal block boundaries on the final re-interlaced macroblock/frame. As shown in FIG. 27B, if a macroblock is field coded with all 8×8 blocks, the internal 8×8 block boundary of the macroblock will be shifted to the top and bottom macroblock boundaries, since there is effectively no boundary between lines 14 and 1, as they are from different fields. The location of block boundaries also depends on transform size.

Accordingly, in some implementations, an encoder/decoder uses field/frame type and transform size to determine block boundaries for in-loop deblocking filtering.

Figure 28:
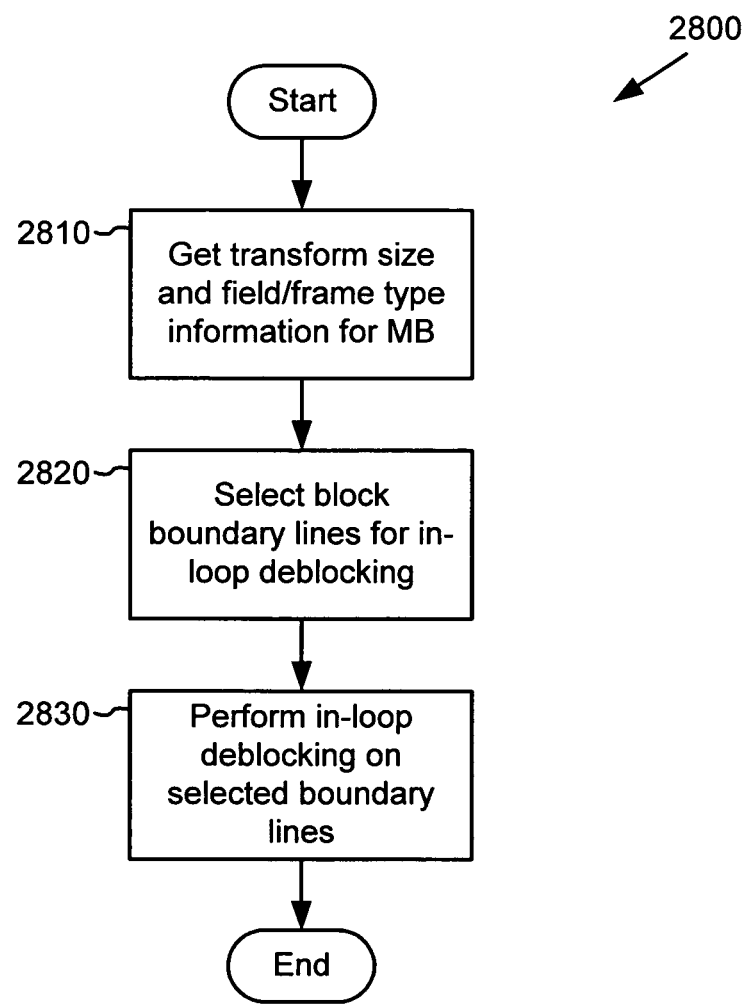
FIG. 28 is a flow chart showing a technique for using field/frame transform type and transform size to select block boundaries for in-loop deblocking filtering.

FIG. 28 shows a technique 2800 for using field/frame transform type and transform size to select block boundaries for in-loop deblocking filtering. At 2810, an encoder/decoder gets transform size and field/frame type information for a current macroblock. At 2820, the encoder/decoder selects block boundary lines for in-loop deblocking based at least in part on the transform size and field/frame type information. At 2830, the encoder/decoder performs in-loop deblocking on the selected boundary lines.

For example, after a frame has been reconstructed in a motion estimation/compensation loop, an encoder/decoder takes into account block/subblock transform size (e.g., 4×4, 4×8, 8×4, or 8×8) and field/frame transform type to determine the block boundaries to be filtered in a current macroblock. The encoder/decoder then performs in-loop deblocking on those boundaries using a field-based deblocking filter. The encoder/decoder performs an inverse permutation (re-interlacing) to form the final reconstructed frame.

Figure 29:
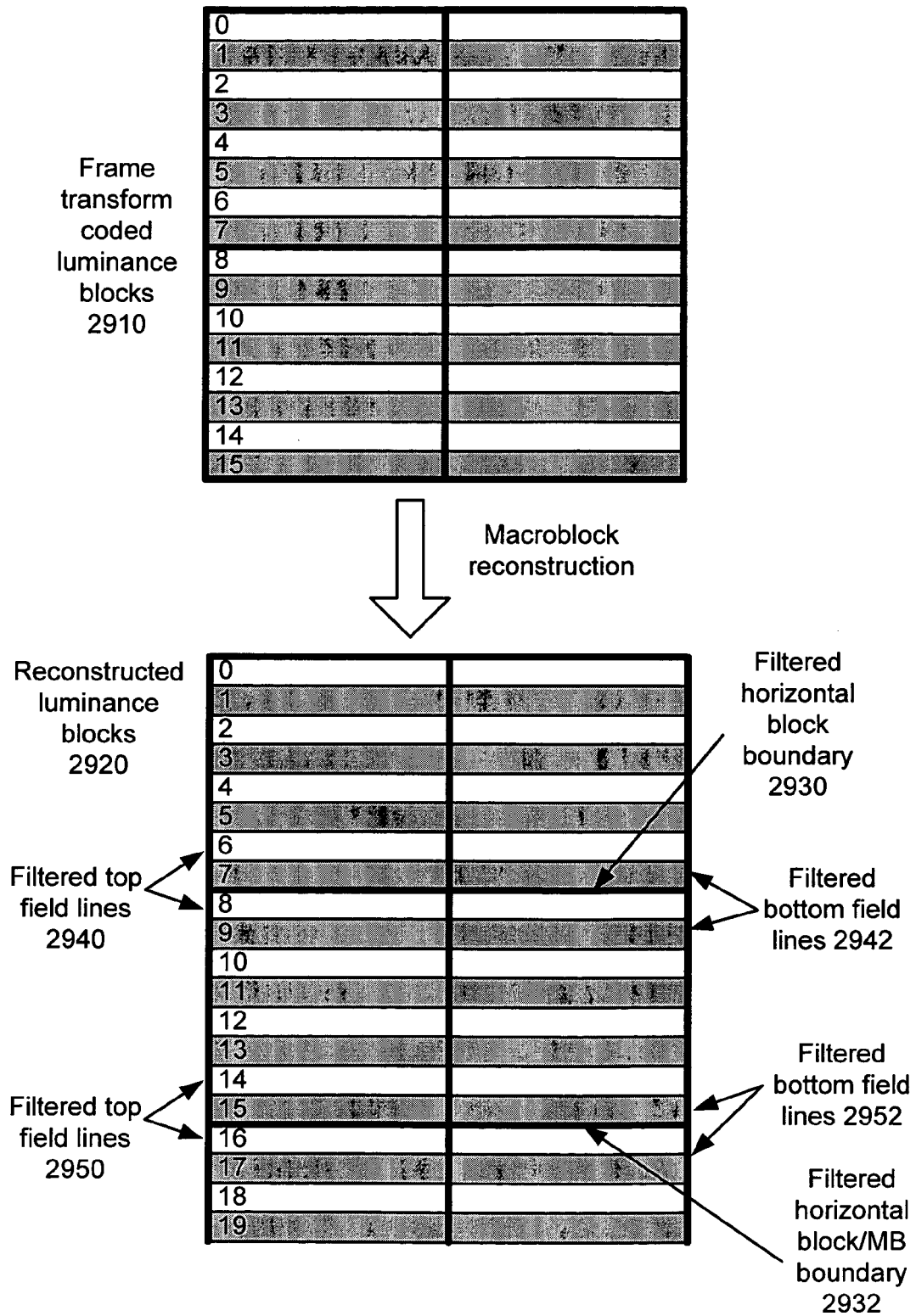
FIG. 29 is a diagram showing loop filtering of luminance blocks in an interlaced frame transform coded macroblock.

FIGS. 27B and 29 show examples of how the boundaries to be filtered can depend on field/frame type for macroblocks within 8×8 transform size blocks. FIG. 27B shows loop filtering of field-coded 8×8 luminance blocks 2720. In the reconstructed luminance blocks 2730, there is in effect no internal horizontal boundary between blocks (no boundary between lines 7 and 8). Instead, the block boundaries coincide with the macroblock boundaries, which are already being filtered. No internal horizontal boundary is filtered. Filtered horizontal block boundary 2740 is a block boundary at the bottom of the macroblock and is filtered using top field lines 2750 and bottom field lines 2760. In field-based filtering, top field lines are filtered together and bottom field lines are filtered together without mixing fields.

FIG. 29 shows loop filtering of frame-coded 8×8 luminance blocks 2910. An internal horizontal block boundary lies between bottom field line 7 and top field line 8. When the frame transform coded luminance blocks 2910 are reconstructed to form reconstructed luminance blocks 2920, the position of the internal horizontal boundary remains the same. In the example shown in FIG. 29B, the internal block boundary (shown as filtered horizontal block boundary 2930) is filtered using top field lines 2940 and bottom field lines 2942. Filtered horizontal block boundary 2932 is a block boundary at the bottom of the macroblock and is filtered using top field lines 2950 and bottom field lines 2952. Again, top field lines are filtered together and bottom field lines are filtered together without mixing fields.

The following paragraphs describe pseudo-code in FIGS. 30A-32B for filtering block boundaries in interlaced I-frames, P-frames and B-frames depending on field/frame type and transform size. The pseudo-code in FIGS. 30A-32B shows examples of how an encoder/decoder determines block boundaries to be filtered in one implementation. Other implementations are possible.

In the pseudo-code in FIGS. 30A-32B, row and column numbers represent rows and columns in current macroblocks and neighboring macroblocks. Row/column numbers 0-15 are in a current macroblock, and row/column numbers greater than 15 are in a neighboring macroblock. Block index numbers (Y0, Y1, etc.) follow the convention shown in FIG. 20, after field/frame coding. Field/frame transform type is indicated by the variable FIELDTX. In one implementation, FIELDTX is a macroblock-level bitstream element that is explicitly signaled in intra-coded macroblocks and inferred from another macroblock-level bitstream element (MBMODE) in inter-coded macroblocks. FIELDTX and MBMODE are explained in further detail in Section V, below.

In interlaced I-frames, each macroblock is 8×8 transform coded. For each macroblock, the horizontal block boundary filtering starts by filtering the intra-macroblock horizontal boundary only if the current macroblock is frame-coded. Next, the horizontal block boundary between the current macroblock and the macroblock directly below it (if available) is filtered. The pseudo-code 3000 in FIG. 30A describes the process of horizontal filtering for a macroblock in an interlaced I-frame. Vertical block boundary filtering starts by filtering the internal vertical boundary and then filtering the boundary between the current macroblock and the right neighboring macroblock (if available). The pseudo-code 3010 in FIG. 30B describes the process of the vertical filtering for a macroblock in an interlaced I-frame.

In interlaced P-frames and B-frames, each macroblock may be 4×4, 4×8, 8×4, or 8×8 transform coded. In one implementation, for each macroblock, the horizontal block boundary filtering occurs in the following order of blocks: $Y_0, Y_1, Y_2, Y_3, C_b, C_r$. The processing of the luma blocks depends on field/frame coding type. The pseudo-code 3100 in FIGS. 31A-B and pseudo-code 3110 in FIG. 31C describe the process of horizontal filtering for luma and chroma blocks, respectively, for macroblocks in interlaced P-frames or B-frames.

Similarly, for each macroblock in one implementation, the vertical block boundary filtering occurs in the in the same order of blocks: $Y_0$, $Y_1$, $Y_2$, $Y_3$, $C_b$, $C_r$. As with horizontal filtering, the processing of the luma blocks depends on field/frame coding type. The pseudo-code 3200 in FIG. 32A-B and pseudo-code 3210 in FIG. 32C describes the process of vertical filtering for luma and chroma blocks, respectively, for macroblocks in interlaced P-frames or B-frames.

Alternatively, an encoder/decoder uses different rules to determine which block and/or subblock boundaries are filtered or the order in which they are filtered, but still uses field/frame coding type and transform size to determine which boundaries are filtered. As another alternative, an encoder/decoder performs filtering operations in a different way (for example, using different combinations of pixels for filtering, or by performing different filtering operations).

V. Combined Implementations

A detailed combined implementation for a bitstream syntax, semantics, and decoder are now described, in addition to an alternative combined implementation with minor differences from the main combined implementation.

A. Bitstream Syntax

In various combined implementations, data for interlaced frame coded pictures (e.g., interlaced P-frames, interlaced B-frames, interlaced I-frames, etc.) is presented in the form of a bitstream having plural layers (e.g., sequence, entry point, frame, field, macroblock, block and/or sub-block layers).

In the syntax diagrams, arrow paths show the possible flows of syntax elements. Syntax elements shown with square-edged boundaries indicate fixed-length syntax elements; those with rounded boundaries indicate variable-length syntax elements and those with a rounded boundary within an outer rounded boundary indicate a syntax element (e.g., a bitplane) made up of simpler syntax elements. A fixed-length syntax element is defined to be a syntax element for which the length of the syntax element is not dependent on data in the syntax element itself; the length of a fixed-length syntax element is either constant or determined by prior data in the syntax flow. A lower layer in a layer diagram (e.g., a macroblock layer in a frame-layer diagram) is indicated by a rectangle within a rectangle.

Figure 33:
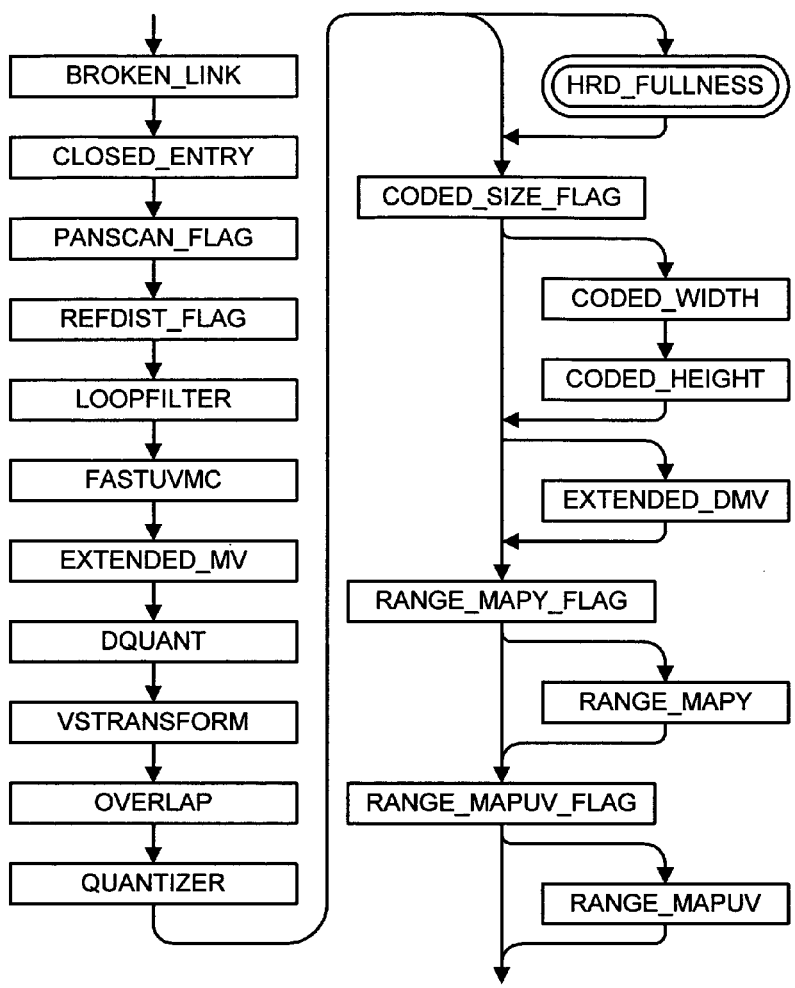
FIG. 33 is a diagram showing an entry point layer bitstream syntax in a combined implementation.

Entry-point-level bitstream elements are shown in FIG. 33. In general, an entry point marks a position in a bitstream (e.g., an I-frame or other key frame) at which a decoder can begin decoding. In other words, no pictures before the entry point in the bitstream are needed to decode pictures after the entry point. An entry point header can be used to signal changes in coding control parameters (e.g., enabling or disabling compression tools, such as in-loop deblocking filtering, for frames following an entry point).

Figure 34:
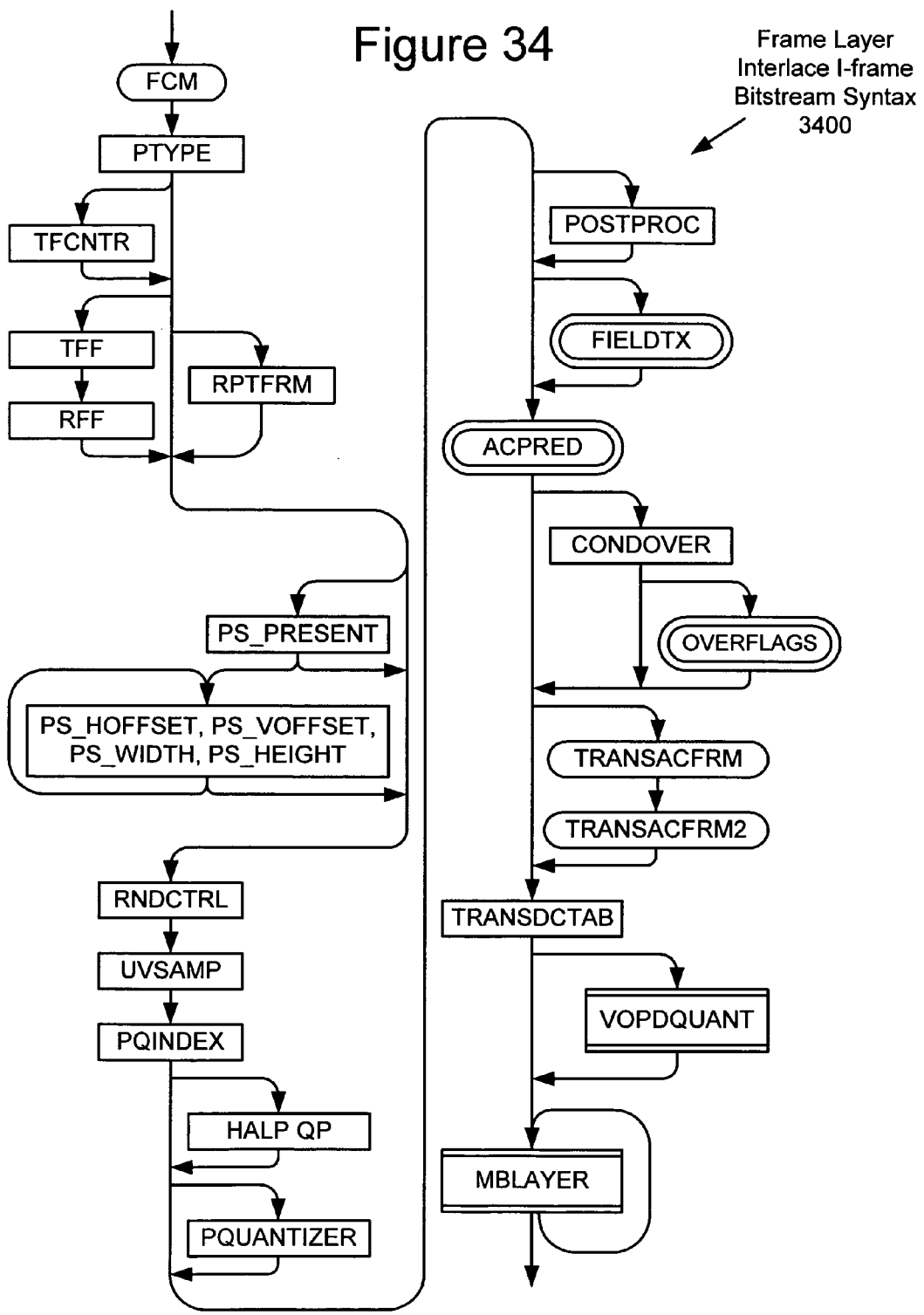
FIG. 34 is a diagram showing a frame layer bitstream syntax for interlaced I-frames in a combined implementation.
Figure 35:
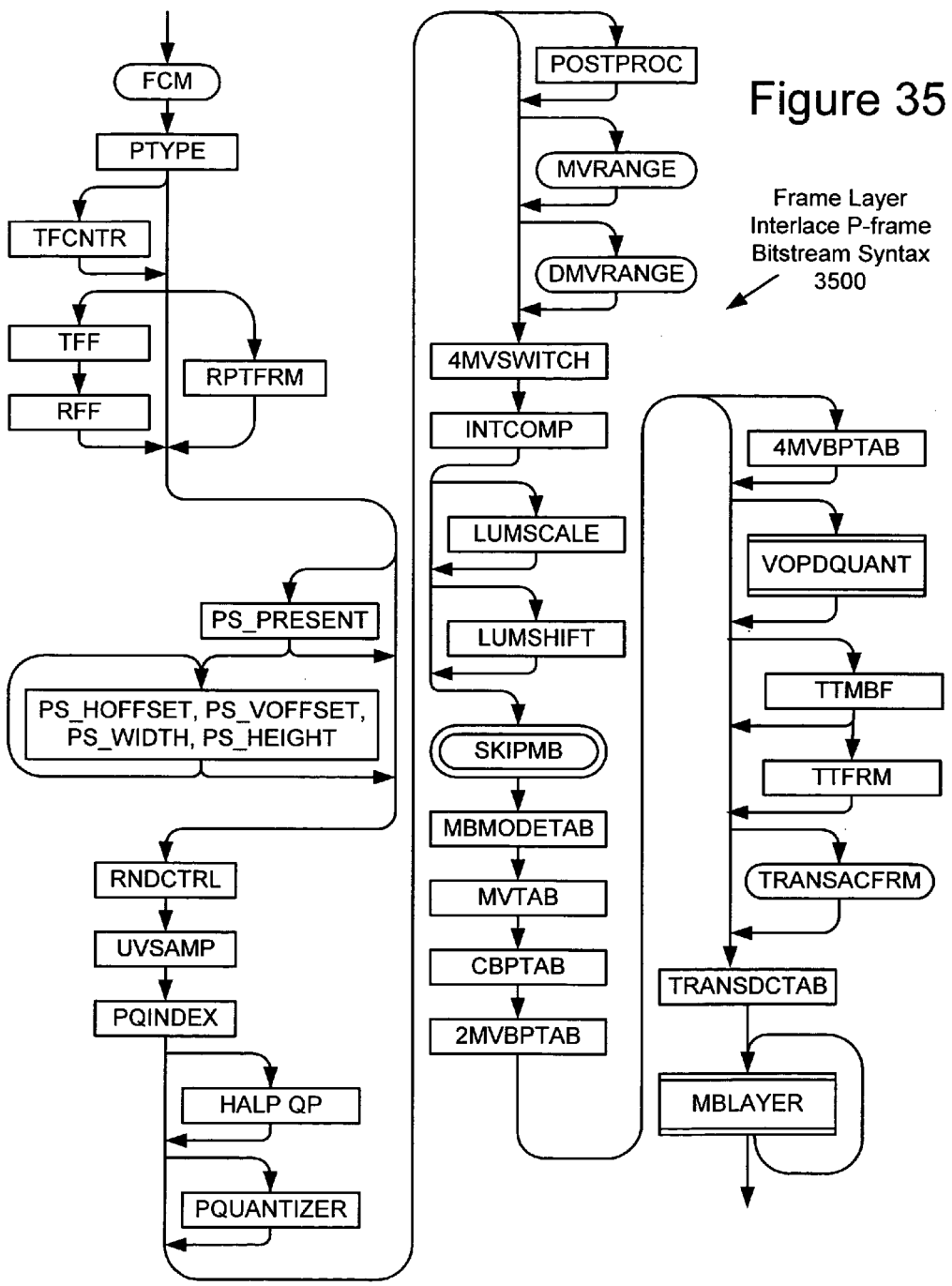
FIG. 35 is a diagram showing a frame layer bitstream syntax for interlaced P-frames in a combined implementation.
Figure 36:
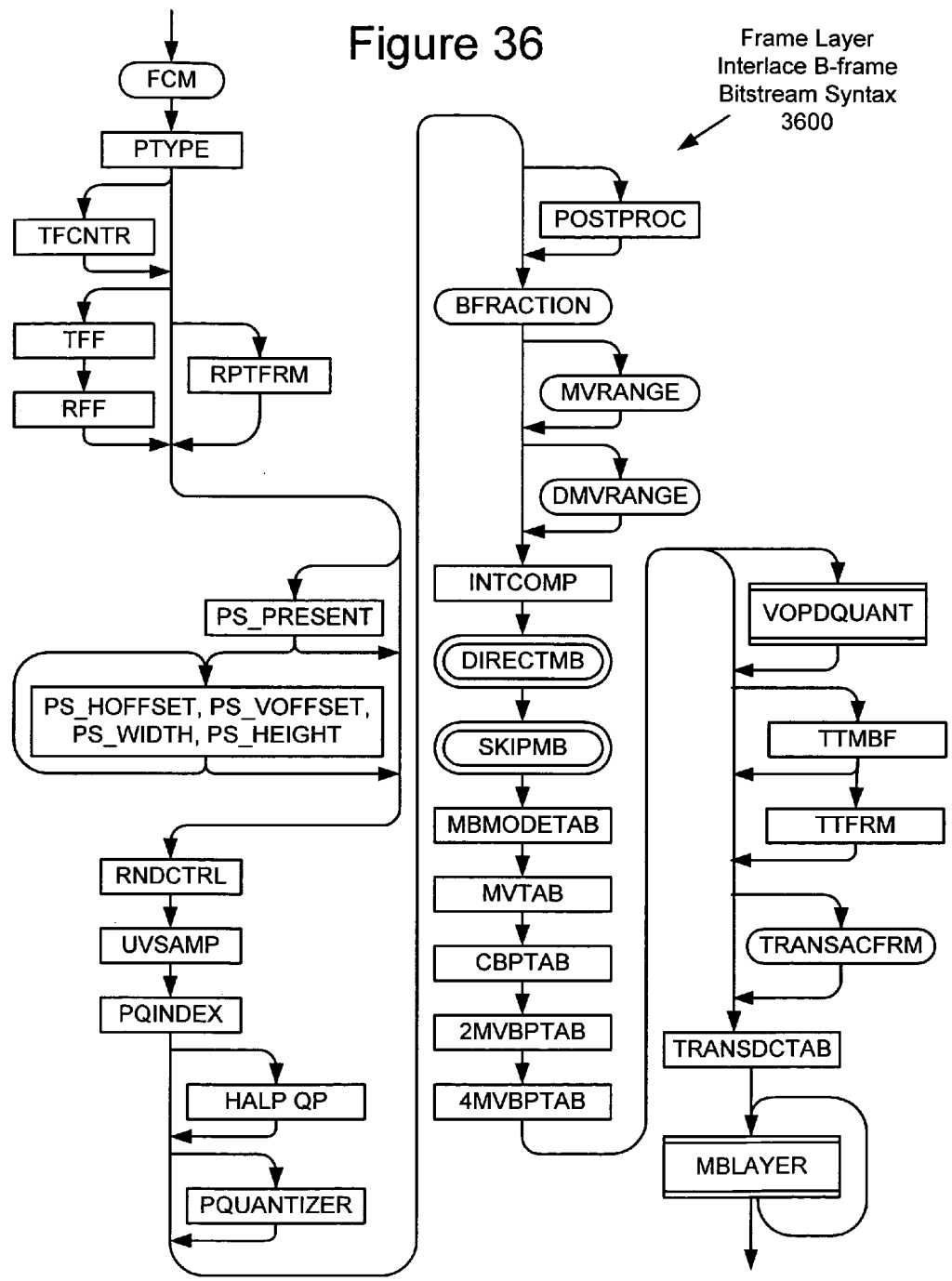
FIG. 36 is a diagram showing a frame layer bitstream syntax for interlaced B-frames in a combined implementation.

For interlaced I-frames, P-frames, and B-frames, frame-level bitstream elements are shown in FIGS. 34, 35, and 36, respectively. (Frame-level bitstream elements for interlaced BI-frames are identical to those for interlaced I-frames.) Data for each frame consists of a frame header followed by data for the macroblock layer (whether for intra or various inter type macroblocks).

Figure 37:
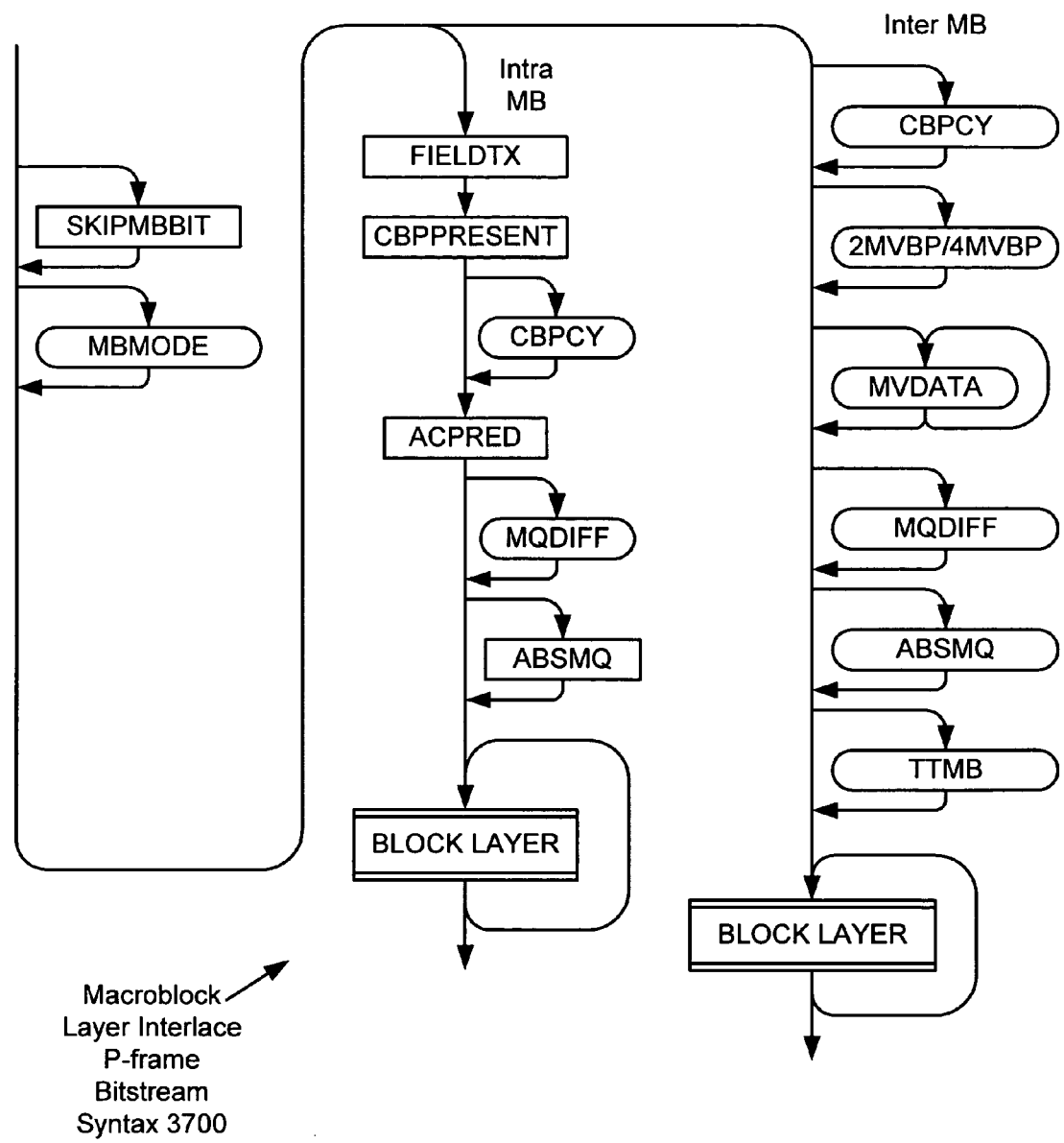
FIG. 37 is a diagram showing a macroblock layer bitstream syntax for macroblocks of interlaced P-frames in a combined implementation.

The bitstream elements that make up the macroblock layer for interlaced P-frames (whether for intra or various inter type macroblocks) are shown in FIG. 37. Bitstream elements in the macroblock layer for interlaced P-frames (e.g., FIELDTX) may be present for macroblocks in other interlaced pictures (e.g., interlaced B-frames, interlaced I-frames etc.)

The following sections describe selected bitstream elements in the frame and macroblock layers that are related to signaling for interlaced pictures. Although the selected bitstream elements are described in the context of a particular layer, some bitstream elements can be used in more than one layer.

1. Selected Entry Point Layer Elements

Loop Filter (LOOPFILTER) (1 Bit)

LOOPFILTER is a Boolean flag that indicates whether loop filtering is enabled for the entry point segment. If LOOPFILTER=0, then loop filtering is not enabled. If LOOPFILTER=1, then loop filtering is enabled. In an alternative combined implementation, LOOPFILTER is a sequence level element.

Variable Sized Transform (VSTRANSFORM) (1 Bit)

VSTRANSFORM is a Boolean flag that indicates whether variable-sized transform coding is enabled for the sequence. If VSTRANSFORM=0, then variable-sized transform coding is not enabled. If VSTRANSFORM=1, then variable-sized transform coding is enabled.

2. Selected Frame Layer Elements

FIGS. 34, 35, and 36, are diagrams showing frame-level bitstream syntaxes for interlaced I-frames, P-frames, and B-frames, respectively. Specific bitstream elements are described below.

Frame Coding Mode (FCM) (Variable Size)

FCM is a variable length codeword ["VLC"] used to indicate the picture coding type. FCM takes on values for frame coding modes as shown in Table 1 below:

TABLE 1

| Frame Coding Mode VLC | |
| --- | --- |
| FCM value | Frame Coding Mode |
| 0 | Progressive |
| 10 | Frame-Interlace |
| 11 | Field-Interlace |

Picture Type (PTYPE) (Variable Size)

PTYPE is a variable size syntax element present in the frame header for interlaced P-frames and interlaced B-frame (or other kinds of interlaced frames such as interlaced I-frames). PTYPE takes on values for different frame types according to Table 2 below.

TABLE 2

| Picture Type VLC | |
| --- | --- |
| PTYPE VLC | Picture Type |
| 110 | I |
| 0 | P |
| 10 | B |
| 1110 | BI |
| 1111 | Skipped |

If PTYPE indicates that the frame is skipped then the frame is treated as a P-frame which is identical to its reference frame. The reconstruction of the skipped frame is equivalent conceptually to copying the reference frame. A skipped frame means that no further data is transmitted for this frame.

Macroblock-Level Transform Type Flag (TTMBF) (1 bit)

This syntax element is present in P-frames and B-frames if the sequence-level syntax element VSTRANSFORM=1. TTMBF is a one-bit syntax element that signals whether transform type coding is enabled at the frame or macroblock level. If TTMBF=1, the same transform type is used for all blocks in the frame. In this case, the transform type is signaled in the Frame-level Transform Type (TTFRM) syntax element that follows. If TTMBF=0, the transform type may vary throughout the frame and is signaled at the macroblock or block levels.

Frame-Level Transform Type (TTFRM) (2 bits)

This syntax element is present in P-frames and B-frames if VSTRANSFORM=1 and TTMBF=1. TTFRM signals the transform type used to transform the 8×8 pixel error signal in predicted blocks. The 8×8 error blocks may be transformed using an 8×8 transform, two 8×4 transforms, two 4×8 transforms or four 4×4 transforms.

Field Transform Bitplane (FIELDTX) (Variable Size)

At frame level or field level, FIELDTX is a bitplane indicating whether macroblocks in an interlaced I-frame are frame-coded or field-coded. FIELDTX is explained in further detail below.

3. Selected Macroblock Layer Elements

FIG. 37 is a diagram showing a macroblock-level bitstream syntax for macroblocks interlaced P-frames in the combined implementation. Specific bitstream elements are described below. Data for a macroblock consists of a macroblock header followed by block layer data. Bitstream elements in the macroblock layer for interlaced P-frames (e.g., FIELDTX) may potentially be present for macroblocks in other interlaced pictures (e.g., interlaced B-frames, etc.)

Macroblock Mode (MBMODE) (Variable Size)

MBMODE is a variable-size syntax element that jointly specifies macroblock type (e.g., 1 MV, 2 Field MV, 4 Field MV, 4 Frame MV or Intra), transform type (e.g., field, frame, or no coded blocks), and the presence of differential motion vector data for 1 MV macroblocks. MBMODE is explained in detail below.

Field Transform Flag (FIELDTX) (1 Bit)

FIELDTX is a 1-bit syntax present in interlaced B-frame intra-coded macroblocks. This syntax element indicates whether a macroblock is frame or field coded (basically, the internal organization of the macroblock). FIELDTX=1 indicates that the macroblock is field-coded. Otherwise, the macroblock is frame-coded. In inter-coded macroblocks, this syntax element can be inferred from MBMODE as explained in detail below.

MB-Level Transform Type (TTMB) (Variable Size)

TTMB is a variable-size syntax element in P-frame and B-frame macroblocks when the picture layer syntax element TTMBF=0. TTMB specifies a transform type, transform type signal level, and subblock pattern.

If TTMB indicates the signal level is block level then the transform type is signaled at block level. At block level, for a block that contains residual information, TTBLK indicates the transform type used for the block. TTBLK is not present for the first coded block since transform type for that block is joint coded in TTMB. TTBLK is present for all the remaining coded blocks and indicates the transform type. If the transform type is 8×4 or 4×8, the subblock pattern is decoded as part of TTMB (for the first coded block) or TTBLK (for each remaining coded block after the first one). If the transform type is 4×4, the subblock pattern is encoded in SUBBLKPAT at the block level for each coded block.

If the transform type signaling level is macroblock level and the transform type is 8×4, 4×8, or 4×4, the decoder may still need information about which subblocks have non-zero coefficients. If the transform type is 8×4 or 4×8, the subblock pattern is decoded as part of TTMB (for the first coded block) or SUBBLKPAT (for each remaining coded block). If the transform type is 4×4, the subblock pattern is encoded in SUBBLKPAT at the block level for each coded block.

Finally, if the transform type signaling level is frame level and the transform type is 8×4, 4×8, or 4×4, the decoder needs information about which subblocks have non-zero coefficients. The subblock pattern is encoded in SUBBLKPAT at the block level for each coded block.

If a subblock pattern indicates no non-zero coefficients are present for a subblock, then no additional coefficient information for that subblock is present in the bitstream. For an 8×4 transform type, data for the top subblock (if present) is coded first followed by data for the bottom subblock (if present). For a 4×8 transform type, data for the left subblock (if present) is coded first followed by data for the right subblock (if present). For a 4×4 transform type, data for the upper left subblock is coded first (if present) followed, in order, by data for the upper right, lower left and lower right subblocks (if present).

B. Decoding Aspects of Interlaced P-Frames

In an interlaced P-frame, each macroblock may be motion compensated in frame mode using one or four motion vectors or in field mode using two or four motion vectors. A macroblock that is inter-coded does not contain any intra blocks. In addition, the residual after motion compensation may be coded in frame transform mode or field transform mode. More specifically, the luma component of the residual is re-arranged according to fields if it is coded in field transform mode but remains unchanged in frame transform mode, while the chroma component remains the same. A macroblock may also be coded as intra.

Motion compensation may be restricted to not include four (both field/frame) motion vectors. The type of motion compensation and residual coding is jointly indicated for each macroblock through MBMODE and a skipped macroblock signal (SKIPMB).

Macroblocks in interlaced P-frames are classified into five types: 1 MV, 2 Field MV, 4 Frame MV, 4 Field MV, and Intra. The first four types of macroblock are inter-coded while the last type indicates that the macroblock is intra-coded. The macroblock type is signaled by the MBMODE syntax element in the macroblock layer along with the skip bit. (A skip condition for the macroblock also can be signaled at frame level in a compressed bit plane.) MBMODE jointly encodes macroblock types along with various pieces of information regarding the macroblock for different types of macroblock.

Macroblock Mode Signaling

MBMODE jointly specifies the type of macroblock (1 MV, 4 Frame MV, 2 Field MV, 4 Field MV, or intra), types of transform for inter-coded macroblock (i.e. field or frame or no coded blocks), and whether there is a differential motion vector for a 1 MV macroblock. MBMODE can take one of 15 possible values:

Let <MVP> denote the signaling of whether a nonzero 1 MV differential motion vector is present or absent. Let <Field/Frame transform> denote the signaling of whether the residual of the macroblock is (1) frame transform coded; (2) field transform coded; or (3) zero coded blocks (i.e. CBP=0). MBMODE signals the following information jointly:

MBMODE={<1 MV, MVP, Field/Frame transform>, <2 Field MV, Field/Frame transform>, <4 Frame MV, Field/Frame transform>, <4 Field MV, Field/Frame transform>, <INTRA>};

The case <1 MV, MVP=0, CBP=0>, is not signaled by MBMODE, but is signaled by the skip condition.

For inter-coded macroblocks, the CBPCY syntax element is not decoded when <Field/frame Transform> in MBMODE indicates no coded blocks. On the other hand, if <Field/frame Transform> in MBMODE indicates field or frame transform, then CBPCY is decoded.

The decoded <Field/frame Transform> is used to set the flag FIELDTX. If it indicates that the macroblock is field transform coded, FIELDTX is set to 1. If it indicates that the macroblock is frame transform coded, FIELDTX is set to 0. If it indicates a zero-coded block, FIELDTX is set to the same type as the motion vector, i.e., FIELDTX is set to 1 if it is a field motion vector and to 0 if it is a frame motion vector.

For non-1 MV inter-coded macroblocks, an additional field is sent to indicate which of the differential motion vectors is non-zero. In the case of 2 Field MV macroblocks, the 2 MVBP field is sent to indicate which of the two motion vectors contain nonzero differential motion vectors. Similarly, the 4 MVBP field is sent to indicate which of the four motion vectors contain nonzero differential motion vectors.

For intra-coded macroblocks, the Field/Frame transform and zero coded blocks are coded in separate fields.

C. In-Loop Deblocking Filtering for Progressive Frames

Before describing the process for in-loop deblocking filtering for interlaced frames in the combined implementation, a process for in-loop deblocking filtering for progressive frames is described. The section describing the process for in-loop deblocking filtering for interlaced frames will proceed with reference to concepts discussed in this section.

In the combined implementation, if the entry-point-layer syntax element LOOPFILTER=1, an adaptive filtering operation is performed on each reconstructed frame in the entry point segment. This filtering operation is performed prior to using the reconstructed frame as a reference for motion compensation. When there are multiple slices in a picture, the filtering for each slice is performed independently.

Since the intent of loop filtering is to smooth discontinuities at block boundaries, the filtering process operates on pixels that border neighboring blocks. The locations of block boundaries depend on the size of the inverse transform used. For P-frames the block boundaries may occur at every 4th or 8th pixel row or column depending on whether an 8×8, 8×4 or 4×8 inverse transform is used. For I-frames, where an 8×8 transform is used, block boundaries occur at every 8th pixel row and column.

1. Progressive I-Frame In-Loop Deblocking Filtering

For progressive I-frames, adaptive deblocking filtering is performed at all 8×8 block boundaries. FIGS. 7 and 8 show the pixels that are filtered along the horizontal and vertical border regions in the upper left corner of a component (luma, $C_b$ or $C_r$) plane. FIG. 7 shows filtered vertical block boundary pixels in an I-frame. FIG. 8 shows filtered horizontal block boundary pixels in an I-frame.

In FIGS. 7 and 8, crosses represent pixels (or, more precisely, samples) and circled crosses represent filtered pixels. As these figures show, the top horizontal line and first vertical line in the frame are not filtered, even though they lie on a block boundary, because these lines lie on the border of the frame. Although not depicted, the bottom horizontal line and last vertical line in the frame also are not filtered for the same reason. In more formal terms, the following lines are filtered:

Horizontal lines: (7, 8), (15, 16) ... ((N−1)*8−1, (N−1)*8)
Vertical lines: (7, 8), (15, 16) ... ((M−1)*8−1, (M−1)*8)
(N=number of horizontal 8×8 blocks in the plane (N*8=horizontal frame size))
(M=number of vertical 8×8 blocks in the frame (M*8=vertical frame size))

The order in which the pixels are filtered is important. For progressive frames in this combined implementation, all horizontal boundary lines in the frame are filtered first, followed by the vertical boundary lines.

2. Progressive B-Frame In-Loop Deblocking Filtering

In the combined implementation, progressive B-frame in-loop deblocking is the same as progressive I-frame deblocking. As in progressive I-frame in-loop deblocking, 8×8 block boundaries are filtered, and motion vectors and 4×8/8×4 transforms are not considered.

3. Progressive P-Frame In-Loop Deblocking Filtering

For progressive P-frames, blocks can be intra or inter-coded. In the combined implementation, an encoder/decoder uses an 8×8 transform to transform the samples in intra-coded blocks. When at least one of the neighboring blocks is intra-coded, the 8×8 block boundaries are always adaptively filtered. An encoder/decoder uses an 8×8, 8×4, 4×8 or 4×4 transform for inter-coded blocks and uses a corresponding inverse transform to construct the samples that represent the residual error. Depending on the status of the neighboring blocks, the boundary between the current and neighboring blocks may or may not be filtered. The decision of whether to adaptively filter a block or subblock border is as follows:

1) The boundaries between coded (at least one non-zero coefficient) subblocks (8×4, 4×8 or 4×4) within an 8×8 block are always adaptively filtered.
2) The boundary between a block or subblock and a neighboring block or subblock shall not be not filtered only if both blocks are inter-coded, have the same motion vector, and have no residual error (no transform coefficients). Otherwise the boundary shall be adaptively filtered.

FIG. 9 shows examples of when filtering between neighboring blocks does and does not occur in progressive P-frames. In this example, it is assumed that the motion vectors for both blocks is the same (if the motion vectors are different, then the boundary is always adaptively filtered). The shaded blocks or subblocks represent the cases where at least one nonzero coefficient is present. Clear blocks or subblocks represent cases where no transform coefficients are present. Thick lines represent the boundaries that are adaptively filtered. Thin lines represent the boundaries that are not filtered. These examples illustrate only horizontal neighbors, but the same applies for vertical neighbors.

FIGS. 10 and 11 show an example of pixels that may be filtered in a progressive P-frame. The crosses represent pixel locations and the circled crosses represent the boundary pixels that are filtered if the conditions specified above are met.

FIG. 10 shows pixels adaptively filtered along horizontal boundaries. As the figure shows, the pixels on either side of the block or subblock boundary are candidates to be filtered. For the horizontal boundaries this could be every $4^{th}$ and $5^{th}$, $8^{th}$ and $9^{th}$, $12^{th}$ and $13^{th}$, etc., pixel row in the frame as these are the 8×8 and 8×4 horizontal boundaries. FIG. 11 shows pixels adaptively filtered along vertical boundaries. For the vertical boundaries, every $4^{th}$ and $5^{th}$, $8^{th}$ and $9^{th}$, $12^{th}$ and $13^{th}$, etc., pixel column in the frame may be adaptively filtered as these are the 8×8 and 4×8 vertical boundaries.

In this combined implementation, the first and last row and the first and last column in the frame are not filtered. The order in which pixels are filtered is important. First, in this combined implementation, all the 8×8 block horizontal boundary lines in the frame are adaptively filtered starting from the top line. Next, all 8×4 block horizontal boundary lines in the frame are adaptively filtered starting from the top line. Next, all 8×8 block vertical boundary lines are adaptively filtered starting from the leftmost line. Lastly, all 4×8 block vertical boundary lines are adaptively filtered starting with the leftmost line. In all cases in this combined implementation, the rules specified above are used to determine whether the boundary pixels are adaptively filtered for each block or sub-block.

4. Filter Operation

This section describes an adaptive filtering operation that is performed on the boundary pixels in progressive I-, B- and P-frames in the combined implementation.

For progressive P-frames the decision criteria described above determine which vertical and horizontal boundaries are adaptively filtered. For progressive I-frames, all the 8×8 vertical and horizontal boundaries are adaptively filtered. Since the minimum number of consecutive pixels that are filtered in a row or column is four and the total number of pixels in a row or column is always a multiple of four, the adaptive filtering operation is performed on segments of four pixels.

For example, if the eight pixel pairs that make up the vertical boundary between two blocks is adaptively filtered, then the eight pixels are divided into two 4-pixel segments as shown in FIG. 12. In each 4-pixel segment, the third pixel pair is adaptively filtered first as indicated by the Xs in FIG. 12. The result of this filter operation determines whether the other three pixels in the segment are also adaptively filtered, as described below.

FIG. 13 shows the pixels that are used in the filtering operation performed on the $3^{rd}$ pixel pair. In FIG. 13, pixels P4 and P5 are the pixel pairs that may be changed in the filter operation.

The pseudo-code 1400 of FIG. 14 shows the filtering operation performed on the $3^{rd}$ pixel pair in each segment. The value filter_other_3_pixels indicates whether the remaining three pixel pairs in the segment are also adaptively filtered. If filter_other_3_pixels=TRUE, then the other three pixel pairs are adaptively filtered. If filter_other_3_pixels=FALSE, then they are not adaptively filtered, and the filtering operation proceeds to the next 4-pixel segment. The pseudo-code 1500 of FIG. 15 shows the filtering operation that is performed on the $1^{st}$, $2^{nd}$ and $4^{th}$ pixel pair if filter_other_3_pixels=TRUE.

The filtering operations described above are similarly used for adaptively filtering horizontal boundary pixels.

D. In-Loop Deblocking Filtering for Interlaced Frames

This section describes the process for in-loop deblocking filtering of interlaced frames in the combined implementation, with reference to concepts discussed in the previous section.

If the entry point layer syntax element LOOPFILTER=1, a filtering operation is performed on each reconstructed frame. (In an alternative combined implementation, LOOPFILTER is a sequence layer syntax element.) This filtering operation is performed prior to using the reconstructed frame as a reference for motion predictive coding.

Since the intent of loop filtering is to smooth out the discontinuities at block boundaries, the adaptive filtering process operates on the pixels that border neighboring blocks. For interlaced P-frames, the block boundaries may occur at every $4^{th}$, $8^{th}$, $12^{th}$, etc., pixel row or column, depending on whether an 8×8, 8×4, 4×8 or 4×4 inverse transform is used. For interlaced I-frames, adaptive filtering occurs at every $8^{th}$, $16^{th}$, $24^{th}$, etc., pixel row and column.

In interlace frame coded pictures, each macroblock may be frame transform coded or field transform coded according to its FIELDTX flag. The state of the FIELDTX flag along with the size of the transform used (4×4, 4×8, 8×4, 8×8) has an effect on where the in-loop deblocking takes place in the macroblock.

Field-Based Filtering

The adaptive filtering process is the same as described above with regard to progressive frames, with one important difference: the filtering is always done using the same field lines, never mixing different fields. FIGS. 26A-26B illustrate field-based filtering for horizontal and vertical block boundaries.

For a horizontal block boundary, the two top field lines are filtered across the block boundary using top field lines only and the two bottom field lines across the block boundary are filtered using bottom field lines only. For a vertical block boundary, the top field block boundary and the bottom field block boundary are filtered separately.

Filtering Order

For both inter (P, B) and intra (I) frame coded pictures, the in-loop deblocking process starts by processing all the horizontals edges first followed by all the vertical edges. The pseudo-code 2400 in FIG. 24 describes this filtering process in the combined implementation one macroblock at a time for the sake of simplicity, but alternate valid implementations of the filtering process may not follow this macroblock processing order.

Interlaced I-Frames

In interlaced I-frames, each macroblock is 8×8 transform coded. For each macroblock, the horizontal block boundary filtering starts by filtering the intra-macroblock horizontal boundary only if the current macroblock is frame transform coded. Next, the horizontal block boundary between the current macroblock and the macroblock directly below it (if available) is filtered. The pseudo-code 3000 in FIG. 30A describes the process of horizontal filtering for a macroblock in an interlaced I-frame.

For each macroblock, the vertical block boundary filtering starts by filtering the intra-macroblock vertical boundary and then followed by the filtering of the inter-macroblock boundary between the current macroblock and the macroblock to its immediate right (if available). The pseudo-code 3010 in FIG. 30B describes the process of the vertical filtering for a macroblock in an interlaced I-frame.

Interlaced P-Frames and Interlaced B-Frames

In interlaced P-frames and B-frames, each inter-coded macroblock may be 4×4, 4×8, 8×4, or 8×8 transform coded. For each macroblock, the horizontal block boundary filtering occurs in the order of block $Y_0, Y_1, Y_2, Y_3, C_b$, and then $C_r$. In this combined implementation, the luma blocks are processed differently according to field/frame coding status. The value is explicitly signaled in intra-coded macroblocks, and it is inferred from MBMODE in inter-coded macroblocks. The pseudo-code 3100 in FIG. 31A and pseudo-code 3110 in FIG. 31B describes the process of horizontal filtering for luma and chroma blocks, respectively, for a macroblock in an interlaced P-frame or B-frame.

Similarly, for each macroblock, the vertical block boundary filtering occurs in the order of block $Y_0, Y_1, Y_2, Y_3, C_b$, and then $C_r$. In this combined implementation, as with horizontal filtering, the luma blocks are processed differently according to field/frame coding status. The pseudo-code 3200 in FIG. 32A and pseudo-code 3210 in FIG. 32B describes the process of vertical filtering for luma and chroma blocks, respectively, for a macroblock in an interlaced P-frame or B-frame.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computing device that implements a video decoder, the computing device including a processor and memory, a method comprising:
   receiving, at the computing device that implements the video decoder, encoded data for video in a bit stream, wherein bit stream syntax for the bit stream includes frame level, macroblock level and block level;
   with the computing device that implements the video decoder, decoding an interlaced frame coded picture of the video using the received encoded data, including:
      using one or more transform level syntax elements to select the frame level, the macroblock level, or the block level of bit stream syntax as including frequency transform block/sub-block size information, wherein the video decoder is configurable, depending on the one or more transform level syntax elements, to set frequency transform block/sub-block size for the interlaced frame coded picture, to switch the frequency transform block/sub-block size between macroblocks in the interlaced frame coded picture, and to switch the frequency transform block/sub-block size between blocks in the interlaced frame coded picture;
      obtaining field/frame type information for a current macroblock in the interlaced frame coded picture;
      obtaining the frequency transform block/sub-block size information for plural blocks in the current macroblock, the frequency transform block/sub-block size information indicating the frequency transform block/sub-block size from among plural possible frequency transform block/sub-block sizes;
      selecting one or more block boundaries for in-loop deblocking, wherein the selecting is based at least in part on the frequency transform block/sub-block size information and the field/frame type information; and
      performing in-loop deblocking on the selected block boundaries.

2. The method of claim 1 wherein the field/frame transform type information indicates whether the current macroblock is coded according to a field structure or a frame structure.

3. The method of claim 1 wherein the in-loop deblocking is field-based.

4. The method of claim 1 wherein the decoding further comprises obtaining picture type information for the interlaced frame coded picture, wherein the selecting is further based on the picture type information.

5. The method of claim 1 wherein the interlaced frame coded picture is an interlaced P-frame.

6. The method of claim 1 wherein the interlaced frame coded picture is an interlaced B-frame.

7. The method of claim 1 wherein the current macroblock is a 4:2:0 macroblock.

8. The method of claim 1 wherein at least one of the one or more block boundaries is a horizontal block boundary.

9. The method of claim 1 wherein at least one of the one or more block boundaries is a vertical block boundary.

10. The method of claim 1 wherein the performing in-loop deblocking comprises performing in-loop deblocking on horizontal block boundaries prior to performing in-loop deblocking on vertical block boundaries.

11. The method of claim 1 wherein the frequency transform block/sub-block size information indicates the frequency transform block/sub-block size from a group consisting of: 8×8, 8×4, 4×8, and 4×4.

12. A computer system including a processor, memory, speaker, voice input device, display, and storage medium, wherein the computer system is adapted to perform a method comprising:
   receiving encoded data for video in a bit stream, wherein bit stream syntax for the bit stream includes frame level, macroblock level and block level; and
   decoding an interlaced frame coded picture of the video using the received encoded data, including:
      using one or more transform level syntax elements to select the frame level, the macroblock level, or the block level of bit stream syntax as including frequency transform block/sub-block size information, wherein the video decoder is configurable, depending on the one or more transform level syntax elements, to set frequency transform block/sub-block size for the interlaced frame coded picture, to switch the frequency transform block/sub-block size between macroblocks in the interlaced frame coded picture, and to switch the frequency transform block/sub-block size between blocks in the interlaced frame coded picture;
      obtaining field/frame type information for a current macroblock in the interlaced frame coded picture;
      obtaining the frequency transform block/sub-block size information for plural blocks in the current macroblock, the frequency transform block/sub-block size information indicating the frequency transform block/sub-block size from among plural possible frequency transform block/sub-block sizes;
      selecting one or more block boundaries for in-loop deblocking, wherein the selecting is based at least in part on the frequency transform block/sub-block size information and the field/frame type information; and
      performing in-loop deblocking on the selected block boundaries.

13. In a computing device that implements a video encoder, the computing device including a processor and memory, a method comprising:
   with the computing device that implements the video encoder, encoding data for video that includes an interlaced frame coded picture, wherein the encoding includes:
      obtaining field/frame type information for a current macroblock in the interlaced frame coded picture;
      obtaining frequency transform block/sub-block size information for plural blocks in the current macroblock, the frequency transform block/sub-block size information indicating which frequency transform block/sub-block size of plural possible frequency transform block/sub-block sizes applies to each of the plural blocks;
      selecting a block boundary between a first block in the macroblock and a second block for in-loop deblocking, the selecting based at least in part on the frequency transform block/sub-block size information and the field/frame type information;
      obtaining pixel data from one or more field lines associated with the first block;
      obtaining pixel data from one or more field lines associated with the second block; and performing in-loop deblocking across the selected block boundary using the obtained pixel data;

wherein the in-loop deblocking comprises filtering operations performed on pixel data from field lines of same polarity only; and with the computing device that implements the video encoder, outputting the encoded data as part of a bit stream, wherein bit stream syntax for the bit stream includes frame level, macroblock level and block level, wherein one or more transform level syntax elements indicate whether the frequency transform block/sub-block size information is signaled in the bit stream as part of the frame level, the macroblock level, or the block level of bit stream syntax, and wherein the video encoder is configurable, as indicated by the one or more transform level syntax elements, to set the frequency transform block/sub-block size for the interlaced frame coded picture, to switch the frequency transform block/sub-block size between macroblocks in the interlaced frame coded picture, and to switch the frequency transform block/sub-block size between blocks in the interlaced frame coded picture.

14. A computer system including a processor, memory, speaker, voice input device, display, and storage medium, wherein the computer system is adapted to perform a method comprising:

encoding data for video that includes an interlaced frame coded picture, wherein the encoding includes:

obtaining field/frame type information for a current macroblock in the interlaced frame coded picture;

obtaining frequency transform block/sub-block size information for plural blocks in the current macroblock, the frequency transform block/sub-block size information indicating which frequency transform block/sub-block size of plural possible frequency transform block/sub-block sizes applies to each of the plural blocks;

selecting a block boundary between a first block in the macroblock and a second block for in-loop deblocking, the selecting based at least in part on the frequency transform block/sub-block size information and the field/frame type information;

obtaining pixel data from one or more field lines associated with the first block;

obtaining pixel data from one or more field lines associated with the second block; and performing in-loop deblocking across the selected block boundary using the obtained pixel data;

wherein the in-loop deblocking comprises filtering operations performed on pixel data from field lines of same polarity only; and outputting the encoded data as part of a bit stream, wherein bit stream syntax for the bit stream includes frame level, macroblock level and block level, wherein one or more transform level syntax elements indicate whether the frequency transform block/sub-block size information is signaled in the bit stream as part of the frame level, the macroblock level, or the block level of bit stream syntax, and wherein the video encoder is configurable, as indicated by the one or more transform level syntax elements, to set the frequency transform block/sub-block size for the interlaced frame coded picture, to switch the frequency transform block/sub-block size between macroblocks in the interlaced frame coded picture, and to switch the frequency transform block/sub-block size between blocks in the interlaced frame coded picture.

15. The method of claim 1 wherein the frequency transform block/sub-block size information is signaled in the bit stream separately from the field/frame type information, and wherein the field/frame type information is signaled at any of frame level or macroblock level in the bit stream.

16. The method of claim 1 wherein the frequency transform block/sub-block size information is signaled in the bit stream using one or more transform size syntax elements, and wherein the field/frame type information is signaled in the bit stream using one or more field/frame type syntax elements different than the one or more transform size syntax elements.

17. The method of claim 1 wherein the plural blocks include plural luma blocks and plural chroma blocks, wherein the one or more block boundaries selected based at least in part on the frequency transform block/sub-block size information and the field/frame type information are selected for in-loop deblocking of the plural luma blocks, and wherein the decoding further includes:

selecting one or more block boundaries for in-loop deblocking of the plural chroma blocks, wherein the selecting the one or more block boundaries for in-loop deblocking of the plural chroma blocks is based at least in part on the frequency transform block/sub-block size information but independent of the field/frame type information.

18. The method of claim 13 wherein, as part of the outputting, the frequency transform block/sub-block size information is signaled in the bit stream separately from the field/frame type information, and wherein the field/frame type information is signaled at any of frame level or macroblock level in the bit stream.

19. The method of claim 13 wherein the plural blocks include plural luma blocks and plural chroma blocks, wherein the one or more block boundaries selected based at least in part on the frequency transform block/sub-block size information and the field/frame type information are selected for in-loop deblocking of the plural luma blocks, and wherein the encoding further includes:

selecting one or more block boundaries for in-loop deblocking of the plural chroma blocks, wherein the selecting the one or more block boundaries for in-loop deblocking of the plural chroma blocks is based at least in part on the frequency transform block/sub-block size information but independent of the field/frame type information.

20. In a computing device that implements a video encoder, the computing device including a processor and memory, a method comprising:

with the computing device that implements the video encoder, encoding data for video that includes an interlaced frame coded picture, wherein the encoding includes:

obtaining field/frame type information for a current macroblock in the interlaced frame coded picture;

obtaining frequency transform block/sub-block size information for plural blocks in the current macroblock, the frequency transform block/sub-block size information indicating which frequency transform block/sub-block size of plural possible frequency transform block/sub-block sizes applies to each of the plural blocks, wherein the plural blocks include plural luma blocks and plural chroma blocks;

selecting one or more block boundaries for in-loop deblocking of the plural chroma blocks, wherein the selecting the one or more block boundaries for in-loop deblocking of the plural chroma blocks is based at least in part on the frequency transform block/sub-block size information but is independent of the field/frame type information;

selecting one or more block boundaries for in-loop deblocking of the plural luma blocks, wherein the selecting the one or more block boundaries for in-loop deblocking of the plural luma blocks is based at least in part on the frequency transform block/sub-block size information and based at least in part on the field/frame type information; and performing in-loop deblocking on the selected block boundaries; and with the computing device that implements the video encoder, outputting the encoded data as part of a bit stream, wherein the frequency transform block/sub-block size information is signaled in the bit stream using one or more transform size syntax elements, and wherein one or more transform level syntax elements indicate whether the frequency transform block/sub-block size information is signaled in the bit stream as part of frame level, macroblock level, or block level of bit stream syntax.

21. The method of claim 20 wherein the field/frame transform type information indicates whether the current macroblock is coded according to a field structure or a frame structure.

22. The method of claim 20 wherein the in-loop deblocking is field-based.

23. The method of claim 20 wherein the interlaced frame coded picture is an interlaced P-frame.

24. The method of claim 20 wherein the interlaced frame coded picture is an interlaced B-frame.

25. The method of claim 20 wherein the current macroblock is a 4:2:0 macroblock.

26. The method of claim 20 wherein at least one of the one or more block boundaries is a horizontal block boundary.

27. The method of claim 20 wherein at least one of the one or more block boundaries is a vertical block boundary.

28. The method of claim 20 wherein the performing in-loop deblocking comprises performing in-loop deblocking on horizontal block boundaries prior to performing in-loop deblocking on vertical block boundaries.

29. The method of claim 20 wherein the frequency transform block/sub-block size information indicates the frequency transform block/sub-block size from a group consisting of: 8×8, 8×4, 4×8, and 4×4.

30. A computer system including a processor, memory, speaker, voice input device, display, and storage medium, wherein the computer system is adapted to perform a method comprising:

encoding data for video that includes an interlaced frame coded picture, wherein the encoding includes:

obtaining field/frame type information for a current macroblock in the interlaced frame coded picture;

obtaining frequency transform block/sub-block size information for plural blocks in the current macroblock, the frequency transform block/sub-block size information indicating which frequency transform block/sub-block size of plural possible frequency transform block/sub-block sizes applies to each of the plural blocks, wherein the plural blocks include plural luma blocks and plural chroma blocks;

selecting one or more block boundaries for in-loop deblocking of the plural chroma blocks, wherein the selecting the one or more block boundaries for in-loop deblocking of the plural chroma blocks is based at least in part on the frequency transform block/sub-block size information but is independent of the field/frame type information;

selecting one or more block boundaries for in-loop deblocking of the plural luma blocks, wherein the selecting the one or more block boundaries for in-loop deblocking of the plural luma blocks is based at least in part on the frequency transform block/sub-block size information and based at least in part on the field/frame type information; and performing in-loop deblocking on the selected block boundaries; and outputting the encoded data as part of a bit stream, wherein the frequency transform block/sub-block size information is signaled in the bit stream using one or more transform size syntax elements, and wherein one or more transform level syntax elements indicate whether the frequency transform block/sub-block size information is signaled in the bit stream as part of frame level, macroblock level, or block level of bit stream syntax.

31. The method of claim 20 wherein the frequency transform block/sub-block size information is signaled at frame level in the bit stream.

32. The method of claim 20 wherein the frequency transform block/sub-block size information is signaled at macroblock level in the bit stream.

33. The method of claim 20 wherein the frequency transform block/sub-block size information is signaled at block level in the bit stream.

34. The method of claim 20 wherein the field/frame type information is signaled at macroblock level in the bit stream.

35. The method of claim 20 wherein the field/frame type information is signaled at frame level in the bit stream.

* * * * *